US012809408B2

(12) United States Patent
Blackmon et al.

(10) Patent No.: US 12,809,408 B2
(45) Date of Patent: Nov. 24, 2026

(54) HEAT-NOT-BURN (HNB) AEROSOL-GENERATING DEVICES INCLUDING INTRA-DRAW HEATER CONTROL, AND METHODS OF CONTROLLING A HEATER

(71) Applicant: Altria Client Services LLC, Richmond, VA (US)

(72) Inventors: Zack W. Blackmon, Richmond, VA (US); Eric Hawes, Glen Allen, VA (US); Rangaraj S. Sundar, Midlothian, VA (US); Raymond W. Lau, Glen Allen, VA (US); Jarrett Keen, Richmond, VA (US); Niall Gallagher, Cambridge (GB)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 361 days.

(21) Appl. No.: 18/360,408

(22) Filed: Jul. 27, 2023

(65) Prior Publication Data

US 2023/0367340 A1 Nov. 16, 2023

Related U.S. Application Data

(63) Continuation of application No. 17/151,409, filed on Jan. 18, 2021, now Pat. No. 11,789,476.

(51) Int. Cl.

| | |
|---|---|
| ***A24F 40/57*** | (2020.01) |
| ***G05B 15/02*** | (2006.01) |
| ***G05D 23/20*** | (2006.01) |

(52) U.S. Cl.

CPC ............ *G05D 23/20* (2013.01); *G05B 15/02* (2013.01); *A24F 40/57* (2020.01)

(58) Field of Classification Search

USPC ........................................................ 700/300

See application file for complete search history.

(56) References Cited

U.S. PATENT DOCUMENTS

| | | |
|---|---|---|
| 855,984 A | 6/1907 | Russell |
| 1,071,389 A | 8/1913 | Blosser |

(Continued)

FOREIGN PATENT DOCUMENTS

| | | |
|---|---|---|
| CN | 103237468 A | 8/2013 |
| CN | 103945716 A | 7/2014 |

(Continued)

OTHER PUBLICATIONS

Crafty Vaporizer manual (2014).

(Continued)

*Primary Examiner* — Emilio J Saavedra

(74) *Attorney, Agent, or Firm* — Harness, Dickey & Pierce, P.L.C.

(57) ABSTRACT

At least one example embodiment provides s system for controlling a heater in a non-combustible aerosol-generating device. The system comprises a memory storing computer-readable instructions and a controller configured to execute the computer-readable instructions to cause the non-combustible aerosol-generating device to, detect an airflow in the non-combustible aerosol-generating device, apply a first power to the heater based on the detected airflow, apply a second power to the heater based on a target preheat temperature and the detected airflow being below an airflow threshold value, the application of the second power being after the application of the first power, and apply a third power to the heater based on the target preheat temperature and the detected airflow being below the airflow threshold value, the application of the third power being after the (Continued)

application of the second power, the third power being greater than the second power.

18 Claims, 28 Drawing Sheets

(56) References Cited

U.S. PATENT DOCUMENTS 1,934,887 A 11/1933 Robinson
4,214,146 A 7/1980 Schimanski
4,564,748 A 1/1986 Gupton
4,947,874 A 8/1990 Brooks et al.
5,372,148 A 12/1994 McCafferty et al.
5,388,572 A 2/1995 Mulhauser et al.
5,388,573 A 2/1995 Mulhauser et al.
5,441,060 A 8/1995 Rose et al.
5,460,173 A 10/1995 Mulhauser et al.
5,593,792 A 1/1997 Farrier et al.
5,619,984 A 4/1997 Hodson et al.
5,645,050 A 7/1997 Zierenberg et al.
5,665,262 A 9/1997 Hajaligol et al.
5,666,977 A 9/1997 Higgins et al.
5,823,182 A 10/1998 Van Oort
6,006,747 A 12/1999 Eisele et al.
6,040,560 A 3/2000 Fleischhauer et al.
6,065,472 A 5/2000 Anderson et al.
6,095,153 A 8/2000 Kessler et al.
6,234,167 B1 5/2001 Cox et al.
6,481,437 B1 11/2002 Pate
6,501,052 B2 12/2002 Cox et al.
6,516,796 B1 2/2003 Cox et al.
6,557,552 B1 5/2003 Cox et al.
7,117,867 B2 10/2006 Cox et al.
7,173,222 B2 2/2007 Cox et al.
7,186,958 B1 3/2007 Nelson
7,726,320 B2 6/2010 Robinson et al.
7,997,280 B2 8/2011 Rosenthal
8,079,371 B2 12/2011 Robinson et al.
8,186,345 B2 5/2012 Payton et al.
8,371,310 B2 2/2013 Brenneise
8,402,976 B2 3/2013 Fernando et al.
8,453,641 B2 6/2013 Payton et al.
8,488,952 B2 7/2013 Landry
8,490,627 B2 7/2013 Levin et al.
8,689,804 B2 4/2014 Fernando et al.
8,692,167 B2 4/2014 Hedmann et al.
8,714,150 B2 5/2014 Alelov
8,733,349 B2 5/2014 Bath et al.
8,739,780 B2 6/2014 Tang et al.
8,741,220 B2 6/2014 O'Donnell et al.
8,800,970 B2 8/2014 Heine et al.
8,820,330 B2 9/2014 Bellinger et al.
8,844,522 B2 9/2014 Huby et al.
8,851,081 B2 10/2014 Fernando et al.
8,864,909 B2 10/2014 Mishra et al.
8,893,715 B2 11/2014 Payton et al.
8,899,238 B2 12/2014 Robinson et al.
8,910,630 B2 12/2014 Todd
9,072,322 B2 7/2015 Liu
9,168,350 B2 10/2015 Payton et al.
9,220,302 B2 12/2015 DePiano et al.
9,227,522 B2 1/2016 Jeong
9,265,902 B2 2/2016 Payton et al.
9,314,560 B2 4/2016 Wiktor
9,351,869 B2 5/2016 Knott et al.
9,357,803 B2 6/2016 Egoyants et al.
9,393,379 B2 7/2016 Barker et al.
9,402,970 B2 8/2016 Virr et al.
9,423,152 B2 8/2016 Ampolini et al.
9,440,040 B2 9/2016 Klasek et al.
9,468,234 B2 10/2016 Fernando et al.
9,475,401 B2 10/2016 Jeong
9,497,999 B2 11/2016 Lord
9,498,000 B2 11/2016 Kuczaj
9,526,807 B2 12/2016 O'Donnell et al.
9,532,600 B2 1/2017 Thorens et al.
9,532,605 B2 1/2017 Yamada et al.
9,549,573 B2 1/2017 Monsees et al.
9,554,598 B2 1/2017 Egoyants et al.
9,555,181 B2 1/2017 Hedmann et al.
9,560,883 B2 2/2017 Hawes
9,586,019 B2 3/2017 Heine et al.
9,603,388 B2 3/2017 Fernando et al.
9,609,893 B2 4/2017 Novak, III et al.
9,609,894 B2 4/2017 Abramov et al.
9,609,895 B2 4/2017 Galloway et al.
9,642,975 B2 5/2017 Belcastro et al.
9,649,468 B2 5/2017 Yatsevich et al.
9,668,521 B2 6/2017 Kuczaj
9,693,587 B2 7/2017 Plojoux et al.
9,713,345 B2 7/2017 Farine et al.
9,737,682 B2 8/2017 Maurer et al.
9,763,478 B2 9/2017 Cameron et al.
9,775,379 B2 10/2017 Davidson et al.
9,801,416 B2 10/2017 Robinson et al.
9,802,011 B2 10/2017 Davidson et al.
9,802,022 B2 10/2017 Smith et al.
9,808,032 B2 11/2017 Yamada et al.
9,814,262 B2 11/2017 Peleg et al.
9,814,268 B2 11/2017 Robinson et al.
9,814,845 B1 11/2017 Norman et al.
9,814,856 B2 11/2017 Payton et al.
9,826,780 B2 11/2017 Krietzman
9,839,759 B2 12/2017 Payton et al.
9,854,841 B2 1/2018 Ampolini et al.
9,855,398 B2 1/2018 Klasek et al.
9,861,732 B2 1/2018 Scarpaci et al.
9,867,921 B2 1/2018 Hedmann et al.
9,872,521 B2 1/2018 Farine et al.
9,877,510 B2 1/2018 Henry, Jr.
9,888,719 B2 2/2018 Cadieux et al.
9,888,725 B2 2/2018 Cameron et al.
9,894,936 B2 2/2018 Krietzman
9,901,123 B2 2/2018 Robinson et al.
9,913,495 B2 3/2018 Keen et al.
9,913,497 B2 3/2018 Galloway et al.
9,918,497 B2 3/2018 Lord
9,930,915 B2 4/2018 Worm et al.
9,936,731 B2 4/2018 Hopps
9,936,734 B2 4/2018 Hawes et al.
9,943,114 B2 4/2018 Batista
9,949,507 B2 4/2018 Flick
9,949,511 B2 4/2018 Liu
9,955,735 B2 5/2018 Lin et al.
9,974,336 B2 5/2018 Xue et al.
9,980,514 B2 5/2018 Malamud et al.
9,980,523 B2 5/2018 Abramov et al.
9,981,079 B2 5/2018 Scarpaci et al.
9,993,602 B2 6/2018 Davidson et al.
9,999,256 B2 6/2018 Abramov et al.
10,004,259 B2 6/2018 Sebastian et al.
10,021,912 B2 7/2018 Yamada et al.
10,021,914 B2 7/2018 Liu
10,028,533 B2 7/2018 Fursa et al.
10,031,183 B2 7/2018 Novak, III et al.
10,042,408 B2 8/2018 Cameron et al.
10,045,567 B2 8/2018 Monsees et al.
10,045,568 B2 8/2018 Monsees et al.
10,051,889 B2 8/2018 Chen
10,051,891 B2 8/2018 Sur
10,058,124 B2 8/2018 Monsees et al.
10,058,129 B2 8/2018 Monsees et al.
10,058,665 B2 8/2018 Tang et al.
10,058,694 B2 8/2018 Norris et al.
10,064,434 B2 9/2018 Zitzke et al.
10,070,662 B2 9/2018 Gorilovsky
10,070,667 B2 9/2018 Lord et al.
10,076,137 B2 9/2018 Krietzman
10,080,388 B2 9/2018 Sebastian et al.
10,085,483 B2 10/2018 Qiu
10,086,158 B2 10/2018 Bath et al.
10,092,036 B2 10/2018 Phillips et al.
10,099,020 B2 10/2018 Davidson et al.
10,104,915 B2 10/2018 Bowen et al.

(56) References Cited

U.S. PATENT DOCUMENTS 10,111,281 B2 10/2018 Qiu
10,111,465 B2 10/2018 Liu
10,117,460 B2 11/2018 Sears et al.
10,117,465 B2 11/2018 Monsees et al.
10,117,466 B2 11/2018 Monsees et al.
10,118,013 B2 11/2018 Krietzman
10,123,567 B2 11/2018 Hawes
10,123,570 B1 11/2018 Liu
10,130,119 B2 11/2018 Murison
10,130,780 B2 11/2018 Talon
10,130,784 B2 11/2018 Yatsevich et al.
10,136,673 B2 11/2018 Mironov
10,143,232 B2 12/2018 Talon
10,143,236 B2 12/2018 DePiano et al.
10,143,240 B2 12/2018 Keen et al.
10,159,279 B2 12/2018 Lord et al.
10,159,283 B2 12/2018 Mironov
10,166,349 B2 1/2019 Davidson et al.
10,172,390 B2 1/2019 Nakano et al.
10,172,392 B2 1/2019 Sur et al.
10,179,215 B2 1/2019 Raichman
10,194,696 B2 2/2019 Matischek et al.
10,194,698 B2 2/2019 Belcastro et al.
10,195,330 B2 2/2019 Coll et al.
10,201,181 B2 2/2019 Murison et al.
10,201,185 B2 2/2019 Bleloch et al.
10,201,186 B2 2/2019 Alarcon et al.
10,201,647 B2 2/2019 Norris et al.
10,206,424 B1 2/2019 Gammerler et al.
10,206,431 B2 2/2019 Sur et al.
10,206,433 B2 2/2019 Ding
10,212,970 B2 2/2019 Barbuck
10,219,538 B2 3/2019 Murison et al.
10,219,543 B2 3/2019 Gill et al.
10,219,548 B2 3/2019 Robinson et al.
10,226,078 B2 3/2019 Peleg et al.
10,226,079 B2 3/2019 Robinson et al.
10,231,485 B2 3/2019 Sur
10,231,486 B2 3/2019 Bowen et al.
10,231,488 B2 3/2019 Robinson et al.
10,238,143 B2 3/2019 Capuano
10,238,764 B2 3/2019 Trzecieski
10,244,796 B2 4/2019 Liu
10,247,443 B2 4/2019 Flick
10,251,423 B2 4/2019 Mamoun et al.
10,251,428 B2 4/2019 Lin et al.
10,258,086 B2 4/2019 Sur
10,264,820 B2 4/2019 Bellinger et al.
10,264,823 B2 4/2019 Monsees et al.
10,265,463 B2 4/2019 Biasi et al.
10,271,578 B2 4/2019 John et al.
10,274,539 B2 4/2019 Novak, III et al.
10,276,898 B2 4/2019 Leadley
10,278,422 B2 5/2019 Levy et al.
10,278,429 B2 5/2019 Gao et al.
10,279,141 B2 5/2019 Virr et al.
10,285,430 B2 5/2019 Gorilovsky
10,292,436 B2 5/2019 Cirillo et al.
10,299,514 B2 5/2019 Bilat et al.
10,299,515 B2 5/2019 Krietzman
10,306,923 B2 6/2019 Kananen
10,321,716 B2 6/2019 Zitzke
10,321,718 B2 6/2019 Qiu
10,327,474 B2 6/2019 Hawes et al.
10,328,443 B2 6/2019 Ricketts et al.
10,333,330 B2 6/2019 Holzherr
10,342,258 B2 7/2019 Matsumoto et al.
10,342,261 B2 7/2019 Peleg et al.
10,362,803 B2 7/2019 Bellinger et al.
10,362,806 B2 7/2019 Cadieux et al.
10,368,581 B2 8/2019 Rostami et al.
10,369,304 B2 8/2019 Davidson et al.
10,376,843 B2 8/2019 Crnkovich et al.
10,383,372 B2 8/2019 Ding
10,398,173 B2 9/2019 Lin
10,398,176 B2 9/2019 Hon et al.
10,398,180 B2 9/2019 Lord
10,405,581 B2 9/2019 Sur
10,405,582 B2 9/2019 Hatton et al.
10,426,200 B2 10/2019 DePiano et al.
10,433,589 B2 10/2019 Zitzke et al.
10,440,992 B2 10/2019 Sur et al.
10,440,994 B2 10/2019 Rostami
10,448,456 B2 10/2019 Shoched
10,448,670 B2 10/2019 Talon et al.
10,455,863 B2 10/2019 Rostami et al.
10,463,080 B2 11/2019 Mironov
10,470,494 B2 11/2019 Woodcock et al.
10,470,495 B2 11/2019 Sur et al.
10,470,496 B2 11/2019 Bernauer et al.
10,477,896 B2 11/2019 Sur et al.
10,477,900 B2 11/2019 Hopps
10,478,544 B2 11/2019 Friederichs et al.
10,483,781 B2 11/2019 Holzherr
10,492,529 B2 12/2019 Borkovec et al.
10,492,532 B2 12/2019 Novak, III et al.
10,492,533 B2 12/2019 Bernauer et al.
10,492,536 B2 12/2019 Angstead et al.
10,499,688 B2 12/2019 Dickens
10,499,691 B2 12/2019 Takeuchi et al.
10,505,383 B2 12/2019 Sur
10,512,282 B2 12/2019 Bowen et al.
10,512,285 B2 12/2019 Kuczaj
10,512,702 B2 12/2019 O'Donnell et al.
10,512,735 B2 12/2019 Norman et al.
10,517,326 B2 12/2019 Sur et al.
10,517,330 B2 12/2019 Sur
10,517,331 B2 12/2019 Atkins et al.
10,524,505 B2 1/2020 Keen
10,524,509 B2 1/2020 Sur et al.
10,524,512 B2 1/2020 Sebastian et al.
10,531,688 B2 1/2020 Oishi
10,531,689 B2 1/2020 Chu
10,531,691 B2 1/2020 Sears et al.
10,532,178 B2 1/2020 Barker et al.
10,537,137 B2 1/2020 Sur et al.
10,537,698 B2 1/2020 Payton et al.
10,555,557 B2 2/2020 Liu
10,555,560 B2 2/2020 Bilat et al.
10,561,807 B2 2/2020 Yamada et al.
10,568,359 B2 2/2020 Henry, Jr.
10,568,363 B2 2/2020 Liu
10,575,562 B2 3/2020 Bless et al.
10,575,563 B2 3/2020 Bowen et al.
10,582,726 B2 3/2020 Sur et al.
10,588,356 B2 3/2020 Harrison et al.
10,602,776 B2 3/2020 Batista
10,602,781 B2 3/2020 Nakano et al.
10,609,963 B2 4/2020 Nakano et al.
10,617,151 B2 4/2020 Davis et al.
10,624,393 B2 4/2020 Kuczaj
10,624,394 B2 4/2020 Memari et al.
10,625,014 B2 4/2020 Pouchoulin
10,631,574 B2 4/2020 Bleloch et al.
10,639,446 B2 5/2020 Yatsevich et al.
10,645,971 B2 5/2020 Zitzke
10,645,972 B2 5/2020 Batista
10,653,183 B2 5/2020 Sur et al.
10,653,187 B1 5/2020 Doyle et al.
10,653,855 B2 5/2020 Barker et al.
10,667,329 B2 5/2020 Bernauer et al.
10,671,031 B2 6/2020 Hawes et al.
10,674,769 B2 6/2020 Chen et al.
10,674,770 B2 6/2020 Talon
10,681,936 B2 6/2020 Liao et al.
10,687,554 B2 6/2020 Hawes et al.
10,688,272 B2 6/2020 Burgess et al.
10,694,782 B2 6/2020 Liu
10,701,971 B2 7/2020 Amir
10,701,975 B2 7/2020 Bowen et al.
10,709,865 B2 7/2020 Payton et al.
10,716,329 B2 7/2020 Matsumoto et al.
10,721,967 B2 7/2020 Raichman
10,722,660 B2 7/2020 Van Oudenallen

(56) References Cited

U.S. PATENT DOCUMENTS

| | | | |
|---|---|---|---|
| 10,729,177 | B2 | 8/2020 | Dendy et al. |
| 10,729,179 | B2 | 8/2020 | Atkins et al. |
| 10,729,184 | B2 | 8/2020 | Hawes |
| 10,737,043 | B2 | 8/2020 | Yamada et al. |
| 10,750,782 | B2 | 8/2020 | Batista |
| 10,753,974 | B2 | 8/2020 | Novak, III et al. |
| 10,757,972 | B2 | 9/2020 | Matsumoto et al. |
| 10,757,977 | B2 | 9/2020 | Qiu |
| 10,757,979 | B2 | 9/2020 | Zhu |
| 10,758,701 | B2 | 9/2020 | Bath et al. |
| 10,765,146 | B2 | 9/2020 | Sur et al. |
| 10,765,147 | B2 | 9/2020 | Buchberger et al. |
| 10,765,821 | B2 | 9/2020 | Raichman |
| 10,779,574 | B2 | 9/2020 | Atkins et al. |
| 10,786,011 | B2 | 9/2020 | Mo et al. |
| 10,799,657 | B2 | 10/2020 | Huby et al. |
| 10,806,180 | B2 | 10/2020 | Otiaba |
| 10,813,173 | B2 | 10/2020 | Ouyang et al. |
| 10,813,385 | B2 | 10/2020 | Sur |
| 10,820,626 | B2 | 11/2020 | Benjamignan et al. |
| 10,827,781 | B2 | 11/2020 | Chen et al. |
| 10,827,782 | B2 | 11/2020 | Fernando et al. |
| 10,827,783 | B2 | 11/2020 | Sur |
| 10,834,967 | B2 | 11/2020 | Woodbine et al. |
| 10,834,973 | B2 | 11/2020 | Bless et al. |
| 10,842,197 | B2 | 11/2020 | Bless et al. |
| 10,849,360 | B2 | 12/2020 | Batista et al. |
| 10,849,366 | B2 | 12/2020 | Hatton et al. |
| 10,856,582 | B2 | 12/2020 | Belcastro et al. |
| 10,863,773 | B2 | 12/2020 | Suzuki et al. |
| 10,864,333 | B2 | 12/2020 | Shimel et al. |
| 10,869,499 | B2 | 12/2020 | Fernando et al. |
| 10,869,503 | B2 | 12/2020 | Yamada et al. |
| 10,874,148 | B2 | 12/2020 | Keen et al. |
| 10,881,131 | B2 | 1/2021 | Matsumoto et al. |
| 10,881,148 | B2 | 1/2021 | Nakano et al. |
| 10,881,150 | B2 | 1/2021 | Sears et al. |
| 10,881,778 | B2 | 1/2021 | Scarpaci et al. |
| 10,888,122 | B2 | 1/2021 | Malamud et al. |
| 10,888,125 | B2 | 1/2021 | Anderson et al. |
| 10,893,707 | B2 | 1/2021 | Krietzman |
| 10,897,929 | B2 | 1/2021 | Jochnowitz et al. |
| 10,905,167 | B2 | 2/2021 | Atkins et al. |
| 10,905,169 | B2 | 2/2021 | Bilat et al. |
| 10,912,331 | B2 | 2/2021 | Atkins et al. |
| 10,912,332 | B2 | 2/2021 | Yan et al. |
| 10,912,333 | B2 | 2/2021 | Atkins et al. |
| 10,912,338 | B2 | 2/2021 | Yan et al. |
| 10,918,134 | B2 | 2/2021 | Sur et al. |
| 10,918,821 | B2 | 2/2021 | Payton et al. |
| 10,925,316 | B2 | 2/2021 | Batista et al. |
| 10,925,322 | B2 | 2/2021 | Nakano et al. |
| 10,925,323 | B2 | 2/2021 | Nakano et al. |
| 10,945,462 | B2 | 3/2021 | Davis et al. |
| 10,945,467 | B2 | 3/2021 | Wang et al. |
| 10,959,459 | B2 | 3/2021 | Sur |
| 10,959,463 | B2 | 3/2021 | Mironov |
| 10,959,464 | B2 | 3/2021 | Harrison et al. |
| 10,960,167 | B2 | 3/2021 | Liu et al. |
| 10,966,459 | B2 | 4/2021 | Fernando et al. |
| 10,966,460 | B2 | 4/2021 | Frisbee et al. |
| 10,986,864 | B1 | 4/2021 | Arabia |
| 10,986,867 | B2 | 4/2021 | Bowen et al. |
| 10,986,872 | B2 | 4/2021 | Krietzman |
| 10,986,875 | B2 | 4/2021 | Fisher et al. |
| 10,993,471 | B2 | 5/2021 | Christensen et al. |
| 10,993,474 | B2 | 5/2021 | Matsumoto et al. |
| 10,993,476 | B2 | 5/2021 | Guo |
| 11,000,075 | B2 | 5/2021 | DePiano et al. |
| 11,005,282 | B2 | 5/2021 | Akao |
| 11,006,483 | B2 | 5/2021 | Qiu |
| 11,006,669 | B2 | 5/2021 | Reevell |
| 11,006,671 | B2 | 5/2021 | Li et al. |
| 11,007,340 | B2 | 5/2021 | Payton et al. |
| 11,013,820 | B2 | 5/2021 | Trzecieski |
| 11,013,875 | B2 | 5/2021 | Tang et al. |
| 11,019,852 | B2 | 6/2021 | Sears et al. |
| 11,025,071 | B2 | 6/2021 | Yamada et al. |
| 11,026,833 | B2 | 6/2021 | Knott et al. |
| 11,033,053 | B2 | 6/2021 | Courbat et al. |
| 11,033,054 | B2 | 6/2021 | Lamb et al. |
| 11,033,698 | B2 | 6/2021 | Bath et al. |
| 11,039,504 | B2 | 6/2021 | Kondo |
| 11,039,645 | B2 | 6/2021 | Sur |
| 11,039,646 | B2 | 6/2021 | Thorsen et al. |
| 11,051,364 | B2 | 6/2021 | Qiu et al. |
| 11,051,551 | B2 | 7/2021 | Abramov et al. |
| 11,051,558 | B2 | 7/2021 | Tu |
| 11,058,834 | B2 | 7/2021 | Raichman |
| 11,058,835 | B2 | 7/2021 | Raichman |
| 11,058,843 | B2 | 7/2021 | Yatsevich et al. |
| 11,065,402 | B2 | 7/2021 | Trzecieski |
| 11,071,327 | B2 | 7/2021 | Jain et al. |
| 11,075,995 | B2 | 7/2021 | Woodbine et al. |
| 11,083,225 | B2 | 8/2021 | Holzherr |
| 11,083,226 | B2 | 8/2021 | Yamada et al. |
| 11,089,816 | B2 | 8/2021 | Mizuguchi et al. |
| 11,094,993 | B2 | 8/2021 | Sur |
| 11,103,011 | B2 | 8/2021 | Liu |
| 11,106,773 | B2 | 8/2021 | Popplewell et al. |
| 11,110,306 | B2 | 9/2021 | Montoya et al. |
| 11,116,254 | B2 | 9/2021 | Lord et al. |
| 11,116,255 | B2 | 9/2021 | Mizuguchi et al. |
| 11,116,915 | B2 | 9/2021 | Dickens |
| 11,116,931 | B2 | 9/2021 | Knepper et al. |
| 11,122,837 | B2 | 9/2021 | Mizuguchi et al. |
| 11,129,415 | B2 | 9/2021 | Qiu |
| 11,133,692 | B2 | 9/2021 | Akao |
| 11,134,720 | B2 | 10/2021 | Nakano et al. |
| 11,140,921 | B2 | 10/2021 | Sebastian et al. |
| 11,141,548 | B2 | 10/2021 | Ballesteros Gomez et al. |
| 11,154,669 | B2 | 10/2021 | Bowen et al. |
| 11,160,140 | B2 | 10/2021 | Qiu |
| 11,160,311 | B2 | 11/2021 | Akao et al. |
| 11,160,312 | B2 | 11/2021 | Akao et al. |
| 11,160,937 | B2 | 11/2021 | Davidson et al. |
| 11,166,341 | B2 | 11/2021 | Qiu |
| 11,167,069 | B2 | 11/2021 | Friederichs et al. |
| 11,178,512 | B2 | 11/2021 | Nguyen |
| 11,185,648 | B2 | 11/2021 | Hon et al. |
| 11,191,304 | B2 | 12/2021 | Grote |
| 11,202,342 | B2 | 12/2021 | Takeuchi et al. |
| 11,202,343 | B2 | 12/2021 | Nakano et al. |
| 11,202,471 | B2 | 12/2021 | Borkovec et al. |
| 11,202,872 | B2 | 12/2021 | Grote |
| 11,207,488 | B2 | 12/2021 | Kim |
| 11,212,881 | B2 | 12/2021 | Fursa et al. |
| 11,227,469 | B2 | 1/2022 | Chen et al. |
| 11,235,109 | B2 | 2/2022 | Thorsen et al. |
| 11,241,046 | B2 | 2/2022 | Jeong et al. |
| 11,245,281 | B2 | 2/2022 | Fernando |
| 11,247,006 | B2 | 2/2022 | Novak, III et al. |
| 11,253,003 | B2 | 2/2022 | Jeong et al. |
| 11,253,004 | B2 | 2/2022 | Robert et al. |
| 11,260,186 | B2 | 3/2022 | Vos et al. |
| 11,265,974 | B2 | 3/2022 | Sebastian et al. |
| 11,266,180 | B2 | 3/2022 | Peleg et al. |
| 11,271,481 | B2 | 3/2022 | Mizuguchi et al. |
| 11,272,578 | B2 | 3/2022 | Robert et al. |
| 11,277,884 | B2 | 3/2022 | Stura et al. |
| 11,277,886 | B2 | 3/2022 | Stura et al. |
| 11,278,060 | B1 | 3/2022 | Aradachi |
| 11,285,290 | B2 | 3/2022 | Barker et al. |
| 11,285,379 | B2 | 3/2022 | Bowen et al. |
| 11,291,252 | B2 | 4/2022 | Sur et al. |
| 11,291,778 | B2 | 4/2022 | Li |
| 11,291,781 | B2 | 4/2022 | Davidson et al. |
| 11,298,482 | B2 | 4/2022 | Tang et al. |
| 11,304,452 | B2 | 4/2022 | Jia |
| 11,304,454 | B1 | 4/2022 | Fujinaga et al. |
| 11,311,410 | B2 | 4/2022 | Daffer |
| 11,311,688 | B2 | 4/2022 | Phillips et al. |
| 11,318,269 | B2 | 5/2022 | Creusot et al. |
| 11,324,258 | B2 | 5/2022 | Batista et al. |

(56) References Cited

U.S. PATENT DOCUMENTS 11,330,843 B2 5/2022 Bergstrom et al.
11,330,845 B2 5/2022 Aradachi
11,337,460 B2 5/2022 Ono et al.
11,337,462 B2 5/2022 Yamada et al.
11,337,464 B2 5/2022 Lee et al.
11,338,104 B2 5/2022 Klasek et al.
11,344,707 B2 5/2022 Fia et al.
11,350,669 B2 6/2022 Quintana
11,350,671 B2 6/2022 Hawes et al.
11,350,673 B2 6/2022 Lim
11,350,674 B2 6/2022 Qiu
11,351,314 B2 6/2022 Kessler et al.
11,357,934 B2 6/2022 Hawes et al.
11,357,936 B2 6/2022 Lipowicz
11,363,837 B2 6/2022 McCoy
11,369,759 B2 6/2022 Gill
11,382,354 B2 7/2022 Chen et al.
11,388,781 B2 7/2022 Hatton et al.
11,395,515 B2 7/2022 Talon
11,399,568 B2 8/2022 Chen et al.
11,399,569 B2 8/2022 Capuano
11,399,572 B2 8/2022 Akao et al.
11,400,272 B2 8/2022 Norris et al.
11,405,986 B2 8/2022 Courbat et al.
11,412,579 B2 8/2022 Takeuchi et al.
11,412,580 B2 8/2022 Li et al.
11,412,783 B2 8/2022 Singh
11,419,361 B2 8/2022 Sebastian
11,425,931 B2 8/2022 Harrison et al.
11,428,738 B2 8/2022 Novak, III et al.
11,433,193 B2 9/2022 Rogan
11,438,972 B2 9/2022 Thorsen
11,439,184 B2 9/2022 Bowen et al.
11,439,188 B2 9/2022 Lin et al.
11,445,760 B2 9/2022 Nakano et al.
11,445,761 B2 9/2022 Fu
11,445,762 B2 9/2022 Ono et al.
11,445,764 B2 9/2022 Aradachi
11,447,386 B2 9/2022 Yu
11,450,901 B2 9/2022 Akao et al.
11,452,180 B2 9/2022 Rossoll et al.
11,452,314 B2 9/2022 Ono et al.
11,454,996 B2 9/2022 Qiu
11,456,590 B2 9/2022 Tseng et al.
11,457,661 B2 10/2022 Han et al.
11,457,669 B2 10/2022 Fernando et al.
11,458,273 B2 10/2022 Payton et al.
11,464,918 B2 10/2022 Norman et al.
11,464,920 B2 10/2022 Belcastro et al.
11,471,621 B2 10/2022 Chen et al.
11,478,019 B2 10/2022 Qiu et al.
11,484,633 B1 11/2022 Porter et al.
11,490,661 B2 11/2022 Mizuguchi et al.
11,500,417 B2 11/2022 Qiu
11,503,670 B2 11/2022 Takeuchi et al.
11,503,671 B2 11/2022 He
11,503,862 B2 11/2022 Aradachi
11,516,886 B2 11/2022 Chen et al.
11,517,053 B2 12/2022 Sur et al.
11,523,469 B2 12/2022 Courbat et al.
11,523,639 B2 12/2022 Kuczaj
11,528,941 B2 12/2022 Maeder et al.
11,528,942 B2 12/2022 Qiu et al.
11,529,481 B2 12/2022 Bath et al.
11,533,786 B2 12/2022 Batista
11,533,952 B2 12/2022 Florack et al.
11,533,953 B2 12/2022 Tabasso et al.
11,534,560 B2 12/2022 Krietzman
11,540,562 B2 1/2023 Yamada et al.
11,540,563 B2 1/2023 Hawes
11,541,193 B2 1/2023 Lee
11,547,145 B2 1/2023 Cadieux et al.
11,547,146 B2 1/2023 Nakano et al.
11,547,147 B2 1/2023 Qiu et al.
11,547,148 B2 1/2023 Lee et al.
11,547,149 B2 1/2023 Qiu et al.
11,547,151 B2 1/2023 Courbat
11,553,736 B2 1/2023 Borkovec et al.
11,554,224 B2 1/2023 Zhou
11,564,414 B2 1/2023 Li et al.
11,565,057 B2 1/2023 Atkins et al.
11,565,059 B2 1/2023 Bowen et al.
11,571,026 B2 2/2023 Amir
11,576,436 B2 2/2023 Moloney et al.
11,576,990 B2 2/2023 O'Donnell et al.
11,583,007 B2 2/2023 Lee et al.
11,583,008 B2 2/2023 Hong et al.
11,589,421 B2 2/2023 Davis et al.
11,589,609 B2 2/2023 Liu et al.
11,589,612 B2 2/2023 Jung et al.
11,589,619 B2 2/2023 Takehara
11,589,621 B2 2/2023 Sur et al.
11,589,622 B2 2/2023 Lee
11,590,296 B2 2/2023 Hatton et al.
11,590,303 B2 2/2023 Lee et al.
11,590,454 B2 2/2023 Crnkovich et al.
11,596,179 B2 3/2023 Reevell
11,596,182 B2 3/2023 Lee et al.
11,602,173 B2 3/2023 Thorsen
11,602,177 B2 3/2023 Qiu et al.
11,605,963 B2 3/2023 Akao
11,606,970 B2 3/2023 Fu et al.
11,607,512 B2 3/2023 Bath et al.
11,611,227 B2 3/2023 Yamada et al.
11,612,188 B2 3/2023 Marubashi
11,617,395 B2 4/2023 Farine
11,621,570 B2 4/2023 Colotte et al.
11,622,579 B2 4/2023 Lim et al.
11,622,582 B2 4/2023 Lim et al.
11,627,763 B2 4/2023 Yamada et al.
11,632,983 B2 4/2023 Fu et al.
11,632,988 B2 4/2023 Yamada et al.
11,633,555 B2 4/2023 Katayama et al.
11,633,557 B2 4/2023 Katayama et al.
11,638,443 B2 5/2023 Fu et al.
11,641,871 B2 5/2023 Robinson et al.
11,641,879 B2 * 5/2023 Lim ........................ A24F 40/46
131/329
11,641,881 B2 5/2023 Qiu
11,641,882 B2 5/2023 Dendy et al.
11,641,883 B2 5/2023 Qiu et al.
11,647,566 B2 5/2023 Krietzman
11,647,781 B2 5/2023 Robinson et al.
11,652,885 B2 5/2023 Woodbine et al.
11,653,704 B2 5/2023 Gallagher et al.
11,659,869 B2 5/2023 Fisher et al.
11,666,086 B2 6/2023 Fu et al.
11,666,088 B2 6/2023 Harrison et al.
11,666,090 B2 6/2023 Reevell
11,666,099 B2 6/2023 Kuczaj
11,666,100 B2 6/2023 Lau et al.
11,666,101 B2 6/2023 Gallagher et al.
11,672,279 B2 6/2023 Egoyants et al.
11,672,903 B2 6/2023 Biasi et al.
11,678,407 B2 6/2023 Liu
11,679,211 B2 6/2023 Keen
11,679,221 B2 6/2023 Yatsevich et al.
11,679,224 B2 6/2023 Payton et al.
11,679,226 B2 6/2023 Ghalib et al.
11,679,227 B2 6/2023 Barker et al.
11,679,228 B2 6/2023 Payton et al.
11,684,087 B2 6/2023 Bless et al.
11,684,088 B2 6/2023 Liu
11,684,732 B2 6/2023 Frisbee et al.
11,690,405 B2 7/2023 Sur
11,696,598 B2 7/2023 Raichman
11,696,599 B2 7/2023 Raichman
11,696,600 B2 7/2023 Lim et al.
11,696,604 B2 7/2023 Henry, Jr. et al.
11,696,978 B2 7/2023 Girouard et al.
11,699,914 B2 7/2023 Akao
11,707,089 B2 7/2023 Raichman
11,707,587 B2 7/2023 Bath et al.
11,710,848 B2 7/2023 Otiaba

(56) References Cited

U.S. PATENT DOCUMENTS 11,712,065 B2 8/2023 Nakano et al.
11,712,066 B2 8/2023 Zhu et al.
11,712,535 B2 8/2023 Klasek et al.
11,716,789 B2 8/2023 Fisher, Jr. et al.
11,717,027 B2 8/2023 Raichman
11,717,028 B2 8/2023 Raichman
11,718,546 B2 8/2023 Wieslander et al.
2002/0036194 A1 3/2002 Reunamaki
2004/0129280 A1 7/2004 Woodson et al.
2004/0159322 A1 8/2004 Kladders et al.
2004/0215990 A1 10/2004 Allen et al.
2005/0063686 A1 3/2005 Whittle et al.
2007/0045288 A1 3/2007 Nelson
2007/0074734 A1 4/2007 Braunshteyn et al.
2007/0102013 A1 5/2007 Adams et al.
2008/0073558 A1 3/2008 Howell et al.
2009/0065011 A1 3/2009 Maeder et al.
2009/0293888 A1 12/2009 Williams et al.
2009/0293892 A1 12/2009 Williams et al.
2010/0012118 A1 1/2010 Storz
2010/0059070 A1 3/2010 Potter et al.
2010/0078022 A1 4/2010 Striebig et al.
2010/0139655 A1 6/2010 Genosar et al.
2010/0313901 A1 12/2010 Fernando et al.
2011/0126848 A1 6/2011 Zuber et al.
2011/0192399 A1 8/2011 Wilke et al.
2012/0304990 A1 12/2012 Todd
2012/0325227 A1 12/2012 Robinson et al.
2013/0032145 A1 2/2013 Adler et al.
2013/0186392 A1 7/2013 Haartsen et al.
2013/0233309 A1 9/2013 Todd
2013/0233312 A1 9/2013 Cohn
2013/0255702 A1 10/2013 Griffith, Jr. et al.
2013/0276799 A1 10/2013 Davidson et al.
2014/0041655 A1 2/2014 Barron et al.
2014/0060554 A1 3/2014 Collett et al.
2014/0121734 A1 5/2014 Knott et al.
2014/0186015 A1 7/2014 Breiwa, III et al.
2014/0202476 A1 7/2014 Egoyants et al.
2014/0217197 A1 8/2014 Selby et al.
2014/0238423 A1 8/2014 Tucker et al.
2014/0299141 A1 10/2014 Flick
2014/0321837 A1 10/2014 Flick
2014/0338685 A1 11/2014 Amir
2014/0345606 A1 11/2014 Talon
2014/0366609 A1 12/2014 Beck et al.
2014/0373857 A1 12/2014 Steinberg
2015/0027472 A1 1/2015 Amir
2015/0059747 A1 3/2015 Von Schuckmann
2015/0313284 A1* 11/2015 Liu .................... H05B 1/0244 219/490
2015/0359263 A1 12/2015 Bellinger
2016/0021932 A1 1/2016 Silvestrini et al.
2016/0057811 A1 2/2016 Alarcon et al.
2016/0195267 A1 7/2016 Chen
2016/0227838 A1 8/2016 Johnson et al.
2016/0235122 A1 8/2016 Krietzman
2016/0235124 A1 8/2016 Krietzman
2016/0256657 A1 9/2016 Klasek et al.
2016/0295922 A1 10/2016 John et al.
2016/0316821 A1 11/2016 Liu
2016/0331913 A1 11/2016 Bourque
2016/0338410 A1 11/2016 Batista et al.
2016/0345630 A1 12/2016 Mironov et al.
2016/0366946 A1 12/2016 Murison et al.
2017/0027225 A1 2/2017 Buchberger et al.
2017/0055584 A1 3/2017 Blandino et al.
2017/0071251 A1 3/2017 Goch
2017/0095006 A1 4/2017 Egoyants et al.
2017/0095624 A1 4/2017 Davidson et al.
2017/0099877 A1 4/2017 Worm et al.
2017/0112194 A1 4/2017 Sur et al.
2017/0119979 A1 5/2017 Davidson et al.
2017/0143042 A1 5/2017 Batista et al.
2017/0144827 A1 5/2017 Batista
2017/0164657 A1 6/2017 Batista
2017/0196262 A1 7/2017 Brereton et al.
2017/0215477 A1 8/2017 Reevell
2017/0215478 A1 8/2017 Harrison et al.
2017/0231276 A1 8/2017 Mironov et al.
2017/0265525 A1 9/2017 Li et al.
2017/0281846 A1 10/2017 Manda et al.
2017/0311648 A1 11/2017 Gill et al.
2018/0007960 A1 1/2018 Suzuki et al.
2018/0007968 A1 1/2018 Sur
2018/0008795 A1 1/2018 Smith et al.
2018/0021500 A1 1/2018 Gerber et al.
2018/0021501 A1 1/2018 Gerber et al.
2018/0043081 A1 2/2018 Lura et al.
2018/0070632 A1 3/2018 Sur et al.
2018/0084831 A1 3/2018 Mironov
2018/0092405 A1 4/2018 Monsees et al.
2018/0092406 A1 4/2018 Monsees et al.
2018/0104214 A1 4/2018 Raichman
2018/0126096 A1 5/2018 Norman et al.
2018/0132526 A1 5/2018 Davis et al.
2018/0132528 A1 5/2018 Sur et al.
2018/0132529 A1 5/2018 Sur et al.
2018/0147384 A1 5/2018 Menzel et al.
2018/0192700 A1 7/2018 Fraser et al.
2018/0192708 A1 7/2018 Hawes et al.
2018/0214645 A1 8/2018 Reevell
2018/0235279 A1 8/2018 Wilke et al.
2018/0242644 A1 8/2018 Bessant et al.
2018/0263286 A1 9/2018 Reevell
2018/0271150 A1 9/2018 Sparklin et al.
2018/0271151 A1 9/2018 Litten
2018/0279672 A1 10/2018 Davis et al.
2018/0289060 A1 10/2018 Chen et al.
2018/0295885 A1 10/2018 Rojo-Calderon et al.
2018/0296779 A1 10/2018 Takeuchi et al.
2018/0325181 A1 11/2018 Liu
2018/0361334 A1 12/2018 Bahabri
2019/0014617 A1 1/2019 Bilat
2019/0059446 A1 2/2019 Kessler et al.
2019/0059448 A1* 2/2019 Talon .................. H05B 1/0244
2019/0082736 A1 3/2019 Sur
2019/0090542 A1 3/2019 Harrison et al.
2019/0098938 A1 4/2019 Griffith, Jr. et al.
2019/0117915 A1 4/2019 Raichman
2019/0133192 A1 5/2019 Lord et al.
2019/0145331 A1 5/2019 Dudar
2019/0159519 A1 5/2019 Bowen et al.
2019/0160242 A1 5/2019 Schwaibold et al.
2019/0166654 A1 5/2019 Cheng et al.
2019/0166916 A1 6/2019 Robinson et al.
2019/0166917 A1 6/2019 Robinson et al.
2019/0190088 A1 6/2019 Leadley
2019/0200677 A1 7/2019 Chong et al.
2019/0208816 A1 7/2019 Thorsen
2019/0208823 A1 7/2019 Raichman
2019/0216136 A1 7/2019 Capuano
2019/0224430 A1 7/2019 Raichman
2019/0230992 A1 8/2019 Blick et al.
2019/0239566 A1 8/2019 Alarcon et al.
2019/0239571 A1 8/2019 Bellinger et al.
2019/0261689 A1 8/2019 Bowen et al.
2019/0274354 A1 9/2019 Sur et al.
2019/0289908 A1 9/2019 Worm et al.
2019/0290064 A1 9/2019 Colston et al.
2019/0297951 A1 10/2019 Kuczaj
2019/0313698 A1 10/2019 Kuczaj
2019/0314585 A1 10/2019 Rostami et al.
2019/0343179 A1 11/2019 Sur
2019/0343187 A1 11/2019 Bellinger et al.
2019/0350257 A1 11/2019 Sur
2019/0369127 A1 12/2019 Fu et al.
2019/0380389 A1 12/2019 Hong et al.
2019/0387795 A1 12/2019 Fisher et al.
2019/0387803 A1 12/2019 Yamada et al.
2020/0008494 A1 1/2020 Rostami et al.
2020/0009336 A1 1/2020 Feng
2020/0016305 A1 1/2020 Weinberg
2020/0022408 A1 1/2020 Kolyris

(56) References Cited

U.S. PATENT DOCUMENTS

| | | | | |
|---|---|---|---|---|
| 2020/0037664 | A1 | 2/2020 | Fursa et al. | |
| 2020/0046033 | A1 | 2/2020 | Robert et al. | |
| 2020/0085099 | A1 | 3/2020 | Soriano et al. | |
| 2020/0085100 | A1 | 3/2020 | Hoffman | |
| 2020/0093181 | A1 | 3/2020 | Hubbard et al. | |
| 2020/0093187 | A1 | 3/2020 | Dickens | |
| 2020/0107581 | A1 | 4/2020 | Akao et al. | |
| 2020/0120988 | A1 | 4/2020 | Qiu | |
| 2020/0128884 | A1 | 4/2020 | Yamada et al. | |
| 2020/0129927 | A1 | 4/2020 | Sendelius et al. | |
| 2020/0146355 | A1 | 5/2020 | Sears et al. | |
| 2020/0154770 | A1 | 5/2020 | Hepworth et al. | |
| 2020/0154772 | A1 | 5/2020 | Lim et al. | |
| 2020/0154773 | A1 | 5/2020 | Lim et al. | |
| 2020/0154787 | A1 | 5/2020 | Novak, III et al. | |
| 2020/0154788 | A1 | 5/2020 | Novak, III et al. | |
| 2020/0178600 | A1 | 6/2020 | Phillips et al. | |
| 2020/0187556 | A1 | 6/2020 | Raichman | |
| 2020/0187557 | A1 | 6/2020 | Liu | |
| 2020/0187563 | A1 | 6/2020 | Raichman | |
| 2020/0196672 | A1 | 6/2020 | Mizuguchi et al. | |
| 2020/0214348 | A1 | 7/2020 | Davis et al. | |
| 2020/0221779 | A1* | 7/2020 | Fu | A24F 40/40 |
| 2020/0221782 | A1 | 7/2020 | Lim | |
| 2020/0229509 | A1 | 7/2020 | Griscik et al. | |
| 2020/0230387 | A1 | 7/2020 | Narayanasa et al. | |
| 2020/0237009 | A1 | 7/2020 | Akao et al. | |
| 2020/0237010 | A1 | 7/2020 | Yamada et al. | |
| 2020/0237011 | A1 | 7/2020 | Akao et al. | |
| 2020/0237017 | A1 | 7/2020 | Tu | |
| 2020/0238027 | A1 | 7/2020 | Raichman | |
| 2020/0245686 | A1 | 8/2020 | Gill | |
| 2020/0245696 | A1 | 8/2020 | Sur | |
| 2020/0253287 | A1 | 8/2020 | Sur | |
| 2020/0260528 | A1 | 8/2020 | Shoched | |
| 2020/0269006 | A1 | 8/2020 | Burgess et al. | |
| 2020/0275697 | A1 | 9/2020 | Hawes et al. | |
| 2020/0275707 | A1 | 9/2020 | Courbat | |
| 2020/0282156 | A1 | 9/2020 | Potter et al. | |
| 2020/0282157 | A1 | 9/2020 | Yamada et al. | |
| 2020/0282171 | A1 | 9/2020 | Al-Jumaily et al. | |
| 2020/0305503 | A1 | 10/2020 | Chen et al. | |
| 2020/0305506 | A1 | 10/2020 | Borkovec | |
| 2020/0305508 | A1 | 10/2020 | Talon | |
| 2020/0305509 | A1 | 10/2020 | Chen et al. | |
| 2020/0305510 | A1 | 10/2020 | Qiu et al. | |
| 2020/0305512 | A1 | 10/2020 | Lim et al. | |
| 2020/0306405 | A1 | 10/2020 | Nixon et al. | |
| 2020/0315247 | A1 | 10/2020 | Benjamignan et al. | |
| 2020/0315851 | A1 | 10/2020 | Gharib et al. | |
| 2020/0323269 | A1 | 10/2020 | Chen et al. | |
| 2020/0329766 | A1 | 10/2020 | Doyle et al. | |
| 2020/0329775 | A1 | 10/2020 | Doyle et al. | |
| 2020/0329776 | A1 | 10/2020 | Lee | |
| 2020/0338284 | A1 | 10/2020 | Yamada et al. | |
| 2020/0338285 | A1 | 10/2020 | Yamada et al. | |
| 2020/0338298 | A1 | 10/2020 | Smith et al. | |
| 2020/0338299 | A1 | 10/2020 | Bath et al. | |
| 2020/0352246 | A1 | 11/2020 | Yamada et al. | |
| 2020/0367569 | A1 | 11/2020 | Farine | |
| 2020/0367570 | A1* | 11/2020 | Batista | A24F 40/57 |
| 2020/0368462 | A1 | 11/2020 | Lee et al. | |
| 2020/0384253 | A1 | 12/2020 | Fia et al. | |
| 2020/0397054 | A1 | 12/2020 | Riva Reggiori et al. | |
| 2020/0404975 | A1 | 12/2020 | Chen et al. | |
| 2020/0405981 | A1 | 12/2020 | Chen et al. | |
| 2020/0405984 | A1 | 12/2020 | Huby et al. | |
| 2021/0007393 | A1 | 1/2021 | Jung et al. | |
| 2021/0007402 | A1 | 1/2021 | Qiu et al. | |
| 2021/0007408 | A1 | 1/2021 | Nakano et al. | |
| 2021/0007409 | A1 | 1/2021 | Nakano et al. | |
| 2021/0007410 | A1 | 1/2021 | Nakano et al. | |
| 2021/0007411 | A1 | 1/2021 | Nakano et al. | |
| 2021/0007412 | A1 | 1/2021 | Nakano et al. | |
| 2021/0015157 | A1 | 1/2021 | Bleloch et al. | |
| 2021/0015159 | A1 | 1/2021 | Jeong et al. | |
| 2021/0015165 | A1 | 1/2021 | He | |
| 2021/0015166 | A1 | 1/2021 | Lee | |
| 2021/0015168 | A1 | 1/2021 | Batista et al. | |
| 2021/0016028 | A1 | 1/2021 | Cho | |
| 2021/0022405 | A1 | 1/2021 | Yamada et al. | |
| 2021/0022409 | A1 | 1/2021 | Chia et al. | |
| 2021/0029786 | A1 | 1/2021 | Lee | |
| 2021/0030065 | A1 | 2/2021 | Bless et al. | |
| 2021/0030070 | A1 | 2/2021 | Sun et al. | |
| 2021/0030071 | A1 | 2/2021 | Reevell | |
| 2021/0037890 | A1 | 2/2021 | Du et al. | |
| 2021/0045452 | A1 | 2/2021 | Barbaric et al. | |
| 2021/0046259 | A1 | 2/2021 | Hasegawa et al. | |
| 2021/0052005 | A1 | 2/2021 | Buchberger et al. | |
| 2021/0052829 | A1 | 2/2021 | Dignum et al. | |
| 2021/0068463 | A1 | 3/2021 | Parry et al. | |
| 2021/0068465 | A1 | 3/2021 | Malamud et al. | |
| 2021/0076736 | A1 | 3/2021 | Fernando et al. | |
| 2021/0076743 | A1 | 3/2021 | Gill | |
| 2021/0084964 | A1 | 3/2021 | Matsumoto et al. | |
| 2021/0084985 | A1 | 3/2021 | Akao et al. | |
| 2021/0084986 | A1 | 3/2021 | Hepworth et al. | |
| 2021/0093009 | A1 | 4/2021 | Park et al. | |
| 2021/0093013 | A1 | 4/2021 | Potter | |
| 2021/0093803 | A1 | 4/2021 | Haid et al. | |
| 2021/0100291 | A1 | 4/2021 | Sur | |
| 2021/0106067 | A1 | 4/2021 | Keen et al. | |
| 2021/0106775 | A1 | 4/2021 | Hasegawa et al. | |
| 2021/0112860 | A1 | 4/2021 | Griffith, Jr. et al. | |
| 2021/0112874 | A1 | 4/2021 | Atkins et al. | |
| 2021/0120875 | A1 | 4/2021 | Mironov | |
| 2021/0127747 | A1 | 5/2021 | Krietzman | |
| 2021/0127748 | A1 | 5/2021 | Lim et al. | |
| 2021/0127750 | A1 | 5/2021 | Fernando et al. | |
| 2021/0127756 | A1 | 5/2021 | Sur et al. | |
| 2021/0137169 | A1 | 5/2021 | Lee | |
| 2021/0137170 | A1 | 5/2021 | Taurino et al. | |
| 2021/0145044 | A1 | 5/2021 | Batista et al. | |
| 2021/0145066 | A1 | 5/2021 | Bilat et al. | |
| 2021/0145068 | A1 | 5/2021 | Bessant et al. | |
| 2021/0145070 | A1* | 5/2021 | Bilat | A24F 40/50 |
| 2021/0145074 | A1 | 5/2021 | Atkins et al. | |
| 2021/0159711 | A1 | 5/2021 | Yamada et al. | |
| 2021/0161214 | A1 | 6/2021 | Bilat | |
| 2021/0161215 | A1 | 6/2021 | Sur | |
| 2021/0169145 | A1 | 6/2021 | Lee et al. | |
| 2021/0169148 | A1 | 6/2021 | Nakano et al. | |
| 2021/0169150 | A1 | 6/2021 | Zominy | |
| 2021/0170124 | A1 | 6/2021 | Katayama et al. | |
| 2021/0177065 | A1 | 6/2021 | Lee | |
| 2021/0186108 | A1 | 6/2021 | Korus et al. | |
| 2021/0186113 | A1 | 6/2021 | Lee | |
| 2021/0186114 | A1 | 6/2021 | Lee | |
| 2021/0195948 | A1 | 7/2021 | Bilat et al. | |
| 2021/0195960 | A1 | 7/2021 | Qiu et al. | |
| 2021/0195961 | A1 | 7/2021 | Marubashi et al. | |
| 2021/0204608 | A1 | 7/2021 | Wang et al. | |
| 2021/0204609 | A1 | 7/2021 | Bilat et al. | |
| 2021/0204611 | A1 | 7/2021 | Lee | |
| 2021/0212374 | A1 | 7/2021 | Li | |
| 2021/0212381 | A1 | 7/2021 | Lau et al. | |
| 2021/0212383 | A1 | 7/2021 | Li | |
| 2021/0219386 | A1 | 7/2021 | Atkins et al. | |
| 2021/0219617 | A1 | 7/2021 | Lee et al. | |
| 2021/0219618 | A1 | 7/2021 | Fernando et al. | |
| 2021/0220534 | A1 | 7/2021 | Balluff et al. | |
| 2021/0227638 | A1 | 7/2021 | DePiano et al. | |
| 2021/0227889 | A1 | 7/2021 | Lim et al. | |
| 2021/0227890 | A1 | 7/2021 | Li | |
| 2021/0228793 | A1 | 7/2021 | Scarpaci et al. | |
| 2021/0228833 | A1 | 7/2021 | Alshut et al. | |
| 2021/0235767 | A1 | 8/2021 | Akao et al. | |
| 2021/0235768 | A1 | 8/2021 | Akao et al. | |
| 2021/0235769 | A1 | 8/2021 | Marubashi et al. | |
| 2021/0236751 | A1 | 8/2021 | Lamb et al. | |
| 2021/0243842 | A1 | 8/2021 | Kondo | |
| 2021/0244094 | A1 | 8/2021 | Gallagher et al. | |
| 2021/0244095 | A1 | 8/2021 | Gallagher et al. | |

(56) References Cited

U.S. PATENT DOCUMENTS

2021/0249877 A1 8/2021 Yamada et al.
2021/0249878 A1 8/2021 Yamada et al.
2021/0251044 A1 8/2021 Reevell
2021/0251298 A1 8/2021 Qiu et al.
2021/0251299 A1 8/2021 Seo et al.
2021/0252240 A1 8/2021 Tang et al.
2021/0259315 A1 8/2021 Lin et al.
2021/0259322 A1 8/2021 Nakano et al.
2021/0259876 A1 8/2021 Knott et al.
2021/0260314 A1 8/2021 Bath et al.
2021/0260330 A1 8/2021 Liu et al.
2021/0268216 A1 9/2021 Sur
2021/0274850 A1 9/2021 Marubashi
2021/0282466 A1 9/2021 Marubashi et al.
2021/0289839 A1 9/2021 Jang et al.
2021/0289845 A1 9/2021 Silvestrini et al.
2021/0297489 A1 9/2021 Woodbine et al.
2021/0298352 A1 9/2021 Arabia
2021/0298357 A1 9/2021 Pifa et al.
2021/0298364 A1 9/2021 Yu et al.
2021/0298365 A1 9/2021 Huang et al.
2021/0307397 A1 10/2021 Liu
2021/0307407 A1 10/2021 Jang et al.
2021/0321674 A1 10/2021 Henry, Jr.
2021/0321675 A1 10/2021 Zhu et al.
2021/0322688 A1 10/2021 Raichman
2021/0322711 A1 10/2021 De-Stefani
2021/0322713 A1 10/2021 Payton et al.
2021/0329974 A1 10/2021 Holzherr
2021/0345671 A1 11/2021 Liu et al.
2021/0345680 A1 11/2021 Liu
2021/0346636 A1 11/2021 Menzel et al.
2021/0352954 A1 11/2021 Robinson et al.
2021/0352966 A1 11/2021 Reevell
2021/0368865 A1 12/2021 Ki et al.
2021/0369985 A1 12/2021 Atkins et al.
2021/0378314 A1 12/2021 Choi
2021/0379257 A1 12/2021 Pouchoulin et al.
2021/0386124 A1 12/2021 Antonopoulos et al.
2021/0401048 A1 12/2021 Egoyants et al.
2021/0401057 A1 12/2021 Chen et al.
2021/0401059 A1 12/2021 Sebastian et al.
2021/0401061 A1 12/2021 Davis et al.
2021/0401062 A1 12/2021 Liu et al.
2022/0007740 A1 1/2022 Lin et al.
2022/0008670 A1 1/2022 Garg et al.
2022/0015425 A1 1/2022 Gallagher et al.
2022/0015428 A1 1/2022 Lacovara
2022/0015443 A1 1/2022 Lacovara
2022/0015446 A1 1/2022 Akao et al.
2022/0022549 A1 1/2022 Lin et al.
2022/0022550 A1 1/2022 Beard et al.
2022/0023556 A1 1/2022 Bowen et al.
2022/0023581 A1 1/2022 Bath et al.
2022/0030946 A1 2/2022 Zinovik et al.
2022/0030947 A1 2/2022 Zinovik et al.
2022/0030954 A1 2/2022 Rath et al.
2022/0031972 A1 2/2022 Davidson et al.
2022/0039480 A1 2/2022 Cho et al.
2022/0039481 A1 2/2022 Lin et al.
2022/0040435 A1 2/2022 Payton et al.
2022/0047790 A1 2/2022 Friederichs et al.
2022/0061396 A1 3/2022 Lord et al.
2022/0061398 A1 3/2022 Zhu et al.
2022/0071293 A1 3/2022 Lim
2022/0071297 A1 3/2022 Aradachi
2022/0071298 A1 3/2022 Aradachi
2022/0071300 A1 3/2022 Fujita et al.
2022/0071301 A1 3/2022 Jung et al.
2022/0072265 A1 3/2022 Kim
2022/0077698 A1 3/2022 Aradachi
2022/0079239 A1 3/2022 Lim, II et al.
2022/0087321 A1 3/2022 Jeong et al.
2022/0095690 A1 3/2022 Marubashi
2022/0095696 A1 3/2022 Lin et al.
2022/0110373 A1 4/2022 Kim et al.
2022/0117307 A1 4/2022 Abi Aoun et al.
2022/0117310 A1 4/2022 Nelson et al.
2022/0117312 A1 4/2022 Jeong et al.
2022/0118201 A1 4/2022 Novak, III et al.
2022/0125110 A1 4/2022 Frake
2022/0125121 A1 4/2022 Mizuguchi et al.
2022/0125122 A1 4/2022 Robert et al.
2022/0125123 A1 4/2022 Lee et al.
2022/0125124 A1* 4/2022 Cho ........................ A24F 40/53
2022/0126036 A1 4/2022 Rubin
2022/0132936 A1 5/2022 Lee et al.
2022/0142249 A1 5/2022 Lim et al.
2022/0142259 A1 5/2022 Li et al.
2022/0151036 A1 5/2022 Sebastian et al.
2022/0151303 A1 5/2022 Carman
2022/0151304 A1 5/2022 Xiao et al.
2022/0159793 A1 5/2022 Stura et al.
2022/0160043 A1 5/2022 Wu et al.
2022/0160051 A1 5/2022 Frake et al.
2022/0160987 A1 5/2022 Barker et al.
2022/0167656 A1 6/2022 Robinson et al.
2022/0175038 A1 6/2022 Lin et al.
2022/0176046 A1 6/2022 Hon et al.
2022/0183377 A1 6/2022 Blandino et al.
2022/0183382 A1 6/2022 Lee et al.
2022/0183386 A1 6/2022 Sutton
2022/0183387 A1 6/2022 Talbot
2022/0192273 A1 6/2022 Yan et al.
2022/0192274 A1 6/2022 Lin et al.
2022/0192275 A1 6/2022 Lin et al.
2022/0202101 A1 6/2022 Lin et al.
2022/0211102 A1 7/2022 Capelli et al.
2022/0211117 A1 7/2022 Lin et al.
2022/0211964 A1 7/2022 Creusot et al.
2022/0218021 A1 7/2022 Peleg et al.
2022/0218039 A1 7/2022 Goldschmidtboeing et al.
2022/0218041 A1 7/2022 Sur et al.
2022/0218515 A1 7/2022 Daffer
2022/0225665 A1 7/2022 Zominy
2022/0225667 A1 7/2022 Blackmon et al.
2022/0225670 A1 7/2022 Blackmon et al.
2022/0225671 A1 7/2022 Blackmon
2022/0225672 A1 7/2022 Hawes et al.
2022/0225685 A1 7/2022 Blackmon et al.
2022/0229453 A1 7/2022 Blackmon et al.
2022/0232889 A1 7/2022 Zinovik
2022/0232895 A1 7/2022 Zhou et al.
2022/0232898 A1 7/2022 Lin et al.
2022/0240573 A1 8/2022 Fu et al.
2022/0240585 A1 8/2022 Horrod et al.
2022/0241523 A1 8/2022 Davidson et al.
2022/0248762 A1 8/2022 Hupkes
2022/0248769 A1 8/2022 Li et al.
2022/0249941 A1 8/2022 Bowen et al.
2022/0256927 A1 8/2022 Bergstrom et al.
2022/0256928 A1 8/2022 Lin et al.
2022/0264958 A1 8/2022 Marubashi
2022/0265941 A1 8/2022 Lipowicz
2022/0273041 A1 9/2022 Quintana
2022/0273043 A1 9/2022 Hawes et al.
2022/0278618 A1 9/2022 Lin et al.
2022/0279859 A1 9/2022 Cho et al.
2022/0287368 A1 9/2022 Garcia-Doty
2022/0287373 A1 9/2022 Lin et al.
2022/0295902 A1 9/2022 Lim
2022/0296846 A1 9/2022 Liu
2022/0312853 A1 10/2022 Aradachi
2022/0313882 A1 10/2022 Lindo et al.
2022/0322746 A1 10/2022 Talon
2022/0322748 A1 10/2022 Lin et al.
2022/0322749 A1 10/2022 Park et al.
2022/0331550 A1 10/2022 Yang et al.
2022/0338552 A1 10/2022 Park et al.
2022/0346447 A1 11/2022 Hupkes
2022/0347448 A1 11/2022 Fia et al.
2022/0353958 A1 11/2022 Rossoll et al.
2022/0354171 A1 11/2022 Hawes et al.
2022/0354175 A1 11/2022 Fu et al.

(56) References Cited

U.S. PATENT DOCUMENTS

| | | | | |
|---|---|---|---|---|
| 2022/0354182 | A1 | 11/2022 | Courbat et al. | |
| 2022/0355050 | A1 | 11/2022 | Bath et al. | |
| 2022/0357395 | A1 | 11/2022 | Novak, III et al. | |
| 2022/0360103 | A1 | 11/2022 | Mntola et al. | |
| 2022/0361580 | A1 | 11/2022 | Cho et al. | |
| 2022/0361583 | A1 | 11/2022 | Lee et al. | |
| 2022/0361587 | A1 | 11/2022 | Yang et al. | |
| 2022/0369427 | A1 | 11/2022 | Thorsen | |
| 2022/0369705 | A1 | 11/2022 | Besso et al. | |
| 2022/0378095 | A1 | 12/2022 | Bowen et al. | |
| 2022/0378108 | A1 | 12/2022 | Cho et al. | |
| 2022/0378109 | A1 | 12/2022 | Lee | |
| 2022/0378110 | A1 | 12/2022 | Yu et al. | |
| 2022/0378112 | A1 | 12/2022 | Aradachi | |
| 2022/0386701 | A1 | 12/2022 | Nakano et al. | |
| 2022/0386704 | A1 | 12/2022 | Courbat et al. | |
| 2022/0386706 | A1 | 12/2022 | Li | |
| 2022/0388831 | A1 | 12/2022 | Yu | |
| 2022/0395028 | A1 | 12/2022 | Lee et al. | |
| 2022/0400535 | A1 | 12/2022 | Kim | |
| 2022/0400749 | A1 | 12/2022 | Park et al. | |
| 2022/0400765 | A1 | 12/2022 | Capuano | |
| 2022/0400766 | A1 | 12/2022 | Ono et al. | |
| 2022/0400770 | A1 | 12/2022 | Ono et al. | |
| 2022/0400773 | A1 | 12/2022 | Kim et al. | |
| 2022/0408804 | A1 | 12/2022 | Park et al. | |
| 2022/0408829 | A1 | 12/2022 | Nelson et al. | |
| 2022/0408834 | A1 | 12/2022 | Kim et al. | |
| 2022/0408835 | A1 | 12/2022 | Chen | |
| 2022/0409875 | A1 | 12/2022 | Coll et al. | |
| 2023/0000152 | A1 | 1/2023 | Tezuka et al. | |
| 2023/0000166 | A1 | 1/2023 | Lee et al. | |
| 2023/0000170 | A1 | 1/2023 | Fallon et al. | |
| 2023/0000172 | A1 | 1/2023 | Tezuka et al. | |
| 2023/0007735 | A1 | 1/2023 | Hatton et al. | |
| 2023/0009690 | A1 | 1/2023 | Pilatowicz | |
| 2023/0012023 | A1 | 1/2023 | Kabirat et al. | |
| 2023/0013486 | A1 | 1/2023 | Kim et al. | |
| 2023/0014444 | A1 | 1/2023 | Chen et al. | |
| 2023/0017816 | A1 | 1/2023 | Jung | |
| 2023/0020117 | A1 | 1/2023 | Takeuchi et al. | |
| 2023/0022277 | A1 | 1/2023 | Belcastro et al. | |
| 2023/0023805 | A1 | 1/2023 | Jacobs, Jr. et al. | |
| 2023/0036069 | A1 | 2/2023 | Krietzman | |
| 2023/0042987 | A1 | 2/2023 | O'Hare et al. | |
| 2023/0043830 | A1 | 2/2023 | Valentine | |
| 2023/0046048 | A1 | 2/2023 | Li et al. | |
| 2023/0048555 | A1 | 2/2023 | Chen et al. | |
| 2023/0049982 | A1 | 2/2023 | Ti et al. | |
| 2023/0051019 | A1 | 2/2023 | Gill | |
| 2023/0070749 | A1 | 3/2023 | Ma | |
| 2023/0070999 | A1 | 3/2023 | Fallman et al. | |
| 2023/0071524 | A1 | 3/2023 | Batista | |
| 2023/0080441 | A1 | 3/2023 | Bath et al. | |
| 2023/0086895 | A1 | 3/2023 | Fujita | |
| 2023/0091282 | A1 | 3/2023 | Kaihatsu et al. | |
| 2023/0093846 | A1 * | 3/2023 | Cho | A24F 40/10<br>131/329 |
| 2023/0096029 | A1 | 3/2023 | Lee et al. | |
| 2023/0096771 | A1 | 3/2023 | Garcia Garcia | |
| 2023/0098585 | A1 | 3/2023 | Cadieux et al. | |
| 2023/0098940 | A1 | 3/2023 | Lee | |
| 2023/0102556 | A1 | 3/2023 | Kaihatsu et al. | |
| 2023/0102855 | A1 | 3/2023 | Fujita et al. | |
| 2023/0108105 | A1 | 4/2023 | Kim et al. | |
| 2023/0109789 | A1 | 4/2023 | Nakano et al. | |
| 2023/0112360 | A1 | 4/2023 | Lee et al. | |
| 2023/0112731 | A1 | 4/2023 | Han et al. | |
| 2023/0113304 | A1 | 4/2023 | Kim et al. | |
| 2023/0113365 | A1 | 4/2023 | Liu | |
| 2023/0119000 | A1 | 4/2023 | Borkovec et al. | |
| 2023/0120779 | A1 | 4/2023 | Wen et al. | |
| 2023/0122097 | A1 | 4/2023 | Garcia Garcia | |
| 2023/0126094 | A1 | 4/2023 | Li et al. | |
| 2023/0127267 | A1 | 4/2023 | Moloney et al. | |
| 2023/0127975 | A1 | 4/2023 | Moloney et al. | |
| 2023/0128410 | A1 | 4/2023 | Lee et al. | |
| 2023/0129806 | A1 | 4/2023 | Popoola et al. | |
| 2023/0138171 | A1 | 5/2023 | Hu et al. | |
| 2023/0139031 | A1 | 5/2023 | Hawes | |
| 2023/0139744 | A1 | 5/2023 | Kohbodi | |
| 2023/0140672 | A1 | 5/2023 | Klasek et al. | |
| 2023/0141960 | A1 | 5/2023 | Cho et al. | |
| 2023/0142151 | A1 | 5/2023 | Amir | |
| 2023/0148675 | A1 | 5/2023 | Lee | |
| 2023/0148678 | A1 | 5/2023 | Zominy | |
| 2023/0148679 | A1 | 5/2023 | Lee | |
| 2023/0148680 | A1 | 5/2023 | Cui et al. | |
| 2023/0157364 | A1 | 5/2023 | Thorsen | |
| 2023/0157370 | A1 | 5/2023 | Moloney et al. | |
| 2023/0165314 | A1 | 6/2023 | Yan et al. | |
| 2023/0165315 | A1 | 6/2023 | Chen et al. | |
| 2023/0165993 | A1 | 6/2023 | O'Donnell et al. | |
| 2023/0166055 | A1 | 6/2023 | Atkins et al. | |
| 2023/0166060 | A1 | 6/2023 | Bowen et al. | |
| 2023/0166064 | A1 | 6/2023 | Liang et al. | |
| 2023/0171852 | A1 | 6/2023 | Davis et al. | |
| 2023/0172281 | A1 | 6/2023 | Lei et al. | |
| 2023/0172282 | A1 | 6/2023 | Cho et al. | |
| 2023/0180846 | A1 | 6/2023 | Qiu et al. | |
| 2023/0180848 | A1 | 6/2023 | Reevell | |
| 2023/0180850 | A1 | 6/2023 | Mlmaz et al. | |
| 2023/0182158 | A1 | 6/2023 | Zuo et al. | |
| 2023/0187956 | A1 | 6/2023 | Akao | |
| 2023/0201488 | A1 | 6/2023 | Hatton et al. | |
| 2023/0201494 | A1 | 6/2023 | Bleloch et al. | |
| 2023/0208160 | A1 | 6/2023 | Colotte et al. | |
| 2023/0210190 | A1 | 7/2023 | Su et al. | |
| 2023/0225420 | A1 | 7/2023 | Zainuddin et al. | |
| 2023/0232886 | A1 | 7/2023 | Robinson et al. | |
| 2023/0240372 | A1 | 8/2023 | Dendy et al. | |
| 2023/0240375 | A1 | 8/2023 | Lin et al. | |
| 2023/0240379 | A1 | 8/2023 | Akao et al. | |
| 2023/0247095 | A1 | 8/2023 | Woodbine et al. | |
| 2023/0248070 | A1 | 8/2023 | Gallagher et al. | |
| 2023/0248071 | A1 | 8/2023 | Kuczaj | |
| 2023/0248072 | A1 | 8/2023 | Gallagher et al. | |
| 2023/0248923 | A1 | 8/2023 | Keen | |
| 2023/0254945 | A1 | 8/2023 | Krietzman | |
| 2023/0397660 | A1 * | 12/2023 | Decker | A24F 40/46 |

FOREIGN PATENT DOCUMENTS

| | | | |
|---|---|---|---|
| CN | 103974638 | A | 8/2014 |
| CN | 203986136 | U | 12/2014 |
| CN | 104349687 | A | 2/2015 |
| CN | 106793836 | A | 5/2017 |
| CN | 108143009 | A | 6/2018 |
| CN | 109619695 | A | 4/2019 |
| CN | 110200329 | A | 9/2019 |
| CN | 112203540 | A | 1/2021 |
| EP | 0525720 | A1 | 2/1993 |
| EP | 637212 | B1 | 9/1999 |
| EP | 1007124 | A1 | 6/2000 |
| EP | 1029451 | A1 | 8/2000 |
| EP | 1346606 | A2 | 9/2003 |
| EP | 1385595 | A2 | 2/2004 |
| EP | 0973419 | B1 | 12/2004 |
| EP | 1504768 | A1 | 2/2005 |
| EP | 1126892 | B1 | 4/2007 |
| EP | 1947965 | B1 | 2/2010 |
| EP | 2257195 | B1 | 6/2012 |
| EP | 2460423 | A1 | 6/2012 |
| EP | 2609820 | A1 | 7/2013 |
| EP | 2720732 | B1 | 8/2015 |
| EP | 2903466 | A1 | 8/2015 |
| EP | 2741626 | B1 | 12/2015 |
| EP | 3043663 | A2 | 7/2016 |
| EP | 2833744 | B1 | 8/2016 |
| EP | 3066942 | A1 | 9/2016 |
| EP | 2797444 | B1 | 10/2016 |
| EP | 2895930 | B1 | 11/2016 |
| EP | 2967156 | B1 | 11/2016 |
| EP | 3116334 | A1 | 1/2017 |

(56) References Cited

FOREIGN PATENT DOCUMENTS

| | | | |
|---|---|---|---|
| EP | 2432339 | B1 | 3/2017 |
| EP | 3002657 | B1 | 3/2017 |
| EP | 2879533 | B1 | 4/2017 |
| EP | 2967140 | B1 | 5/2017 |
| EP | 3180997 | A1 | 6/2017 |
| EP | 3182847 | A1 | 6/2017 |
| EP | 2797447 | B1 | 7/2017 |
| EP | 2083643 | B1 | 9/2017 |
| EP | 2797446 | B1 | 10/2017 |
| EP | 2950675 | B1 | 10/2017 |
| EP | 3248482 | A1 | 11/2017 |
| EP | 3266322 | A1 | 1/2018 |
| EP | 2903465 | B1 | 3/2018 |
| EP | 3288403 | A1 | 3/2018 |
| EP | 3039974 | B1 | 4/2018 |
| EP | 3125706 | B1 | 5/2018 |
| EP | 2856893 | B1 | 6/2018 |
| EP | 3042576 | B1 | 6/2018 |
| EP | 2856893 | B8 | 7/2018 |
| EP | 3348154 | A1 | 7/2018 |
| EP | 3209150 | B1 | 8/2018 |
| EP | 3166426 | B1 | 9/2018 |
| EP | 3206513 | B1 | 9/2018 |
| EP | 3372098 | A2 | 9/2018 |
| EP | 2770859 | B1 | 12/2018 |
| EP | 3100623 | B1 | 12/2018 |
| EP | 2921064 | B1 | 1/2019 |
| EP | 2645892 | B1 | 3/2019 |
| EP | 3228199 | B1 | 3/2019 |
| EP | 2835063 | B1 | 4/2019 |
| EP | 3471803 | A1 | 4/2019 |
| EP | 3032975 | B1 | 5/2019 |
| EP | 3054798 | B1 | 5/2019 |
| EP | 3331389 | B1 | 5/2019 |
| EP | 3479456 | A1 | 5/2019 |
| EP | 3487326 | A1 | 5/2019 |
| EP | 3116334 | B1 | 6/2019 |
| EP | 3138424 | B1 | 6/2019 |
| EP | 3282871 | B1 | 6/2019 |
| EP | 3493869 | A2 | 6/2019 |
| EP | 2797448 | B2 | 7/2019 |
| EP | 3512369 | A1 | 7/2019 |
| EP | 2915443 | B1 | 8/2019 |
| EP | 3250275 | B1 | 8/2019 |
| EP | 3320792 | B1 | 8/2019 |
| EP | 3524071 | A1 | 8/2019 |
| EP | 3039973 | B1 | 9/2019 |
| EP | 3387924 | B1 | 9/2019 |
| EP | 3536179 | A1 | 9/2019 |
| EP | 3210480 | B1 | 11/2019 |
| EP | 3325068 | B1 | 11/2019 |
| EP | 3365051 | B1 | 11/2019 |
| EP | 3397097 | B1 | 11/2019 |
| EP | 3566595 | A1 | 11/2019 |
| EP | 3569081 | A1 | 11/2019 |
| EP | 3571941 | A1 | 11/2019 |
| EP | 3142502 | B1 | 12/2019 |
| EP | 3400815 | A4 | 12/2019 |
| EP | 3574780 | A1 | 12/2019 |
| EP | 3597054 | A1 | 1/2020 |
| EP | 2967144 | B1 | 2/2020 |
| EP | 3145339 | B1 | 2/2020 |
| EP | 3228198 | B1 | 2/2020 |
| EP | 3402349 | B1 | 2/2020 |
| EP | 3610742 | A2 | 2/2020 |
| EP | 3299053 | B1 | 3/2020 |
| EP | 3445429 | B1 | 3/2020 |
| EP | 3618648 | A1 | 3/2020 |
| EP | 3626279 | A1 | 3/2020 |
| EP | 3151690 | B1 | 4/2020 |
| EP | 3410876 | B1 | 4/2020 |
| EP | 3419448 | B1 | 4/2020 |
| EP | 3630241 | A1 | 4/2020 |
| EP | 3632234 | A1 | 4/2020 |
| EP | 3632236 | A1 | 4/2020 |
| EP | 3632243 | A1 | 4/2020 |
| EP | 3141135 | B1 | 5/2020 |
| EP | 3426074 | B1 | 5/2020 |
| EP | 3491944 | B1 | 5/2020 |
| EP | 3518377 | B1 | 5/2020 |
| EP | 3646741 | A1 | 5/2020 |
| EP | 3646742 | A1 | 5/2020 |
| EP | 3656427 | A1 | 5/2020 |
| EP | 2964037 | B1 | 6/2020 |
| EP | 3222159 | B1 | 6/2020 |
| EP | 3490394 | B1 | 6/2020 |
| EP | 3665768 | A1 | 6/2020 |
| EP | 3669677 | A1 | 6/2020 |
| EP | 3677129 | A1 | 7/2020 |
| EP | 3682750 | A1 | 7/2020 |
| EP | 3683919 | A1 | 7/2020 |
| EP | 3685686 | A1 | 7/2020 |
| EP | 3515217 | B1 | 8/2020 |
| EP | 3692827 | A1 | 8/2020 |
| EP | 3698656 | A1 | 8/2020 |
| EP | 3175507 | B1 | 9/2020 |
| EP | 3251529 | B1 | 9/2020 |
| EP | 3272382 | B1 | 9/2020 |
| EP | 3357358 | B1 | 9/2020 |
| EP | 3387927 | B1 | 9/2020 |
| EP | 3708013 | A1 | 9/2020 |
| EP | 3711513 | A1 | 9/2020 |
| EP | 3711518 | A1 | 9/2020 |
| EP | 3711522 | A1 | 9/2020 |
| EP | 3711524 | A1 | 9/2020 |
| EP | 3711527 | A1 | 9/2020 |
| EP | 3711529 | A1 | 9/2020 |
| EP | 3711530 | A1 | 9/2020 |
| EP | 3711534 | A1 | 9/2020 |
| EP | 3711535 | A1 | 9/2020 |
| EP | 3711536 | A1 | 9/2020 |
| EP | 3711539 | A1 | 9/2020 |
| EP | 3711540 | A1 | 9/2020 |
| EP | 3711545 | A1 | 9/2020 |
| EP | 3711546 | A1 | 9/2020 |
| EP | 3711548 | A1 | 9/2020 |
| EP | 3711550 | A1 | 9/2020 |
| EP | 3711552 | A1 | 9/2020 |
| EP | 3711554 | A1 | 9/2020 |
| EP | 3711558 | A1 | 9/2020 |
| EP | 3711561 | A1 | 9/2020 |
| EP | 3711562 | A1 | 9/2020 |
| EP | 3711569 | A1 | 9/2020 |
| EP | 3711572 | A1 | 9/2020 |
| EP | 3308661 | B1 | 10/2020 |
| EP | 3586655 | A4 | 10/2020 |
| EP | 3716800 | A1 | 10/2020 |
| EP | 3718587 | A1 | 10/2020 |
| EP | 3729908 | A1 | 10/2020 |
| EP | 3533351 | B1 | 11/2020 |
| EP | 3586656 | A4 | 11/2020 |
| EP | 3597054 | A4 | 11/2020 |
| EP | 3603425 | A4 | 11/2020 |
| EP | 3692828 | A4 | 11/2020 |
| EP | 3698656 | A4 | 11/2020 |
| EP | 3731675 | A1 | 11/2020 |
| EP | 3738449 | A1 | 11/2020 |
| EP | 3488715 | B1 | 12/2020 |
| EP | 3542591 | B1 | 12/2020 |
| EP | 3563697 | A4 | 12/2020 |
| EP | 3571944 | B1 | 12/2020 |
| EP | 3581038 | A4 | 12/2020 |
| EP | 3612044 | B1 | 12/2020 |
| EP | 3747288 | A1 | 12/2020 |
| EP | 3750417 | A1 | 12/2020 |
| EP | 3750418 | A1 | 12/2020 |
| EP | 3756480 | A1 | 12/2020 |
| EP | 3756487 | A1 | 12/2020 |
| EP | 3226704 | B1 | 1/2021 |
| EP | 3260002 | B1 | 1/2021 |
| EP | 3369329 | B1 | 1/2021 |
| EP | 3537906 | B1 | 1/2021 |
| EP | 3571940 | A4 | 1/2021 |
| EP | 3744198 | A4 | 1/2021 |

(56) References Cited

FOREIGN PATENT DOCUMENTS

| | | | |
|---|---|---|---|
| EP | 3750413 | A3 | 1/2021 |
| EP | 3764828 | A1 | 1/2021 |
| EP | 3767734 | A1 | 1/2021 |
| EP | 3767780 | A1 | 1/2021 |
| EP | 2903466 | B1 | 2/2021 |
| EP | 3273809 | B1 | 2/2021 |
| EP | 3345496 | B1 | 2/2021 |
| EP | 3389423 | B1 | 2/2021 |
| EP | 3391760 | B1 | 2/2021 |
| EP | 3777572 | A1 | 2/2021 |
| EP | 3777576 | A1 | 2/2021 |
| EP | 3777577 | A1 | 2/2021 |
| EP | 3777586 | A1 | 2/2021 |
| EP | 3777587 | A1 | 2/2021 |
| EP | 3780904 | A1 | 2/2021 |
| EP | 2892373 | B1 | 3/2021 |
| EP | 3066942 | B1 | 3/2021 |
| EP | 3348154 | B1 | 3/2021 |
| EP | 3478101 | B1 | 3/2021 |
| EP | 3544452 | B1 | 3/2021 |
| EP | 3547859 | B1 | 3/2021 |
| EP | 3632239 | A4 | 3/2021 |
| EP | 3744194 | A4 | 3/2021 |
| EP | 3760265 | A3 | 3/2021 |
| EP | 3777574 | A4 | 3/2021 |
| EP | 3777576 | A4 | 3/2021 |
| EP | 3777577 | A4 | 3/2021 |
| EP | 3785553 | A1 | 3/2021 |
| EP | 3791742 | A1 | 3/2021 |
| EP | 3796750 | A1 | 3/2021 |
| EP | 3490395 | B1 | 4/2021 |
| EP | 3496557 | B1 | 4/2021 |
| EP | 3610742 | A4 | 4/2021 |
| EP | 3610743 | A4 | 4/2021 |
| EP | 3610747 | A4 | 4/2021 |
| EP | 3624618 | B1 | 4/2021 |
| EP | 3801079 | A1 | 4/2021 |
| EP | 3808196 | A1 | 4/2021 |
| EP | 3809889 | A1 | 4/2021 |
| EP | 3549235 | B1 | 5/2021 |
| EP | 3606365 | B1 | 5/2021 |
| EP | 3818853 | A1 | 5/2021 |
| EP | 3818859 | A1 | 5/2021 |
| EP | 3818860 | A1 | 5/2021 |
| EP | 3818869 | A1 | 5/2021 |
| EP | 3818872 | A1 | 5/2021 |
| EP | 3818894 | A1 | 5/2021 |
| EP | 3821735 | A1 | 5/2021 |
| EP | 3824748 | A1 | 5/2021 |
| EP | 3028586 | B1 | 6/2021 |
| EP | 3609356 | B1 | 6/2021 |
| EP | 3618648 | B1 | 6/2021 |
| EP | 3689651 | A4 | 6/2021 |
| EP | 3698660 | A4 | 6/2021 |
| EP | 3701814 | A4 | 6/2021 |
| EP | 3701820 | A4 | 6/2021 |
| EP | 3829339 | A1 | 6/2021 |
| EP | 3831225 | A1 | 6/2021 |
| EP | 3831231 | A1 | 6/2021 |
| EP | 3838035 | A1 | 6/2021 |
| EP | 3646667 | B1 | 7/2021 |
| EP | 3646669 | B1 | 7/2021 |
| EP | 3777578 | A4 | 7/2021 |
| EP | 3850965 | A1 | 7/2021 |
| EP | 3160565 | B1 | 8/2021 |
| EP | 3704962 | A4 | 8/2021 |
| EP | 3708012 | A4 | 8/2021 |
| EP | 3808195 | A3 | 8/2021 |
| EP | 3834638 | A3 | 8/2021 |
| EP | 3841897 | A4 | 8/2021 |
| EP | 3855961 | A1 | 8/2021 |
| EP | 3858415 | A1 | 8/2021 |
| EP | 3860375 | A1 | 8/2021 |
| EP | 3861877 | A1 | 8/2021 |
| EP | 3868231 | A2 | 8/2021 |
| EP | 3325066 | B1 | 9/2021 |
| EP | 3487326 | B1 | 9/2021 |
| EP | 3573486 | B1 | 9/2021 |
| EP | 3871518 | A1 | 9/2021 |
| EP | 3871530 | A1 | 9/2021 |
| EP | 3874975 | A1 | 9/2021 |
| EP | 3878498 | A1 | 9/2021 |
| EP | 3880015 | A1 | 9/2021 |
| EP | 3160554 | B1 | 10/2021 |
| EP | 3249488 | B1 | 10/2021 |
| EP | 3704973 | A4 | 10/2021 |
| EP | 3729983 | A4 | 10/2021 |
| EP | 3818861 | A4 | 10/2021 |
| EP | 3838035 | A4 | 10/2021 |
| EP | 3886619 | A1 | 10/2021 |
| EP | 3892130 | A1 | 10/2021 |
| EP | 3897249 | A1 | 10/2021 |
| EP | 3206513 | B2 | 11/2021 |
| EP | 3289894 | B1 | 11/2021 |
| EP | 3512364 | B1 | 11/2021 |
| EP | 3563698 | B1 | 11/2021 |
| EP | 3607840 | B1 | 11/2021 |
| EP | 3666095 | A4 | 11/2021 |
| EP | 3683923 | B1 | 11/2021 |
| EP | 3701819 | A4 | 11/2021 |
| EP | 3750419 | A4 | 11/2021 |
| EP | 3818870 | A4 | 11/2021 |
| EP | 3818874 | A4 | 11/2021 |
| EP | 3818894 | A4 | 11/2021 |
| EP | 3871522 | A4 | 11/2021 |
| EP | 3903607 | A1 | 11/2021 |
| EP | 3154382 | B1 | 12/2021 |
| EP | 3442365 | B1 | 12/2021 |
| EP | 3621466 | B1 | 12/2021 |
| EP | 3648624 | B1 | 12/2021 |
| EP | 3695736 | A4 | 12/2021 |
| EP | 3818857 | A4 | 12/2021 |
| EP | 3818863 | A4 | 12/2021 |
| EP | 3818886 | A4 | 12/2021 |
| EP | 3818891 | A4 | 12/2021 |
| EP | 3871516 | A4 | 12/2021 |
| EP | 3892121 | A4 | 12/2021 |
| EP | 3481145 | B1 | 1/2022 |
| EP | 3740091 | B1 | 1/2022 |
| EP | 3808197 | A4 | 1/2022 |
| EP | 3818851 | A4 | 1/2022 |
| EP | 3818853 | A4 | 1/2022 |
| EP | 3818854 | A4 | 1/2022 |
| EP | 3818860 | A4 | 1/2022 |
| EP | 3878295 | A4 | 1/2022 |
| EP | 3878296 | A4 | 1/2022 |
| EP | 3878297 | A4 | 1/2022 |
| EP | 3939450 | A1 | 1/2022 |
| EP | 3939451 | A1 | 1/2022 |
| EP | 3939452 | A1 | 1/2022 |
| EP | 3939453 | A1 | 1/2022 |
| EP | 3940534 | A1 | 1/2022 |
| EP | 3941233 | A1 | 1/2022 |
| EP | 3941234 | A1 | 1/2022 |
| EP | 3941236 | A1 | 1/2022 |
| EP | 3941237 | A1 | 1/2022 |
| EP | 3941238 | A1 | 1/2022 |
| EP | 3941242 | A1 | 1/2022 |
| EP | 3941244 | A1 | 1/2022 |
| EP | 3941245 | A1 | 1/2022 |
| EP | 3941246 | A1 | 1/2022 |
| EP | 3941250 | A2 | 1/2022 |
| EP | 3941251 | A1 | 1/2022 |
| EP | 3941252 | A1 | 1/2022 |
| EP | 3941254 | A1 | 1/2022 |
| EP | 3941257 | A1 | 1/2022 |
| EP | 3941267 | A1 | 1/2022 |
| EP | 3941268 | A1 | 1/2022 |
| EP | 3941271 | A1 | 1/2022 |
| EP | 3942900 | A1 | 1/2022 |
| EP | 3240442 | B1 | 2/2022 |
| EP | 3542656 | B1 | 2/2022 |
| EP | 3691482 | B1 | 2/2022 |
| EP | 3818878 | A4 | 2/2022 |

(56) References Cited

FOREIGN PATENT DOCUMENTS

| | | | |
|---|---|---|---|
| EP | 3954237 | A4 | 2/2022 |
| EP | 3954239 | A1 | 2/2022 |
| EP | 3954417 | A1 | 2/2022 |
| EP | 3136889 | B2 | 3/2022 |
| EP | 3341995 | B9 | 3/2022 |
| EP | 3496792 | B1 | 3/2022 |
| EP | 3646668 | B1 | 3/2022 |
| EP | 3646743 | B1 | 3/2022 |
| EP | 3664636 | B1 | 3/2022 |
| EP | 3750583 | B1 | 3/2022 |
| EP | 3769635 | B1 | 3/2022 |
| EP | 3818858 | A4 | 3/2022 |
| EP | 3818859 | A4 | 3/2022 |
| EP | 3818869 | A4 | 3/2022 |
| EP | 3818872 | A4 | 3/2022 |
| EP | 3818873 | A4 | 3/2022 |
| EP | 3864983 | A4 | 3/2022 |
| EP | 3964085 | A1 | 3/2022 |
| EP | 3964086 | A1 | 3/2022 |
| EP | 3965253 | A1 | 3/2022 |
| EP | 3965258 | A1 | 3/2022 |
| EP | 3967163 | A1 | 3/2022 |
| EP | 3967164 | A1 | 3/2022 |
| EP | 3972385 | A1 | 3/2022 |
| EP | 3491687 | B1 | 4/2022 |
| EP | 3815558 | A4 | 4/2022 |
| EP | 3818896 | A4 | 4/2022 |
| EP | 3925468 | A4 | 4/2022 |
| EP | 3928641 | A4 | 4/2022 |
| EP | 3977869 | A1 | 4/2022 |
| EP | 3977876 | A1 | 4/2022 |
| EP | 3979457 | A1 | 4/2022 |
| EP | 3981265 | A1 | 4/2022 |
| EP | 3982771 | A1 | 4/2022 |
| EP | 3984386 | A1 | 4/2022 |
| EP | 3984392 | A1 | 4/2022 |
| EP | 3984393 | A1 | 4/2022 |
| EP | 3984394 | A1 | 4/2022 |
| EP | 3987963 | A1 | 4/2022 |
| EP | 3210481 | B1 | 5/2022 |
| EP | 3634161 | B1 | 5/2022 |
| EP | 3801078 | B1 | 5/2022 |
| EP | 3818881 | A4 | 5/2022 |
| EP | 3841898 | A4 | 5/2022 |
| EP | 3949773 | A4 | 5/2022 |
| EP | 3977873 | A3 | 5/2022 |
| EP | 3995012 | A1 | 5/2022 |
| EP | 3995166 | A1 | 5/2022 |
| EP | 2770860 | B2 | 6/2022 |
| EP | 3295814 | B1 | 6/2022 |
| EP | 3772249 | B1 | 6/2022 |
| EP | 3826493 | B1 | 6/2022 |
| EP | 3854241 | A4 | 6/2022 |
| EP | 3871527 | A4 | 6/2022 |
| EP | 3871528 | A4 | 6/2022 |
| EP | 3871530 | A4 | 6/2022 |
| EP | 3954239 | A4 | 6/2022 |
| EP | 4007448 | A1 | 6/2022 |
| EP | 4011226 | A1 | 6/2022 |
| EP | 4011427 | A1 | 6/2022 |
| EP | 4014697 | A1 | 6/2022 |
| EP | 4014772 | A1 | 6/2022 |
| EP | 4018855 | A1 | 6/2022 |
| EP | 3448184 | B1 | 7/2022 |
| EP | 3654905 | B1 | 7/2022 |
| EP | 3674729 | B8 | 7/2022 |
| EP | 3698658 | B1 | 7/2022 |
| EP | 3801084 | B1 | 7/2022 |
| EP | 3874982 | A4 | 7/2022 |
| EP | 4023087 | A1 | 7/2022 |
| EP | 4032418 | A1 | 7/2022 |
| EP | 3471803 | B1 | 8/2022 |
| EP | 3701818 | B1 | 8/2022 |
| EP | 3716800 | B1 | 8/2022 |
| EP | 3738456 | B1 | 8/2022 |
| EP | 3874980 | A4 | 8/2022 |
| EP | 3874981 | A4 | 8/2022 |
| EP | 3987961 | A4 | 8/2022 |
| EP | 4014767 | A3 | 8/2022 |
| EP | 4035546 | A1 | 8/2022 |
| EP | 3723525 | B1 | 9/2022 |
| EP | 3771351 | B1 | 9/2022 |
| EP | 3772251 | B1 | 9/2022 |
| EP | 3817607 | B1 | 9/2022 |
| EP | 4051034 | A1 | 9/2022 |
| EP | 4056057 | A1 | 9/2022 |
| EP | 4059366 | A1 | 9/2022 |
| EP | 4059552 | A1 | 9/2022 |
| EP | 3462944 | B1 | 10/2022 |
| EP | 3481474 | B1 | 10/2022 |
| EP | 3541214 | B1 | 10/2022 |
| EP | 3571941 | B1 | 10/2022 |
| EP | 3708013 | B1 | 10/2022 |
| EP | 3767733 | B1 | 10/2022 |
| EP | 3777575 | B1 | 10/2022 |
| EP | 3811802 | B1 | 10/2022 |
| EP | 3817603 | B1 | 10/2022 |
| EP | 3843561 | B1 | 10/2022 |
| EP | 3874977 | B1 | 10/2022 |
| EP | 4005416 | A4 | 10/2022 |
| EP | 4011226 | A4 | 10/2022 |
| EP | 4074200 | A1 | 10/2022 |
| EP | 4074356 | A1 | 10/2022 |
| EP | 3515219 | B1 | 11/2022 |
| EP | 3731677 | B1 | 11/2022 |
| EP | 3937337 | B1 | 11/2022 |
| EP | 4062889 | A4 | 11/2022 |
| EP | 4085960 | A1 | 11/2022 |
| EP | 4093221 | A1 | 11/2022 |
| EP | 4093222 | A1 | 11/2022 |
| EP | 3372098 | B1 | 12/2022 |
| EP | 3487331 | B1 | 12/2022 |
| EP | 3731675 | B1 | 12/2022 |
| EP | 3760063 | B1 | 12/2022 |
| EP | 3937341 | B1 | 12/2022 |
| EP | 4029393 | A4 | 12/2022 |
| EP | 4098135 | A1 | 12/2022 |
| EP | 4101321 | A1 | 12/2022 |
| EP | 4103004 | A1 | 12/2022 |
| EP | 4108109 | A1 | 12/2022 |
| EP | 4108110 | A1 | 12/2022 |
| EP | 4108111 | A1 | 12/2022 |
| EP | 4108112 | A1 | 12/2022 |
| EP | 3446579 | B8 | 1/2023 |
| EP | 3454680 | B1 | 1/2023 |
| EP | 3761820 | B1 | 1/2023 |
| EP | 3986089 | B1 | 1/2023 |
| EP | 3987956 | A4 | 1/2023 |
| EP | 4059366 | A4 | 1/2023 |
| EP | 4111890 | A1 | 1/2023 |
| EP | 4111891 | A1 | 1/2023 |
| EP | 4118985 | A1 | 1/2023 |
| EP | 4118989 | A1 | 1/2023 |
| EP | 4122339 | A1 | 1/2023 |
| EP | 4122340 | A1 | 1/2023 |
| EP | 3744191 | B1 | 2/2023 |
| EP | 3861877 | B1 | 2/2023 |
| EP | 4129099 | A1 | 2/2023 |
| EP | 4133958 | A1 | 2/2023 |
| EP | 3811801 | B1 | 3/2023 |
| EP | 3864987 | B1 | 3/2023 |
| EP | 3869981 | B1 | 3/2023 |
| EP | 3925464 | B1 | 3/2023 |
| EP | 4140340 | A1 | 3/2023 |
| EP | 4144242 | A1 | 3/2023 |
| EP | 4144244 | A1 | 3/2023 |
| EP | 4145958 | A1 | 3/2023 |
| EP | 4148862 | A1 | 3/2023 |
| EP | 4151109 | A1 | 3/2023 |
| EP | 3236787 | B1 | 4/2023 |
| EP | 3525609 | B1 | 4/2023 |
| EP | 3541215 | B1 | 4/2023 |
| EP | 3638337 | B1 | 4/2023 |
| EP | 3691405 | B1 | 4/2023 |

(56) References Cited

FOREIGN PATENT DOCUMENTS

| | | | |
|---|---|---|---|
| EP | 3756486 | B1 | 4/2023 |
| EP | 3970535 | B1 | 4/2023 |
| EP | 4014766 | A4 | 4/2023 |
| EP | 4159064 | A1 | 4/2023 |
| EP | 4159066 | A1 | 4/2023 |
| EP | 4162819 | A1 | 4/2023 |
| EP | 4162821 | A1 | 4/2023 |
| EP | 4164425 | A1 | 4/2023 |
| EP | 4166019 | A1 | 4/2023 |
| EP | 4167783 | A1 | 4/2023 |
| EP | 4169396 | A1 | 4/2023 |
| EP | 4169403 | A1 | 4/2023 |
| EP | 4169404 | A1 | 4/2023 |
| EP | 3595465 | B1 | 5/2023 |
| EP | 3673754 | B1 | 5/2023 |
| EP | 3689161 | B1 | 5/2023 |
| EP | 3854236 | B1 | 5/2023 |
| EP | 3964084 | B1 | 5/2023 |
| EP | 3964088 | B1 | 5/2023 |
| EP | 4111887 | A4 | 5/2023 |
| EP | 4176745 | A1 | 5/2023 |
| EP | 4176746 | A1 | 5/2023 |
| EP | 4179891 | A1 | 5/2023 |
| EP | 4179903 | A1 | 5/2023 |
| EP | 4183282 | A1 | 5/2023 |
| EP | 3232833 | B1 | 6/2023 |
| EP | 3493869 | B1 | 6/2023 |
| EP | 3684209 | B1 | 6/2023 |
| EP | 3729980 | B1 | 6/2023 |
| EP | 3808198 | B1 | 6/2023 |
| EP | 3826486 | B1 | 6/2023 |
| EP | 3860375 | B1 | 6/2023 |
| EP | 3984392 | A4 | 6/2023 |
| EP | 4079171 | A4 | 6/2023 |
| EP | 4190189 | A1 | 6/2023 |
| EP | 4193859 | A1 | 6/2023 |
| EP | 4197361 | A1 | 6/2023 |
| EP | 4197370 | A1 | 6/2023 |
| EP | 4197373 | A1 | 6/2023 |
| EP | 4197374 | A1 | 6/2023 |
| EP | 4197375 | A1 | 6/2023 |
| EP | 4197569 | A1 | 6/2023 |
| EP | 4197647 | A1 | 6/2023 |
| EP | 3454681 | B1 | 7/2023 |
| EP | 3769634 | B1 | 7/2023 |
| EP | 3791914 | B1 | 7/2023 |
| EP | 3939450 | B1 | 7/2023 |
| EP | 3939451 | B1 | 7/2023 |
| EP | 3939452 | B1 | 7/2023 |
| EP | 3939453 | B1 | 7/2023 |
| EP | 3972435 | B1 | 7/2023 |
| EP | 4207542 | A1 | 7/2023 |
| EP | 4208056 | A1 | 7/2023 |
| EP | 4212039 | A1 | 7/2023 |
| EP | 4212041 | A1 | 7/2023 |
| EP | 4212042 | A1 | 7/2023 |
| EP | 4212043 | A1 | 7/2023 |
| EP | 4212044 | A1 | 7/2023 |
| EP | 4215068 | A1 | 7/2023 |
| EP | 3283149 | B1 | 8/2023 |
| EP | 4005417 | B1 | 8/2023 |
| EP | 4088600 | A4 | 8/2023 |
| EP | 4147594 | A4 | 8/2023 |
| EP | 4218454 | A1 | 8/2023 |
| EP | 4218455 | A1 | 8/2023 |
| EP | 4218459 | A1 | 8/2023 |
| JP | 2005517421 | A | 6/2005 |
| JP | 2015503916 | A | 2/2015 |
| JP | 2019526241 | A | 9/2019 |
| JP | 2020536576 | A | 12/2020 |
| KR | 101319228 | B1 | 10/2013 |
| RU | 2536115 | C2 | 12/2014 |
| WO | WO-2003/037306 | A2 | 5/2003 |
| WO | WO-2015/116934 | A1 | 8/2015 |
| WO | WO-2016/001921 | A2 | 1/2016 |

| | | | |
|---|---|---|---|
| WO | WO-2016/001922 | A1 | 1/2016 |
| WO | WO-2016/001923 | A2 | 1/2016 |
| WO | WO-2016/001924 | A2 | 1/2016 |
| WO | WO-2016/001925 | A1 | 1/2016 |
| WO | WO-2016/001926 | A1 | 1/2016 |
| WO | WO-2016/005533 | A1 | 1/2016 |
| WO | 2016/029225 | A1 | 2/2016 |
| WO | WO-2016/026219 | A1 | 2/2016 |
| WO | 2017/118930 | A1 | 7/2017 |
| WO | 2018/047092 | A1 | 3/2018 |
| WO | 2018/087719 | A1 | 5/2018 |
| WO | 2018/087738 | A1 | 5/2018 |
| WO | 2018/094540 | A1 | 5/2018 |
| WO | 2018/215939 | A1 | 11/2018 |
| WO | 2019/012362 | A1 | 1/2019 |
| WO | WO-2019/46315 | A1 | 3/2019 |
| WO | 2019/092405 | A1 | 5/2019 |
| WO | WO-2019122344 | A1 | 6/2019 |
| WO | WO-2019141577 | A1 | 7/2019 |
| WO | 2019/152873 | A1 | 8/2019 |
| WO | WO-2019148049 | A1 | 8/2019 |
| WO | 2019/169002 | A1 | 9/2019 |
| WO | 2019/171297 | A1 | 9/2019 |
| WO | WO-2019/200194 | A1 | 10/2019 |
| WO | 2019/223828 | A1 | 11/2019 |
| WO | 2019/228894 | A1 | 12/2019 |
| WO | 2019/232086 | A1 | 12/2019 |
| WO | WO-2019227381 | A1 | 12/2019 |
| WO | WO-2019243464 | A1 | 12/2019 |
| WO | WO-2020009412 | A1 | 1/2020 |
| WO | WO-2020009457 | A1 | 1/2020 |
| WO | WO-2020015441 | A1 | 1/2020 |
| WO | WO-2020017783 | A1 | 1/2020 |
| WO | WO-2020021115 | A2 | 1/2020 |
| WO | 2020/031117 | A1 | 2/2020 |
| WO | WO-2020/029923 | A1 | 2/2020 |
| WO | WO-2020027448 | A1 | 2/2020 |
| WO | 2020/064347 | A1 | 4/2020 |
| WO | WO-2020064876 | A1 | 4/2020 |
| WO | WO-2020084756 | A1 | 4/2020 |
| WO | WO-2020084757 | A1 | 4/2020 |
| WO | WO-2020084773 | A1 | 4/2020 |
| WO | WO-2020084775 | A1 | 4/2020 |
| WO | WO-2020085365 | A1 | 4/2020 |
| WO | WO-2020/101198 | A1 | 5/2020 |
| WO | WO-2020101203 | A1 | 5/2020 |
| WO | WO-2020101204 | A1 | 5/2020 |
| WO | WO-2020101258 | A1 | 5/2020 |
| WO | 2020/109253 | A1 | 6/2020 |
| WO | WO-2020141718 | A1 | 7/2020 |
| WO | WO-2020143038 | A1 | 7/2020 |
| WO | 2020/165450 | A1 | 8/2020 |
| WO | WO-2020182731 | A1 | 9/2020 |
| WO | WO-2020182733 | A1 | 9/2020 |
| WO | WO-2020182748 | A1 | 9/2020 |
| WO | 2020/193179 | A1 | 10/2020 |
| WO | 2020/193198 | A1 | 10/2020 |
| WO | 2020/199217 | A1 | 10/2020 |
| WO | 2020/207734 | A1 | 10/2020 |
| WO | WO-2020193170 | A2 | 10/2020 |
| WO | WO-2020193172 | A1 | 10/2020 |
| WO | WO-2020193187 | A1 | 10/2020 |
| WO | WO-2020193207 | A1 | 10/2020 |
| WO | WO-2020208356 | A1 | 10/2020 |
| WO | 2020226432 | A2 | 11/2020 |
| WO | WO-2020222456 | A2 | 11/2020 |
| WO | WO-2020222497 | A1 | 11/2020 |
| WO | WO-2020231194 | A2 | 11/2020 |
| WO | WO-2020234166 | A1 | 11/2020 |
| WO | 2020/213917 | A3 | 12/2020 |
| WO | 2020/226432 | A3 | 12/2020 |
| WO | 2020/260414 | A1 | 12/2020 |
| WO | WO-2020257805 | A1 | 12/2020 |
| WO | WO-2020259229 | A1 | 12/2020 |
| WO | 2021/000395 | A1 | 1/2021 |
| WO | WO-2021011739 | A1 | 1/2021 |
| WO | WO-2021012318 | A1 | 1/2021 |
| WO | 2020/231194 | A3 | 2/2021 |
| WO | 2021/020768 | A1 | 2/2021 |

(56) References Cited

FOREIGN PATENT DOCUMENTS

| | | | |
|---|---|---|---|
| WO | 2021/023880 | A1 | 2/2021 |
| WO | 2021/023881 | A1 | 2/2021 |
| WO | 2021/032809 | A1 | 2/2021 |
| WO | WO-2021020699 | A1 | 2/2021 |
| WO | 2021/037923 | A1 | 3/2021 |
| WO | 2021/064639 | A1 | 4/2021 |
| WO | 2021/074624 | A1 | 4/2021 |
| WO | WO-2021060716 | A1 | 4/2021 |
| WO | WO-2021075805 | A1 | 4/2021 |
| WO | 2021/099467 | A1 | 5/2021 |
| WO | 2021/105483 | A1 | 6/2021 |
| WO | 2021/105649 | A1 | 6/2021 |
| WO | 2021/105705 | A1 | 6/2021 |
| WO | WO-2021105379 | A1 | 6/2021 |
| WO | WO-2021122801 | A1 | 6/2021 |
| WO | 2021/096182 | A3 | 7/2021 |
| WO | 2021/140328 | A1 | 7/2021 |
| WO | 2021/140436 | A1 | 7/2021 |
| WO | 2021/141290 | A1 | 7/2021 |
| WO | 2021/144311 | A1 | 7/2021 |
| WO | 2021/145570 | A1 | 7/2021 |
| WO | 2021/146124 | A1 | 7/2021 |
| WO | 2021/157842 | A1 | 8/2021 |
| WO | 2021/157850 | A1 | 8/2021 |
| WO | 2021/157857 | A1 | 8/2021 |
| WO | 2021/160693 | A1 | 8/2021 |
| WO | 2021/162849 | A1 | 8/2021 |
| WO | 2021/167217 | A1 | 8/2021 |
| WO | WO-2021157846 | A1 | 8/2021 |
| WO | 2021/180599 | A1 | 9/2021 |
| WO | 2021/181993 | A1 | 9/2021 |
| WO | 2021/184964 | A1 | 9/2021 |
| WO | 2021/184965 | A1 | 9/2021 |
| WO | 2021/201375 | A1 | 10/2021 |
| WO | 2021/203350 | A1 | 10/2021 |
| WO | 2021/210899 | A1 | 10/2021 |
| WO | 2021/213848 | A1 | 10/2021 |
| WO | 2021208946 | A1 | 10/2021 |
| WO | 2021215797 | A1 | 10/2021 |
| WO | 2021/224626 | A1 | 11/2021 |
| WO | 2021/225288 | A1 | 11/2021 |
| WO | 2021/248579 | A1 | 12/2021 |
| WO | 2021/254303 | A1 | 12/2021 |
| WO | 2021/256066 | A1 | 12/2021 |
| WO | WO-2021250278 | A1 | 12/2021 |
| WO | 2022/001585 | A1 | 1/2022 |
| WO | 2022/013073 | A1 | 1/2022 |
| WO | 2022/013386 | A1 | 1/2022 |
| WO | 2022/013390 | A1 | 1/2022 |
| WO | 2022/014979 | A1 | 1/2022 |
| WO | 2022/015447 | A1 | 1/2022 |
| WO | 2022/015454 | A1 | 1/2022 |
| WO | 2022/017455 | A1 | 1/2022 |
| WO | WO-2022003072 | A1 | 1/2022 |
| WO | 2022/025550 | A1 | 2/2022 |
| WO | 2022/025573 | A1 | 2/2022 |
| WO | 2022/028091 | A1 | 2/2022 |
| WO | 2022/028093 | A1 | 2/2022 |
| WO | 2022/028096 | A1 | 2/2022 |
| WO | 2022028098 | A1 | 2/2022 |
| WO | 2022/045612 | A1 | 3/2022 |
| WO | 2022/050813 | A1 | 3/2022 |
| WO | 2022/052818 | A1 | 3/2022 |
| WO | 2022/055140 | A1 | 3/2022 |
| WO | WO-2022049157 | A1 | 3/2022 |
| WO | WO-2022050798 | A1 | 3/2022 |
| WO | WO-2022050800 | A1 | 3/2022 |
| WO | WO-2022050812 | A1 | 3/2022 |
| WO | WO-2022064172 | A1 | 3/2022 |
| WO | 2022/068787 | A1 | 4/2022 |
| WO | 2022/079750 | A1 | 4/2022 |
| WO | 2022/079752 | A1 | 4/2022 |
| WO | 2022/079753 | A1 | 4/2022 |
| WO | 2022/083160 | A1 | 4/2022 |
| WO | 2022/084686 | A1 | 4/2022 |

| | | | |
|---|---|---|---|
| WO | WO-2022074239 | A1 | 4/2022 |
| WO | WO-2022079749 | A1 | 4/2022 |
| WO | WO-2022079751 | A1 | 4/2022 |
| WO | 2022/090170 | A1 | 5/2022 |
| WO | 2022/090171 | A1 | 5/2022 |
| WO | 2022/090172 | A1 | 5/2022 |
| WO | 2022/096317 | A1 | 5/2022 |
| WO | WO-2022107358 | A1 | 5/2022 |
| WO | WO-2022107360 | A1 | 5/2022 |
| WO | 2022/110731 | A1 | 6/2022 |
| WO | 2022/130463 | A1 | 6/2022 |
| WO | 2022/130493 | A1 | 6/2022 |
| WO | WO-2022136660 | A1 | 6/2022 |
| WO | WO-2022136661 | A1 | 6/2022 |
| WO | WO-2022136674 | A1 | 6/2022 |
| WO | WO-2022136677 | A1 | 6/2022 |
| WO | WO-2022139227 | A1 | 6/2022 |
| WO | WO-2022139329 | A1 | 6/2022 |
| WO | 2022/145852 | A1 | 7/2022 |
| WO | 2022/145906 | A1 | 7/2022 |
| WO | 2022/148139 | A1 | 7/2022 |
| WO | 2022/148140 | A1 | 7/2022 |
| WO | 2022/154867 | A1 | 7/2022 |
| WO | WO-2022149808 | A1 | 7/2022 |
| WO | 2022/167575 | A1 | 8/2022 |
| WO | 2022/167603 | A1 | 8/2022 |
| WO | 2022/167613 | A1 | 8/2022 |
| WO | 2022/175287 | A1 | 8/2022 |
| WO | 2022/176126 | A1 | 8/2022 |
| WO | 2022/176129 | A1 | 8/2022 |
| WO | 2022169174 | A1 | 8/2022 |
| WO | 2022/188350 | A1 | 9/2022 |
| WO | 2022/193161 | A1 | 9/2022 |
| WO | 2022/195770 | A1 | 9/2022 |
| WO | 2022/195771 | A1 | 9/2022 |
| WO | 2022/203188 | A1 | 9/2022 |
| WO | 2022/203522 | A1 | 9/2022 |
| WO | 2022/203523 | A1 | 9/2022 |
| WO | WO-2022201303 | A1 | 9/2022 |
| WO | WO-2022201304 | A1 | 9/2022 |
| WO | 2022/209527 | A1 | 10/2022 |
| WO | 2022/224318 | A1 | 10/2022 |
| WO | 2022/227634 | A1 | 11/2022 |
| WO | 2022/227828 | A1 | 11/2022 |
| WO | 2022/227848 | A1 | 11/2022 |
| WO | 2022/230320 | A1 | 11/2022 |
| WO | 2022/230322 | A1 | 11/2022 |
| WO | 2022/231293 | A1 | 11/2022 |
| WO | 2022/236493 | A1 | 11/2022 |
| WO | 2022/239065 | A1 | 11/2022 |
| WO | 2022/239275 | A1 | 11/2022 |
| WO | 2022/239276 | A1 | 11/2022 |
| WO | 2022/239277 | A1 | 11/2022 |
| WO | 2022/239278 | A1 | 11/2022 |
| WO | 2022/239279 | A1 | 11/2022 |
| WO | 2022/239280 | A1 | 11/2022 |
| WO | 2022/239337 | A1 | 11/2022 |
| WO | 2022/239343 | A1 | 11/2022 |
| WO | 2022/239367 | A1 | 11/2022 |
| WO | 2022/239368 | A1 | 11/2022 |
| WO | 2022/239369 | A1 | 11/2022 |
| WO | 2022/239373 | A1 | 11/2022 |
| WO | 2022/239374 | A1 | 11/2022 |
| WO | 2022/239378 | A1 | 11/2022 |
| WO | 2022/239380 | A1 | 11/2022 |
| WO | 2022/239381 | A1 | 11/2022 |
| WO | 2022/239389 | A1 | 11/2022 |
| WO | 2022/239395 | A1 | 11/2022 |
| WO | 2022/239396 | A1 | 11/2022 |
| WO | 2022/239409 | A1 | 11/2022 |
| WO | 2022/239410 | A1 | 11/2022 |
| WO | 2022/239413 | A1 | 11/2022 |
| WO | 2022/239414 | A1 | 11/2022 |
| WO | 2022/239473 | A1 | 11/2022 |
| WO | 2022/239474 | A1 | 11/2022 |
| WO | 2022/239475 | A1 | 11/2022 |
| WO | 2022/239510 | A1 | 11/2022 |
| WO | 2022/239511 | A1 | 11/2022 |
| WO | 2022/239512 | A1 | 11/2022 |

(56) References Cited

FOREIGN PATENT DOCUMENTS

| | | | |
|---|---|---|---|
| WO | 2022/239513 | A1 | 11/2022 |
| WO | 2022/239514 | A1 | 11/2022 |
| WO | 2022/239515 | A1 | 11/2022 |
| WO | 2022230041 | A1 | 11/2022 |
| WO | 2022230080 | A1 | 11/2022 |
| WO | 2022230321 | A1 | 11/2022 |
| WO | WO-2022230078 | A1 | 11/2022 |
| WO | WO-2022230433 | A1 | 11/2022 |
| WO | 2022/247563 | A1 | 12/2022 |
| WO | 2022/249117 | A1 | 12/2022 |
| WO | 2022/249479 | A1 | 12/2022 |
| WO | 2022/254383 | A1 | 12/2022 |
| WO | 2022/255622 | A1 | 12/2022 |
| WO | 2022/263645 | A1 | 12/2022 |
| WO | 2022/265230 | A1 | 12/2022 |
| WO | 2022/268994 | A1 | 12/2022 |
| WO | 2022/269043 | A1 | 12/2022 |
| WO | 2022/269044 | A1 | 12/2022 |
| WO | 2022/269700 | A1 | 12/2022 |
| WO | 2022/269701 | A1 | 12/2022 |
| WO | 2022/269702 | A1 | 12/2022 |
| WO | 2022/269704 | A1 | 12/2022 |
| WO | 2022/270797 | A1 | 12/2022 |
| WO | 2022/270798 | A1 | 12/2022 |
| WO | 2022/270851 | A1 | 12/2022 |
| WO | 2022267806 | A1 | 12/2022 |
| WO | 2023/001544 | A1 | 1/2023 |
| WO | 2023/001925 | A1 | 1/2023 |
| WO | 2023/001926 | A1 | 1/2023 |
| WO | 2023/277375 | A1 | 1/2023 |
| WO | 2023/277438 | A1 | 1/2023 |
| WO | 2023/281753 | A1 | 1/2023 |
| WO | 2023/285401 | A1 | 1/2023 |
| WO | 2023/285447 | A1 | 1/2023 |
| WO | 2023/285458 | A1 | 1/2023 |
| WO | 2023/285459 | A1 | 1/2023 |
| WO | 2023/285484 | A1 | 1/2023 |
| WO | 2023/285486 | A1 | 1/2023 |
| WO | 2023/004676 | A1 | 2/2023 |
| WO | 2023/006417 | A1 | 2/2023 |
| WO | 2023/008907 | A1 | 2/2023 |
| WO | 2023/020250 | A1 | 2/2023 |
| WO | 2023/021545 | A1 | 2/2023 |
| WO | 2023/021546 | A1 | 2/2023 |
| WO | 2023/021567 | A1 | 2/2023 |
| WO | 2023017593 | A1 | 2/2023 |
| WO | 2023/025673 | A1 | 3/2023 |
| WO | 2023/029866 | A1 | 3/2023 |
| WO | 2023/029867 | A1 | 3/2023 |
| WO | 2023/029941 | A1 | 3/2023 |
| WO | 2023/029950 | A1 | 3/2023 |
| WO | 2023/029951 | A1 | 3/2023 |
| WO | 2023/030853 | A1 | 3/2023 |
| WO | 2023/030960 | A1 | 3/2023 |
| WO | 2023/036262 | A1 | 3/2023 |
| WO | 2023/040657 | A1 | 3/2023 |
| WO | 2023/046487 | A1 | 3/2023 |
| WO | 2023/047549 | A1 | 3/2023 |
| WO | 2023/047550 | A1 | 3/2023 |
| WO | 2023037445 | A1 | 3/2023 |
| WO | 2023/050924 | A1 | 4/2023 |
| WO | 2023/051733 | A1 | 4/2023 |
| WO | 2023/052475 | A1 | 4/2023 |
| WO | 2023/053201 | A1 | 4/2023 |
| WO | 2023/055743 | A1 | 4/2023 |
| WO | 2023/057572 | A1 | 4/2023 |
| WO | 2023/062043 | A1 | 4/2023 |
| WO | 2023/062788 | A1 | 4/2023 |
| WO | 2023/068638 | A1 | 4/2023 |
| WO | 2023/068639 | A1 | 4/2023 |
| WO | 2023/068641 | A1 | 4/2023 |
| WO | 2023/068644 | A1 | 4/2023 |
| WO | 2023/068783 | A1 | 4/2023 |
| WO | 2023/068800 | A1 | 4/2023 |
| WO | 2023068793 | A1 | 4/2023 |
| WO | 2023068809 | A1 | 4/2023 |
| WO | 2023/070371 | A1 | 5/2023 |
| WO | 2023/073932 | A1 | 5/2023 |
| WO | 2023/075376 | A1 | 5/2023 |
| WO | 2023/075380 | A1 | 5/2023 |
| WO | 2023/087224 | A1 | 5/2023 |
| WO | 2023/088447 | A1 | 5/2023 |
| WO | 2023/089753 | A1 | 5/2023 |
| WO | 2023/089754 | A1 | 5/2023 |
| WO | 2023/089756 | A1 | 5/2023 |
| WO | 2023/089757 | A1 | 5/2023 |
| WO | 2023/089759 | A1 | 5/2023 |
| WO | 2023/089761 | A1 | 5/2023 |
| WO | 2023073216 | A1 | 5/2023 |
| WO | 2023073920 | A1 | 5/2023 |
| WO | 2023073931 | A1 | 5/2023 |
| WO | 2023089752 | A1 | 5/2023 |
| WO | 2023089763 | A1 | 5/2023 |
| WO | 2023/094188 | A1 | 6/2023 |
| WO | 2023/105668 | A1 | 6/2023 |
| WO | 2023/105767 | A1 | 6/2023 |
| WO | 2023/105768 | A1 | 6/2023 |
| WO | 2023/105771 | A1 | 6/2023 |
| WO | 2023/105772 | A1 | 6/2023 |
| WO | 2023/105773 | A1 | 6/2023 |
| WO | 2023/105779 | A1 | 6/2023 |
| WO | 2023/112218 | A1 | 6/2023 |
| WO | 2023/112247 | A1 | 6/2023 |
| WO | 2023/112248 | A1 | 6/2023 |
| WO | 2023/115948 | A1 | 6/2023 |
| WO | 2023110704 | A1 | 6/2023 |
| WO | 2023/127113 | A1 | 7/2023 |
| WO | 2023/127720 | A1 | 7/2023 |
| WO | 2023/128286 | A1 | 7/2023 |
| WO | 2023/134302 | A1 | 7/2023 |
| WO | 2023/139358 | A1 | 7/2023 |
| WO | 2023/140615 | A1 | 7/2023 |
| WO | 2023/140646 | A1 | 7/2023 |
| WO | 2023/144389 | A1 | 8/2023 |
| WO | 2023/146180 | A1 | 8/2023 |

OTHER PUBLICATIONS

International Search Report and Written Opinion dated Mar. 18, 2022.

International Preliminary Report on Patentability Corresponding to Application No. PCT/US2021/060693, mailed Jul. 4, 2023.

Korean Office Action & English Translation Corresponding to Application No. 10-2023-7027565, mailed Apr. 21, 2026.

Chinese Office Action Corresponding to Application No. 202180095546.8, mailed Mar. 19, 2026.

European Examination Report Corresponding to Application No. 21827775.4, mailed Apr. 29, 2026.

Japanese Notice of Rejection and English translation Corresponding to Application No. 2023-543066, mailed Jan. 7, 2026.

Chinese Notification on Grant of Patent Corresponding to Application No. 2021800955468, mailed Aug. 3, 2026.

* cited by examiner

HEAT-NOT-BURN (HNB) AEROSOL-GENERATING DEVICES INCLUDING INTRA-DRAW HEATER CONTROL, AND METHODS OF CONTROLLING A HEATER

CROSS-REFERENCE TO RELATED APPLICATIONS

This is a continuation of, and claims priority under 35 U.S.C. § 120 to, U.S. application Ser. No. 17/151,409, filed Jan. 18, 2021, the entire contents of which is hereby incorporated by reference.

BACKGROUND

Field

The present disclosure relates to heat-not-burn (HNB) aerosol-generating devices and methods of controlling a heater in an aerosol-generating device.

Description of Related Art

Some electronic devices are configured to heat a plant material to a temperature that is sufficient to release constituents of the plant material while keeping the temperature below a combustion point of the plant material so as to avoid any substantial pyrolysis of the plant material. Such devices may be referred to as aerosol-generating devices (e.g., heat-not-burn aerosol-generating devices), and the plant material heated may be tobacco. In some instances, the plant material may be introduced directly into a heating chamber of an aerosol-generating device. In other instances, the plant material may be pre-packaged in individual containers to facilitate insertion and removal from an aerosol-generating device.

SUMMARY

At least one embodiment relates to a heat-not-burn (HNB) aerosol-generating device. In an example embodiment, the aerosol-generating device may include At least one embodiment relates to a system for controlling a heater in a non-combustible aerosol-generating device, the system including a memory storing computer-readable instructions and a controller configured to execute the computer-readable instructions to cause the non-combustible aerosol-generating device to detect an airflow in the non-combustible aerosol-generating device, apply a first power to the heater based on the detected airflow, apply a second power to the heater based on a preheat temperature and the detected airflow being below an airflow threshold value, the application of the second power being after the application of the first power, and apply a third power to the heater based on the preheat temperature and the detected airflow being below the airflow threshold value, the application of the third power being after the application of the second power, the third power being greater than the second power.

In at least one example embodiment, the airflow threshold value is a first threshold value and the controller is configured to cause the non-combustible aerosol-generating device to apply the first power when the detected airflow exceeds a second threshold value.

In at least one example embodiment, the second threshold value is greater than the first threshold value.

In at least one example embodiment, the controller is configured to cause the non-combustible aerosol-generating device to determine a heating temperature, reduce the first power based on the heating temperature and a draw temperature, and apply the second power based on the draw temperature and the preheat temperature.

In at least one example embodiment, the preheat temperature and the draw temperature are the same.

In at least one example embodiment, the draw temperature is greater than the preheat temperature.

In at least one example embodiment, the controller is configured to cause the non-combustible aerosol-generating device to determine a heating temperature, increase the first power after detecting the airflow and before applying the second power, and increase the second power before applying the third power.

In at least one example embodiment, the first power is less than the second power.

In at least one example embodiment, the controller includes a proportional-integral-derivative (PID) controller, wherein the controller is configured to cause the non-combustible aerosol-generating device to change at least one of a proportional term, an integral term and a derivative term of the PID controller based on the detected airflow.

In at least one example embodiment, the controller is configured to cause the non-combustible aerosol-generating device to increase the proportional term when the detected airflow is greater than the second threshold value and decrease the proportional term when the detected airflow is less than the first threshold value.

In at least one example embodiment, the system further includes a sensor configured to detect the airflow and output a signal to the controller, the signal being representative of a magnitude of the airflow.

In at least one example embodiment, the preheat temperature is less than 400° C.

In at least one example embodiment, the preheat temperature is 320° C.

In at least one example embodiment, the preheat temperature is 300° C.

In at least one example embodiment, the first power is a set maximum power.

In at least one example embodiment, the second power is a set minimum power.

In at least one example embodiment, the set minimum power is 1 W.

In at least one example embodiment, the controller is configured to cause the non-combustible aerosol-generating device to determine a heating temperature, and the application of the third power applies the third power when the heating temperature is the preheat temperature.

At least one example embodiment provides a non-combustible aerosol-generating system, the system including a heater and circuitry configured to cause the non-combustible aerosol-generating device to detect an airflow in the non-combustible aerosol-generating device, apply a first power to the heater based on the detected airflow, apply a second power to the heater based on a preheat temperature and the detected airflow being below an airflow threshold value, the application of the second power being after the application of the first power, and apply a third power to the heater based on the preheat temperature and the detected airflow being below the airflow threshold value, the application of the third power being after the application of the second power, the third power being greater than the second power.

In at least one example embodiment, the system includes a removable capsule including the heater, wherein the removable capsule is configured to direct the airflow along a longitudinal axis of the capsule.

At least one example embodiment provides a system for controlling a heater in a non-combustible aerosol-generating device, the system including a memory storing computer-readable instructions and a controller configured to execute the computer-readable instructions to cause the non-combustible aerosol-generating device to detect an airflow in the non-combustible aerosol-generating device, apply a first power to the heater when the detected airflow exceeds a first threshold value, lower the first power while the detected airflow exceeds the first threshold value to reach a draw temperature, apply a second power to the heater when the detected airflow is below a second threshold value, the application of the second power being after the lowering of the first power to reach the draw temperature, the second threshold value being less than the first threshold value, and the second power being less than the first power, and apply a third power to the heater after the application of the second power and when the detected airflow is below the second threshold value, the third power being greater than the second power.

At least one example embodiment provides a system for controlling a heater in a non-combustible aerosol-generating device, the system including a memory storing computer-readable instructions and a controller configured to execute the computer-readable instructions to cause the non-combustible aerosol-generating device to apply a preheat power to reach a preheat temperature, detect an airflow in the non-combustible aerosol-generating device, apply a first power to the heater when the detected airflow exceeds a first threshold value, the first power being less than the preheat power, increase the first power to a draw temperature while the detected airflow exceeds the first threshold value to reach a draw temperature, the draw temperature being less than the preheat temperature, and apply a second power to the heater when the detected airflow is below a second threshold value, the application of the second power being after the increasing of the first power to reach the draw temperature, the second threshold value being less than the first threshold value, and the second power being greater than the increased first power.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1A:
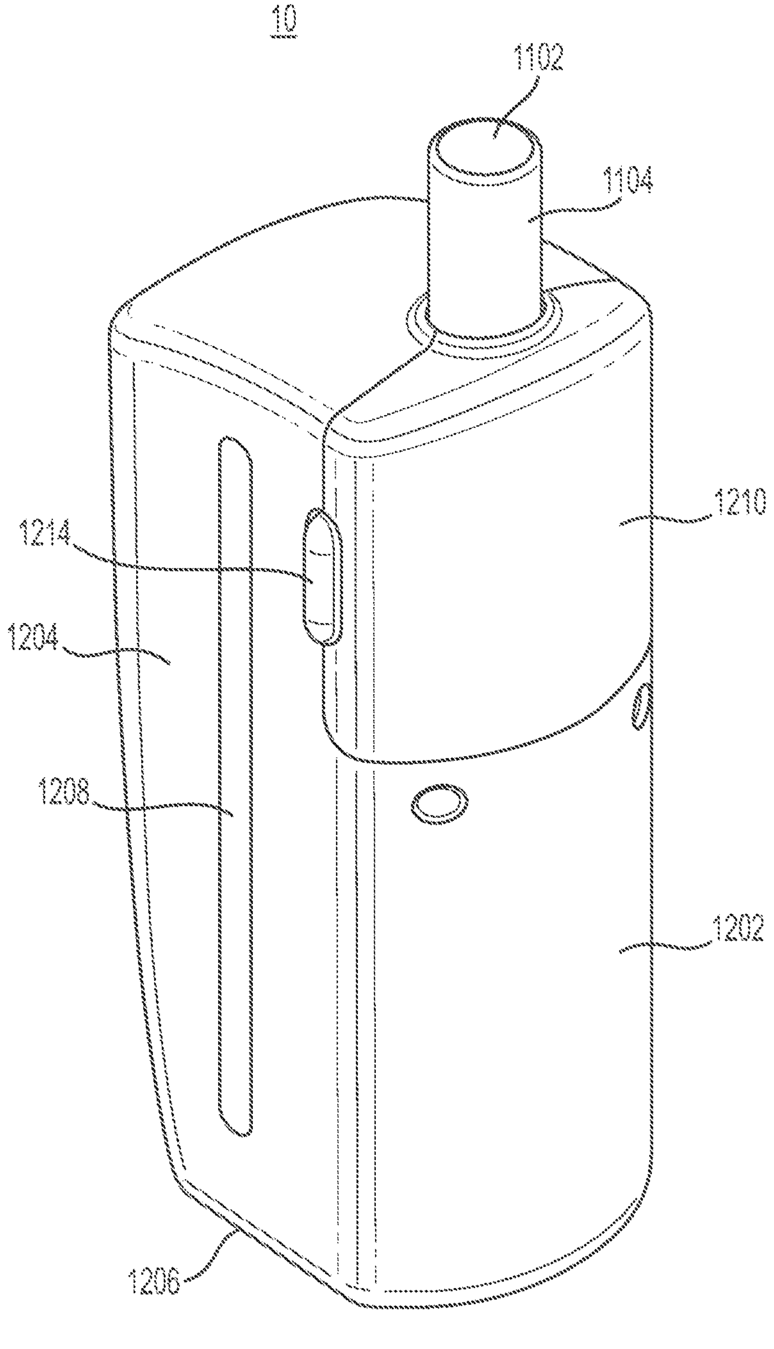
FIGS. 1A-1C illustrate various perspective views of an aerosol-generating device according to one or more example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being “on,” “connected to,” “coupled to,” “attached to,” “adjacent to,” or “covering” another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

When the words "about" and "substantially" are used in this specification in connection with a numerical value, it is intended that the associated numerical value include a tolerance of ±10% around the stated numerical value, unless otherwise explicitly defined.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1B:
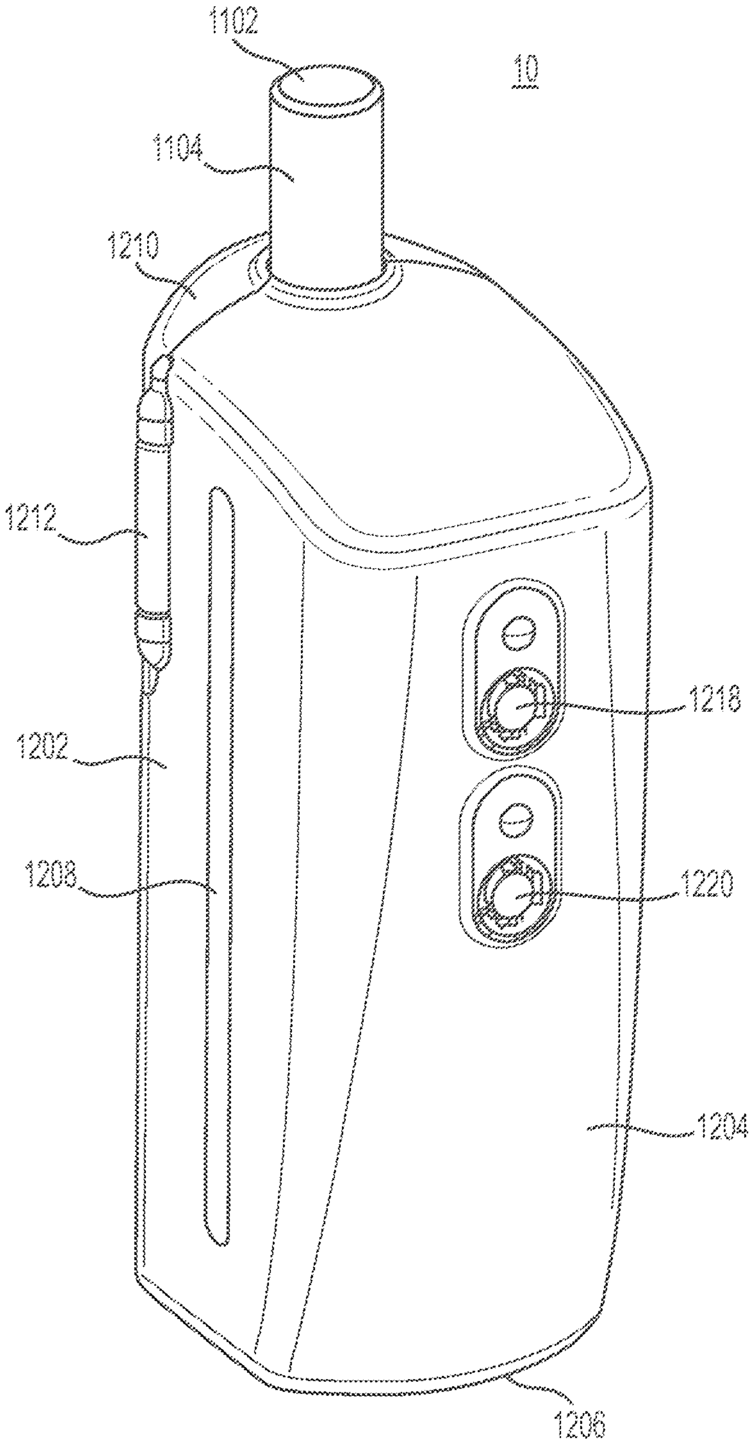
Figure 1C:
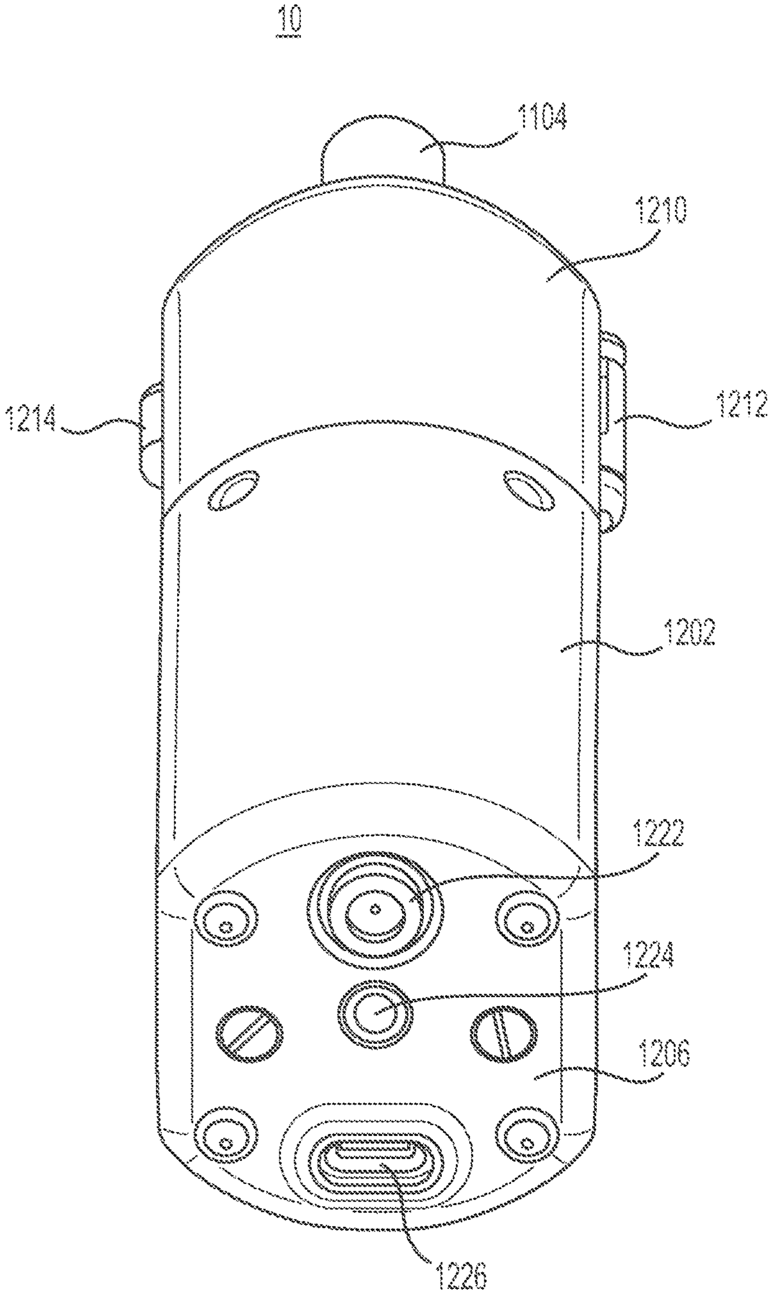

FIG. 1A is a front perspective view of an aerosol-generating device according to an example embodiment. FIG. 1B is a rear perspective view of the aerosol-generating device of FIG. 1A. FIG. 1C is an upstream perspective view of the aerosol-generating device of FIG. 1A. Referring to FIGS. 1A-C, an aerosol-generating device 10 is configured to receive and heat an aerosol-forming substrate to produce an aerosol. The aerosol-generating device 10 includes, inter alia, a front housing 1202, a rear housing 1204, and a bottom housing 1206 coupled to a frame 1208 (e.g., chassis). A door 1210 is also pivotally connected/attached to the front housing 1202. For instance, the door 1210 is configured to move or swing about a hinge 1212 and configured to reversibly engage/disengage with the front housing 1202 via a latch 1214 in order to transition between an open position and a closed position. The aerosol-forming substrate, which may be contained within a capsule 100 (e.g., FIG. 2), may be loaded into the aerosol-generating device 10 via the door 1210. During an operation of the aerosol-generating device 10, the aerosol produced may be drawn from the aerosol-generating device 10 via the aerosol outlet 1102 defined by the mouth-end segment 1104 of the mouthpiece 1100 (e.g., FIG. 2).

As illustrated in FIG. 1B, the aerosol-generating device 10 includes a first button 1218 and a second button 1220. The first button 1218 may be a pre-heat button, and the second button 1220 may be a power button (or vice versa). Additionally, one or both of the first button 1218 and the second button 1220 may include a light-emitting diode (LED) configured to emit a visible light when the first button 1218 and/or the second button 1220 is pressed. Where both of the first button 1218 and the second button 1220 includes an LED, the lights emitted may be of the same color or of different colors. The lights may also be of the same intensity or of different intensities. Furthermore, the lights may be configured as continuous lights or intermittent lights. For instance, the light in connection with the power button (e.g., second button 1220) may blink/flash to indicate that the power supply (e.g., battery) is low and in need charging. While the aerosol-generating device 10 is shown as having two buttons, it should be understood that more (e.g., three) or less buttons may be provided depending on the desired interface and functionalities.

The aerosol-generating device 10 may have a cuboid-like shape which includes a front face, a rear face opposite the front face, a first side face between the front face and the rear face, a second side face opposite the first side face, a downstream end face, and an upstream end face opposite the downstream end face. As used herein, "upstream" (and, conversely, "downstream") is in relation to a flow of the aerosol, and "proximal" (and, conversely, "distal") is in relation to an adult operator of the aerosol-generating device 10 during aerosol generation. Although the aerosol-generating device 10 is illustrated as having a cuboid-like shape (e.g., rounded rectangular cuboid) with a polygonal cross-section, it should be understood that example embodiments are not limited thereto. For instance, in some embodiments, the aerosol-generating device 10 may have a cylinder-like shape with a circular cross-section (e.g., for a circular cylinder) or an elliptical cross-section (e.g., for an elliptic cylinder).

As illustrated in FIG. 1C, the aerosol-generating device 10 includes an inlet insert 1222 configured to permit ambient air to enter the device body 1200 (e.g., FIG. 2). In an example embodiment, the inlet insert 1222 defines an orifice as an air inlet which is in fluidic communication with the aerosol outlet 1102. As a result, when a draw (e.g., a puff) or negative pressure is applied to the aerosol outlet 1102, ambient air will be pulled into the device body 1200 via the orifice in the inlet insert 1222. The size (e.g., diameter) of the orifice in the inlet insert 1222 made be adjusted, while also taking in account other variables (e.g., capsule 100) in the flow path, to provide the desired overall resistance-to-draw (RTD). In other embodiments, the inlet insert 1222 may be omitted altogether such that the air inlet is defined by the bottom housing 1206.

The aerosol-generating device 10 may additionally include a jack 1224 and a port 1226. In an example embodiment, the jack 1224 permits the downloading of operational information for research and development (R&D) purposes (e.g., via an RS232 cable). The port 1226 is configured to receive an electric current (e.g., via a USB/mini-USB cable) from an external power supply so as to charge an internal power supply within the aerosol-generating device 10. In addition, the port 1226 may also be configured to send data to and/or receive data (e.g., via a USB/mini-USB cable) from another aerosol-generating device or other electronic device (e.g., phone, tablet, computer). Furthermore, the aerosol-generating device 10 may be configured for wireless communication with another electronic device, such as a phone, via an application software (app) installed on that electronic device. In such an instance, an adult operator may control or otherwise interface with the aerosol-generating device 10 (e.g., locate the aerosol-generating device, check usage information, change operating parameters) through the app.

Figure 2A:
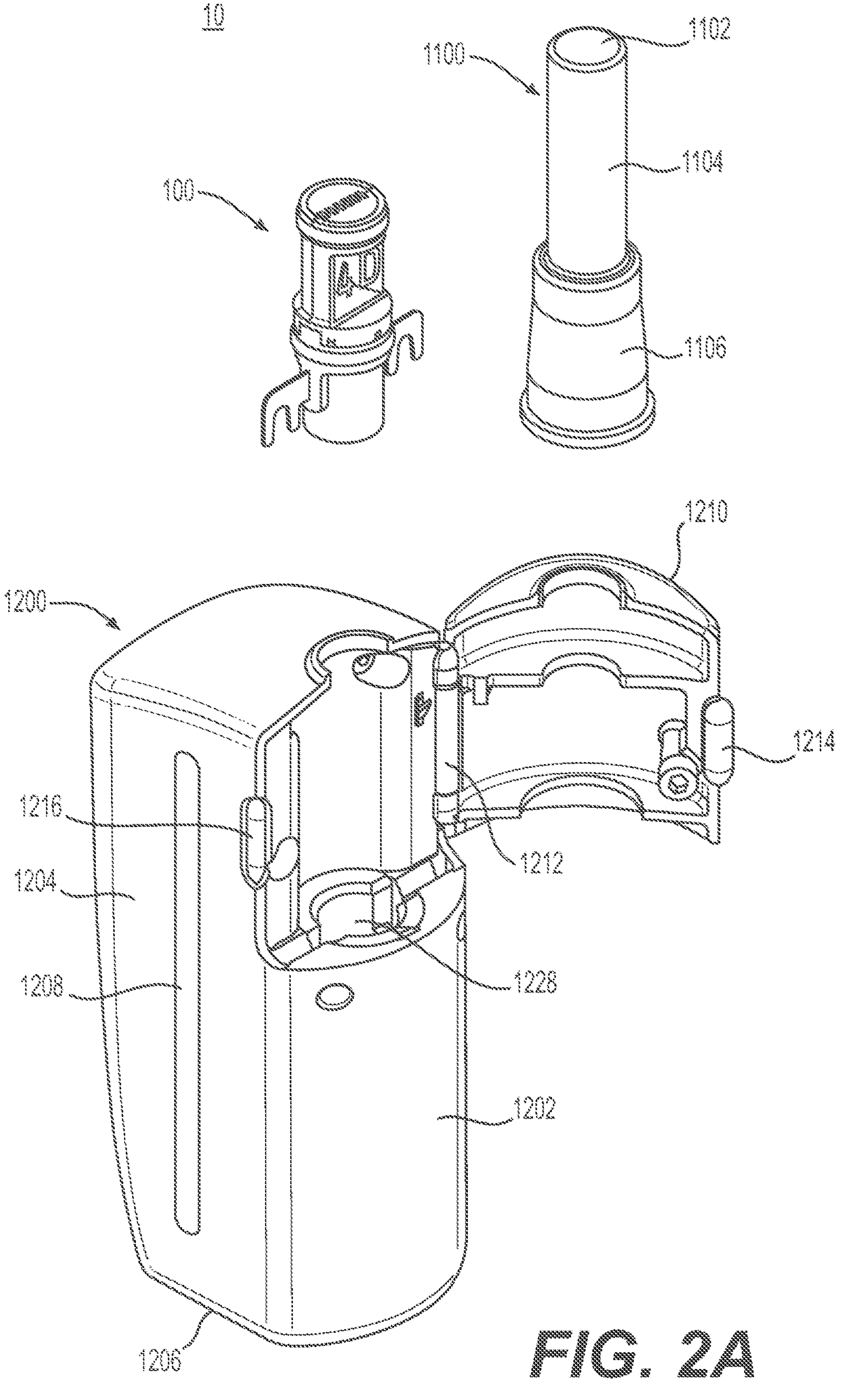
FIG. 2A illustrates the aerosol-generating device of FIGS. 1A-1C according to at least one example embodiment.

FIG. 2A is the front perspective view of the aerosol-generating device of FIGS. 1A-1C, wherein a mouthpiece 1100 and a capsule 100 are separated from the device body. Referring to FIG. 2, the aerosol-generating device 10 includes a device body 1200 configured to receive a capsule 100 and a mouthpiece 1100. In an example embodiment, the device body 1200 defines a receptacle 1228 configured to receive the capsule 100. The receptacle 1228 may be in a form of a cylindrical socket with outwardly-extending, diametrically-opposed side slots to accommodate the electrical end sections/contacts of the capsule 100. However, it should be understood that the receptacle 1228 may be in other forms based on the shape/configuration of the capsule 100.

As noted supra, the device body 1200 includes a door 1210 configured to open to permit an insertion of the capsule 100 and the mouthpiece 1100 and configured to close to retain the capsule 100 and the mouthpiece 1100. The mouthpiece 1100 includes a mouth end (e.g., of the mouth-end segment 1104) and an opposing capsule end (e.g., of the capsule-end segment 1106). In an example embodiment, the capsule end is larger than the mouth end and configured to prevent a disengagement of the mouthpiece 1100 from the capsule 100 when the door 1210 of the device body 1200 is closed. When received/secured within the device body 1200 and ready for aerosol generation, the capsule 100 may be hidden from view while the mouth-end segment 1104 defining the aerosol outlet 1102 of the mouthpiece 1100 is visible. As illustrated in the figures, the mouth-end segment 1104 of the mouthpiece 1100 may extend from/through the downstream end face of the device body 1200. Additionally, the mouth-end segment 1104 of the mouthpiece 1100 may be closer to the front face of the device body 1200 than the rear face.

In some instances, the device body 1200 of the aerosol-generating device 10 may optionally include a mouthpiece sensor and/or a door sensor. The mouthpiece sensor may be disposed on a rim of the receptacle 1228 (e.g., adjacent to the front face of the device body 1200). The door sensor may be disposed on a portion of the front housing 1202 adjacent to the hinge 1212 and within the swing path of the door 1210. In an example embodiment, the mouthpiece sensor and the door sensor are spring-loaded (e.g., retractable) projections configured as safety switches. For instance, the mouthpiece sensor may be retracted/depressed (e.g., activated) when the mouthpiece 1100 is fully engaged with the capsule 100 loaded within the receptacle 1228. Additionally, the door sensor may be retracted/depressed (e.g., activated) when the door 1210 is fully closed. In such instances, the control circuitry of the device body 1200 may permit an electric current to be supplied to the capsule 100 to heat the aerosol-forming substrate therein (e.g., pre-heat permitted when the first button 1218 is pressed). Conversely, the control circuitry (e.g., a controller 2105) of the device body 1200 may prevent or cease the supply of electric current when the mouthpiece sensor and/or the door sensor is not activated or deactivated (e.g., released). Thus, the heating of the aerosol-forming substrate will not be initiated if the mouthpiece 1100 is not fully inserted and/or if the door 1210 is not fully closed. Similarly, the supply of electric current to the capsule 100 will be disrupted/halted if the door 1210 is opened during the heating of the aerosol-forming substrate.

The capsule 100, which will be discussed herein in more detail, generally includes a housing defining inlet openings, outlet openings, and a chamber between the inlet openings and the outlet openings. An aerosol-forming substrate is disposed within the chamber of the housing. Additionally, a heater may extend into the housing from an exterior thereof. The housing may include a body portion and an upstream portion. The body portion of the housing includes a proximal end and a distal end. The upstream portion of the housing may be configured to engage with the distal end of the body portion.

Figure 2B:
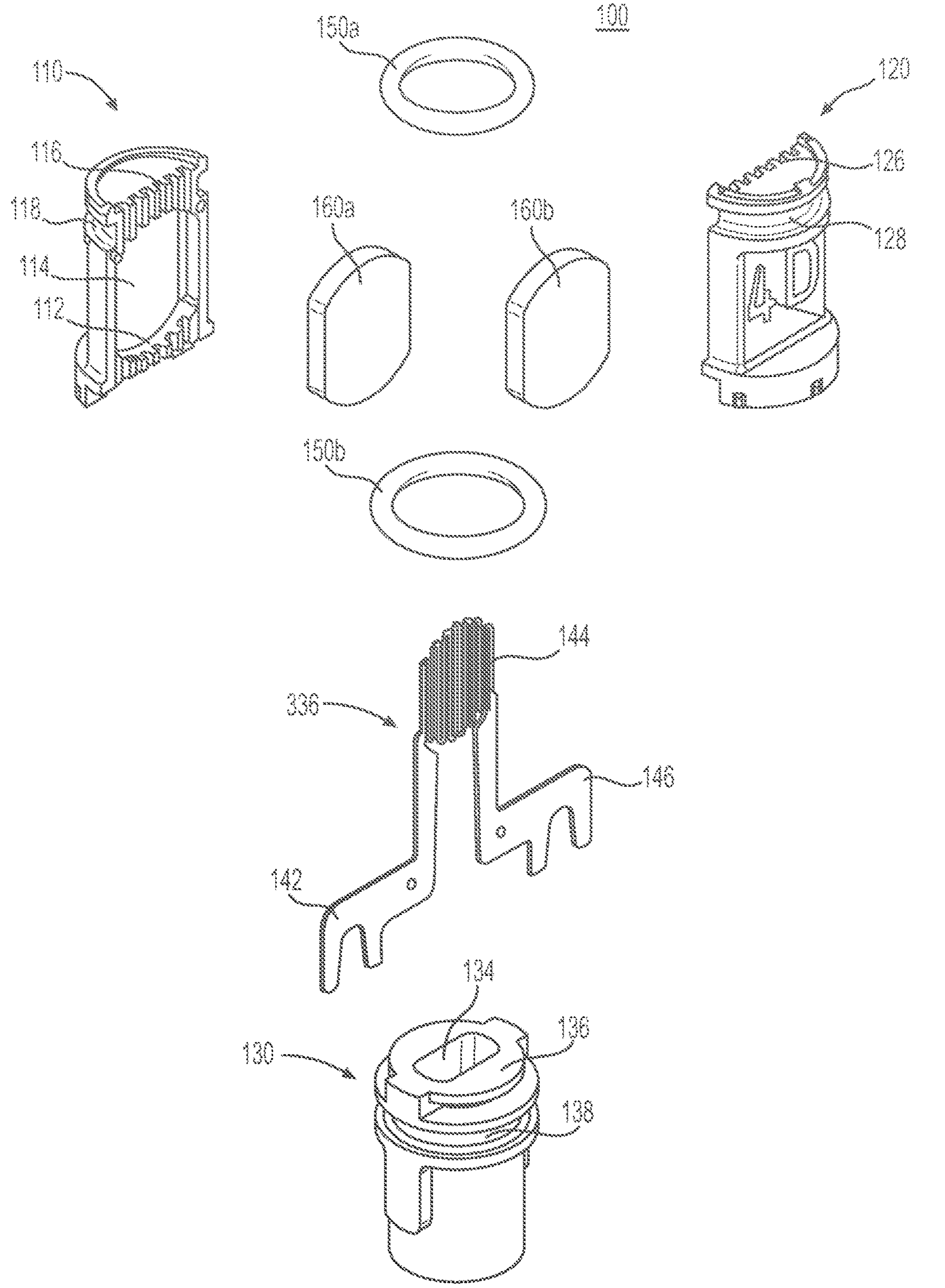
FIG. 2B illustrates a capsule for the aerosol-generating device of FIGS. 1A-1C according to at least one example embodiment.

FIG. 2B illustrates a capsule for the aerosol-generating device of FIGS. 1A-1C according to at least one example embodiment.

An aerosol-forming substrate contained within the capsule 100 may be in the form of a first aerosol-forming substrate **160*a* and a second aerosol-forming substrate 160*b*. In an example embodiment, the first aerosol-forming substrate 160*a* and the second aerosol-forming substrate 160*b* are housed between a first cover 110 and a second cover 120. During the operation of the aerosol-generating device 10, the first aerosol-forming substrate 160*a* and the second aerosol-forming substrate 160*b* may be heated by a heater 336 to generate an aerosol. As will be discussed herein in more detail, the heater 336 includes a first end section 142, an intermediate section 144, and a second end section 146. Additionally, prior to the assembly of the capsule 100, the heater 336 may be mounted in the base portion 130** during a manufacturing process.

As illustrated, the first cover 110 of the capsule 100 defines a first upstream groove 112, a first recess 114, and a first downstream groove 116. The first upstream groove 112 and the first downstream groove 116 may each be in the form of a series of grooves. Similarly, the second cover 120 of the capsule 100 defines a second upstream groove, a second recess, and a second downstream groove 126. In an example embodiment, the second upstream groove, the second recess, and the second downstream groove 126 of the second cover 120 are the same as the first upstream groove 112, the first recess 114, and the first downstream groove 116, respectively, of the first cover 110. Specifically, in some instances, the first cover 110 and the second cover 120 are identical and complementary structures. In such instances, orienting the first cover 110 and the second cover 120 to face each other for engagement with the base portion 130 will result in a complementary arrangement. As a result, one part may be used interchangeably as the first cover 110 or the second cover 120, thus simplifying the method of manufacturing.

The first recess 114 of the first cover 110 and the second recess of the second cover 120 collectively form a chamber configured to accommodate the intermediate section 144 of the heater 336 when the first cover 110 and the second cover 120 are coupled with the base portion 130. The first aerosol-forming substrate 160*a* and the second aerosol-forming substrate 160*b* may also be accommodated within the chamber so as to be in thermal contact with the intermediate section 144 of the heater 336 when the capsule 100 is assembled. The chamber may have a longest dimension extending from at least one of the inlet openings (e.g., of the upstream passageway 162) to a corresponding one of the outlet openings (e.g., of the downstream passageway 166). In an example embodiment, the housing of the capsule 100 has a longitudinal axis, and the longest dimension of the chamber extends along the longitudinal axis of the housing.

The first downstream groove 116 of the first cover 110 and the second downstream groove 126 of the second cover 120 collectively form the downstream passageway 166. Similarly, the first upstream groove 112 of the first cover 110 and the second upstream groove of the second cover 120 collectively form the upstream passageway 162. The downstream passageway 166 and the upstream passageway 162 are dimensioned to be small or narrow enough to retain the first aerosol-forming substrate 160*a* and the second aerosol-forming substrate 160*b* within the chamber but yet large or wide enough to permit a passage of air and/or an aerosol therethrough when the first aerosol-forming substrate 160*a* and the second aerosol-forming substrate 160*b* are heated by the heater 336.

In one instance, each of the first aerosol-forming substrate 160*a* and the second aerosol-forming substrate 160*b* may be in a consolidated form (e.g., sheet, pallet, tablet) that is configured to maintain its shape so as to allow the first aerosol-forming substrate 160*a* and the second aerosol-forming substrate 160*b* to be placed in a unified manner within the first recess 114 of the first cover 110 and the second recess of the second cover 120, respectively. In such an instance, the first aerosol-forming substrate 160*a* may be disposed on one side of the intermediate section 144 of the heater 336 (e.g., side facing the first cover 110), while the second aerosol-forming substrate 160*b* may be disposed on the other side of the intermediate section 144 of the heater 336 (e.g., side facing the second cover 120) so as to substantially fill the first recess 114 of the first cover 110 and the second recess of the second cover 120, respectively, thereby sandwiching/embedding the intermediate section 144 of the heater 336 in between. Alternatively, one or both of the first aerosol-forming substrate 160*a* and the second aerosol-forming substrate 160*b* may be in a loose form (e.g., particles, fibers, grounds, fragments, shreds) that does not have a set shape but rather is configured to take on the shape of the first recess 114 of the first cover 110 and/or the second recess of the second cover 120 when introduced.

As noted supra, the housing of the capsule 100 may include the first cover 110, the second cover 120, and the base portion 130. When the capsule 100 is assembled, the housing may have a height (or length) of about 30 mm-40 mm (e.g., 35 mm), although example embodiments are not limited thereto. Additionally, each of the first recess 114 of the first cover 110 and the second recess of the second cover 120 may have a depth of about 1 mm-4 mm (e.g., 2 mm). In such an instance, the chamber collectively formed by the first recess 114 of the first cover 110 and the second recess of the second cover 120 may have an overall thickness of about 2 mm-8 mm (e.g., 4 mm). Along these lines, the first aerosol-forming substrate 160*a* and the second aerosol-forming substrate 160*b*, if in a consolidated form, may each have a thickness of about 1 mm-4 mm (e.g., 2 mm). As a result, the first aerosol-forming substrate 160*a* and the second aerosol-forming substrate 160*b* may be heated relatively quickly and uniformly by the intermediate section 144 of the heater 336.

The control circuitry may instruct a power supply to supply an electric current to the heater 336. The supply of current from the power supply may be in response to a manual operation (e.g., button-activation) or an automatic operation (e.g., draw/puff-activation). As a result of the current, the capsule 100 may be heated to generate an aerosol. In addition, the change in resistance of the heater may be used to monitor and control the aerosolization temperature. The aerosol generated may be drawn from the aerosol-generating device 10 via the mouthpiece 1100. In addition, the control circuitry (e.g., a controller 2105) may instruct a power supply to supply an electric current to the heater 336 to maintain a temperature of the capsule 100 between draws.

As discussed herein, an aerosol-forming substrate is a material or combination of materials that may yield an aerosol. An aerosol relates to the matter generated or output by the devices disclosed, claimed, and equivalents thereof. The material may include a compound (e.g., nicotine, cannabinoid), wherein an aerosol including the compound is produced when the material is heated. The heating may be below the combustion temperature so as to produce an aerosol without involving a substantial pyrolysis of the aerosol-forming substrate or the substantial generation of combustion byproducts (if any). Thus, in an example embodiment, pyrolysis does not occur during the heating and resulting production of aerosol. In other instances, there may be some pyrolysis and combustion byproducts, but the extent may be considered relatively minor and/or merely incidental.

The aerosol-forming substrate may be a fibrous material. For instance, the fibrous material may be a botanical material. The fibrous material is configured to release a compound when heated. The compound may be a naturally occurring constituent of the fibrous material. For instance, the fibrous material may be plant material such as tobacco, and the compound released may be nicotine. The term "tobacco" includes any tobacco plant material including tobacco leaf, tobacco plug, reconstituted tobacco, compressed tobacco, shaped tobacco, or powder tobacco, and combinations thereof from one or more species of tobacco plants, such as *Nicotiana rustica* and *Nicotiana tabacum*.

In some example embodiments, the tobacco material may include material from any member of the genus *Nicotiana*. In addition, the tobacco material may include a blend of two or more different tobacco varieties. Examples of suitable types of tobacco materials that may be used include, but are not limited to, flue-cured tobacco, Burley tobacco, Dark tobacco, Maryland tobacco, Oriental tobacco, rare tobacco, specialty tobacco, blends thereof, and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass. Furthermore, in some instances, the tobacco material may be mixed and/or combined with at least one of propylene glycol, glycerin, sub-combinations thereof, or combinations thereof.

The compound may also be a naturally occurring constituent of a medicinal plant that has a medically-accepted therapeutic effect. For instance, the medicinal plant may be a cannabis plant, and the compound may be a cannabinoid. Cannabinoids interact with receptors in the body to produce a wide range of effects. As a result, cannabinoids have been used for a variety of medicinal purposes (e.g., treatment of pain, nausea, epilepsy, psychiatric disorders). The fibrous material may include the leaf and/or flower material from one or more species of cannabis plants such as *Cannabis sativa, Cannabis indica*, and *Cannabis ruderalis*. In some instances, the fibrous material is a mixture of 60-80% (e.g., 70%) *Cannabis sativa* and 20-40% (e.g., 30%) *Cannabis indica.*

Examples of cannabinoids include tetrahydrocannabinolic acid (THCA), tetrahydrocannabinol (THC), cannabidiolic acid (CBDA), cannabidiol (CBD), cannabinol (CBN), cannabicyclol (CBL), cannabichromene (CBC), and cannabigerol (CBG). Tetrahydrocannabinolic acid (THCA) is a precursor of tetrahydrocannabinol (THC), while cannabidiolic acid (CBDA) is precursor of cannabidiol (CBD). Tetrahydrocannabinolic acid (THCA) and cannabidiolic acid (CBDA) may be converted to tetrahydrocannabinol (THC) and cannabidiol (CBD), respectively, via heating. In an example embodiment, heat from a heater (e.g., heater 336 shown in FIG. 2B) may cause decarboxylation so as to convert the tetrahydrocannabinolic acid (THCA) in the capsule 100 to tetrahydrocannabinol (THC), and/or to convert the cannabidiolic acid (CBDA) in the capsule 100 to cannabidiol (CBD).

In instances where both tetrahydrocannabinolic acid (THCA) and tetrahydrocannabinol (THC) are present in the capsule 100, the decarboxylation and resulting conversion will cause a decrease in tetrahydrocannabinolic acid (THCA) and an increase in tetrahydrocannabinol (THC). At least 50% (e.g., at least 87%) of the tetrahydrocannabinolic acid (THCA) may be converted to tetrahydrocannabinol (THC) during the heating of the capsule 100. Similarly, in instances where both cannabidiolic acid (CBDA) and cannabidiol (CBD) are present in the capsule 100, the decarboxylation and resulting conversion will cause a decrease in cannabidiolic acid (CBDA) and an increase in cannabidiol (CBD). At least 50% (e.g., at least 87%) of the cannabidiolic acid (CBDA) may be converted to cannabidiol (CBD) during the heating of the capsule 100.

Furthermore, the compound may be or may additionally include a non-naturally occurring additive that is subsequently introduced into the fibrous material. In one instance, the fibrous material may include at least one of cotton, polyethylene, polyester, rayon, combinations thereof, or the like (e.g., in a form of a gauze). In another instance, the fibrous material may be a cellulose material (e.g., non-tobacco and/or non-cannabis material). In either instance, the compound introduced may include nicotine, cannabinoids, and/or flavorants. The flavorants may be from natural sources, such as plant extracts (e.g., tobacco extract, cannabis extract), and/or artificial sources. In yet another instance, when the fibrous material includes tobacco and/or cannabis, the compound may be or may additionally include one or more flavorants (e.g., menthol, mint, vanilla). Thus, the compound within the aerosol-forming substrate may include naturally occurring constituents and/or non-naturally occurring additives. In this regard, it should be understood that existing levels of the naturally occurring constituents of the aerosol-forming substrate may be increased through supplementation. For example, the existing levels of nicotine in a quantity of tobacco may be increased through supplementation with an extract containing nicotine. Similarly, the existing levels of one or more cannabinoids in a quantity of cannabis may be increased through supplementation with an extract containing such cannabinoids.

The first cover 110 and the second cover 120 also define a first furrow 118 and a second furrow 128, respectively. The first furrow 118 and the second furrow 128 collectively form a downstream furrow configured to accommodate the first annular member 150*a*. Similarly, the base portion 130 defines an upstream furrow 138 configured to accommodate the second annular member 150*b*. As noted supra, the base portion 130 includes an engagement assembly 136 configured to facilitate a connection with the first cover 110 and the second cover 120. The engagement assembly 136 may be an integrally formed part of the base portion 130. In an example embodiment, the base portion 130 defines a base outlet 134 in fluidic communication with the base inlet 132, and the engagement assembly 136 is in the form of a projecting rim/collar on each side of the base outlet 134. Additionally, each of the first cover 110 and the second cover 120 may define a slot configured to receive a corresponding projecting rim/collar of the engagement assembly 136. As a result, the first cover 110 and the second cover 120 (e.g., via their distal ends) may interlock with the engagement assembly 136 of the base portion 130 (while also interfacing with each other) to form the housing of the capsule 100.

The first cover 110 and the second cover 120 may be made of a liquid-crystal polymer, PEEK (polyetheretherketone) or aluminum, for example.

A sheet material may be cut or otherwise processed (e.g., stamping, electrochemical etching, die cutting, laser cutting) to produce the heater 336. The sheet material may be formed of one or more conductors configured to undergo Joule heating (which is also known as ohmic/resistive heating). Suitable conductors for the sheet material include an iron-based alloy (e.g., stainless steel, iron aluminides), a nickel-based alloy (e.g., nichrome), and/or a ceramic (e.g., ceramic coated with metal). For instance, the stainless steel may be a type known in the art as SS316L, although example embodiments are not limited thereto. The sheet material may have a thickness of about 0.1-0.3 mm (e.g., 0.15-0.25 mm). The heater 336 may have a resistance between 0.5-2.5 Ohms (e.g., 1-2 Ohms).

The heater 336 has a first end section 142, an intermediate section 144, and a second end section 146. The first end section 142 and the second end section 146 are configured to receive an electric current from a power supply during an activation of the heater 336. When the heater 336 is activated (e.g., so as to undergo Joule heating), the temperature of the first aerosol-forming substrate 160*a* and the second aerosol-forming substrate 160*b* may increase, and an aerosol may be generated and drawn or otherwise released through the downstream passageway 166 of the capsule 100. The first end section 142 and the second end section 146 may each include a fork terminal to facilitate an electrical connection with the power supply (e.g., via a connection bolt), although example embodiments are not limited thereto. Additionally, because the heater 336 may be produced from a sheet material, the first end section 142, the second end section 146, and the intermediate section 144 may be coplanar. Furthermore, the intermediate section 144 of the heater 336 may have a planar and winding form resembling a compressed oscillation or zigzag with a plurality of parallel segments (e.g., eight to sixteen parallel segments). However, it should be understood that other forms for the intermediate section 144 of the heater 336 are also possible (e.g., spiral form, flower-like form).

In an example embodiment, the heater 336 extends through the base portion 130. In such an instance, the terminus of each of the first end section 142 and the second end section 146 may be regarded as external segments of the heater 336 protruding from opposite sides of the base portion 130. In particular, the intermediate section 144 of the heater 336 may be on the downstream side of the base portion 130 and aligned with the base outlet 134. During manufacturing, the heater 336 may be embedded within the base portion 130 via injection molding (e.g., insert molding, over molding). For instance, the heater 336 may be embedded such that the intermediate section 144 is evenly spaced between the pair of projecting rims/collars of the engagement assembly 136.

Although the first end section 142 and the second end section 146 of the heater 336 are shown in the drawings as projections (e.g., fins) extending from the sides of the base portion 130, it should be understood that, in some example embodiments, the first end section 142 and the second end section 146 of the heater 336 may be configured so as to constitute parts of the side surface of the capsule 100. For instance, the exposed portions of the first end section 142 and the second end section 146 of the heater 336 may be dimensioned and oriented so as to be situated/folded against the sides of the base portion 130 (e.g., while also following the underlying contour of the base portion 130). As a result, the first end section 142 and the second end section 146 may constitute a first electrical contact and a second electrical contact, respectively, as well as parts of the side surface of the capsule 100.

Figure 2C:
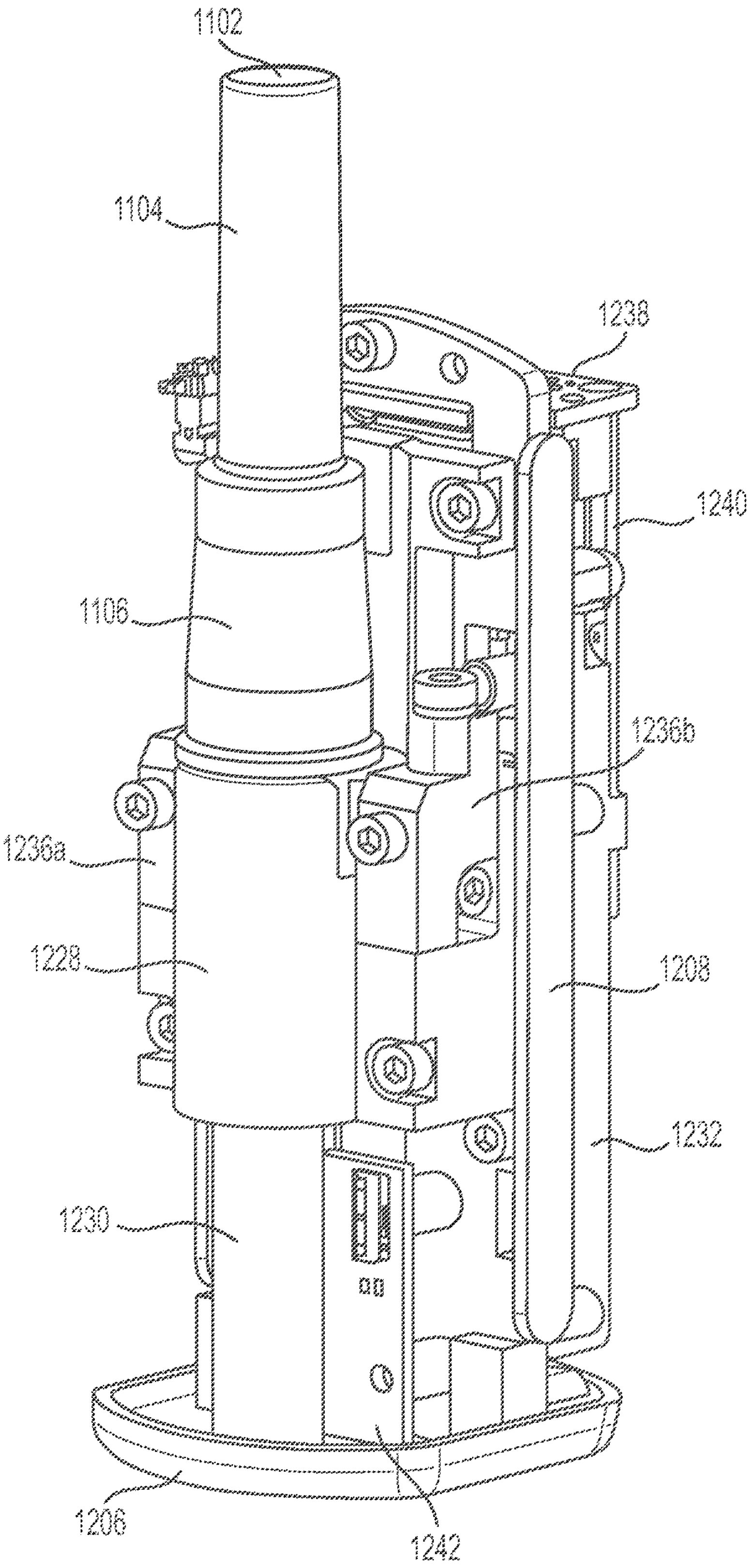
FIGS. 2C-2D illustrate partially-disassembled views of the aerosol-generating device of FIGS. 1A-1C according to at least one example embodiment.
Figure 2D:
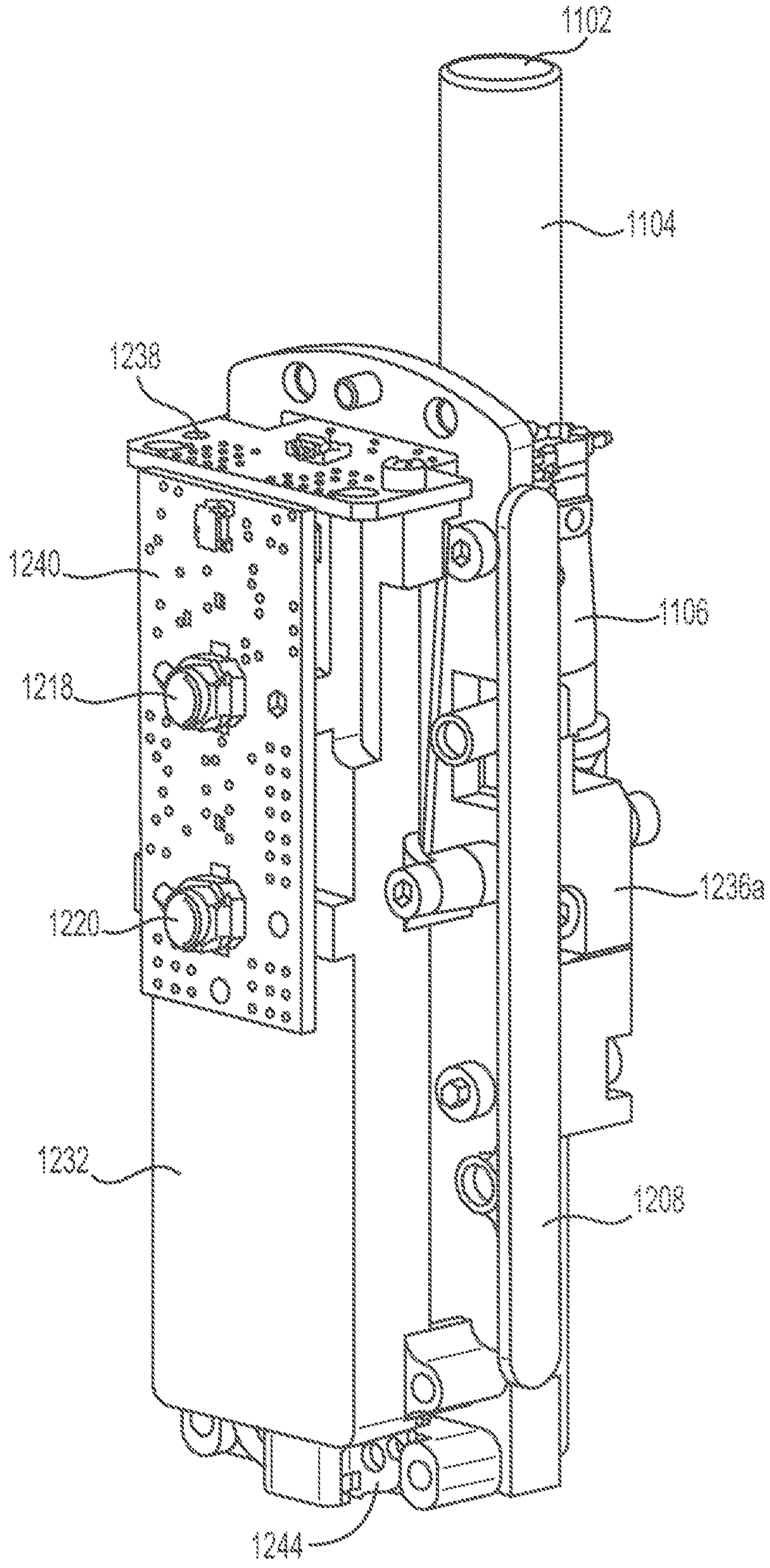

FIG. 2C is a partially-disassembled view of the aerosol-generating device of FIGS. 1A-1C. FIG. 2D is a partially-disassembled view of the aerosol-generating device of FIG. 2. Referring to FIGS. 2C-2D, the frame 1208 (e.g., metal chassis) serves as a foundation for the internal components of the aerosol-generating device 10, which may be attached either directly or indirectly thereto. With regard to structures/components shown in the figures and already discussed above, it should be understood that such relevant teachings are also applicable to this section and may not have been repeated in the interest of brevity. In an example embodiment, the bottom housing 1206 is secured to the upstream end of the frame 1208. Additionally, the receptacle 1228 (for receiving the capsule 100) may be mounted onto the front side of the frame 1208. Between the receptacle 1228 and the bottom housing 1206 is an inlet channel 1230 configured to direct an incoming flow of ambient air to the capsule 100 in the receptacle 1228. The inlet insert 1222 (e.g., FIG. 1C), through which the incoming air may flow, may be disposed in the distal end of the inlet channel 1230. Furthermore, the receptacle 1228 and/or the inlet channel 1230 may include a flow sensor (e.g., integrated flow sensor).

A covering 1232 and a power supply 1234 therein (e.g., FIG. 2E) may be mounted onto the rear side of the frame 1208. To establish an electrical connection with the capsule 100 (e.g., which is in the receptacle 1228 and covered by the capsule-end segment 1106 of the mouthpiece 1100), a first power terminal block 1236*a* and a second power terminal block 1236*b* may be provided to facilitate the supply of an electric current. For instance, the first power terminal block 1236*a* and the second power terminal block 1236*b* may establish the requisite electrical connection between the power supply 1234 and the capsule 100 via the first end section 142 and the second end section 146 of the heater 336. The first power terminal block 1236*a* and/or the second power terminal block 1236*b* may be formed of brass.

The aerosol-generating device 10 may also include a plurality of printed circuit boards (PCBs) configured to facilitate its operation. In an example embodiment, a first printed circuit board 1238 (e.g., bridge PCB for power and I2C) is mounted onto the downstream end of the covering 1232 for the power supply 1234. Additionally, a second printed circuit board 1240 (e.g., HMI PCB) is mounted onto the rear of the covering 1232. In another instance, a third printed circuit board 1242 (e.g., serial port PCB) is secured to the front of the frame 1208 and situated behind the inlet channel 1230. Furthermore, a fourth printed circuit board 1244 (e.g., USB-C PCB) is disposed between the rear of the frame 1208 and the covering 1232 for the power supply 1234. However, it should be understood that the example embodiments herein regarding the printed circuit boards should not be interpreted as limiting since the size, shapes, and locations thereof may vary depending on the desired features of the aerosol-generating device 10.

Figure 2E:
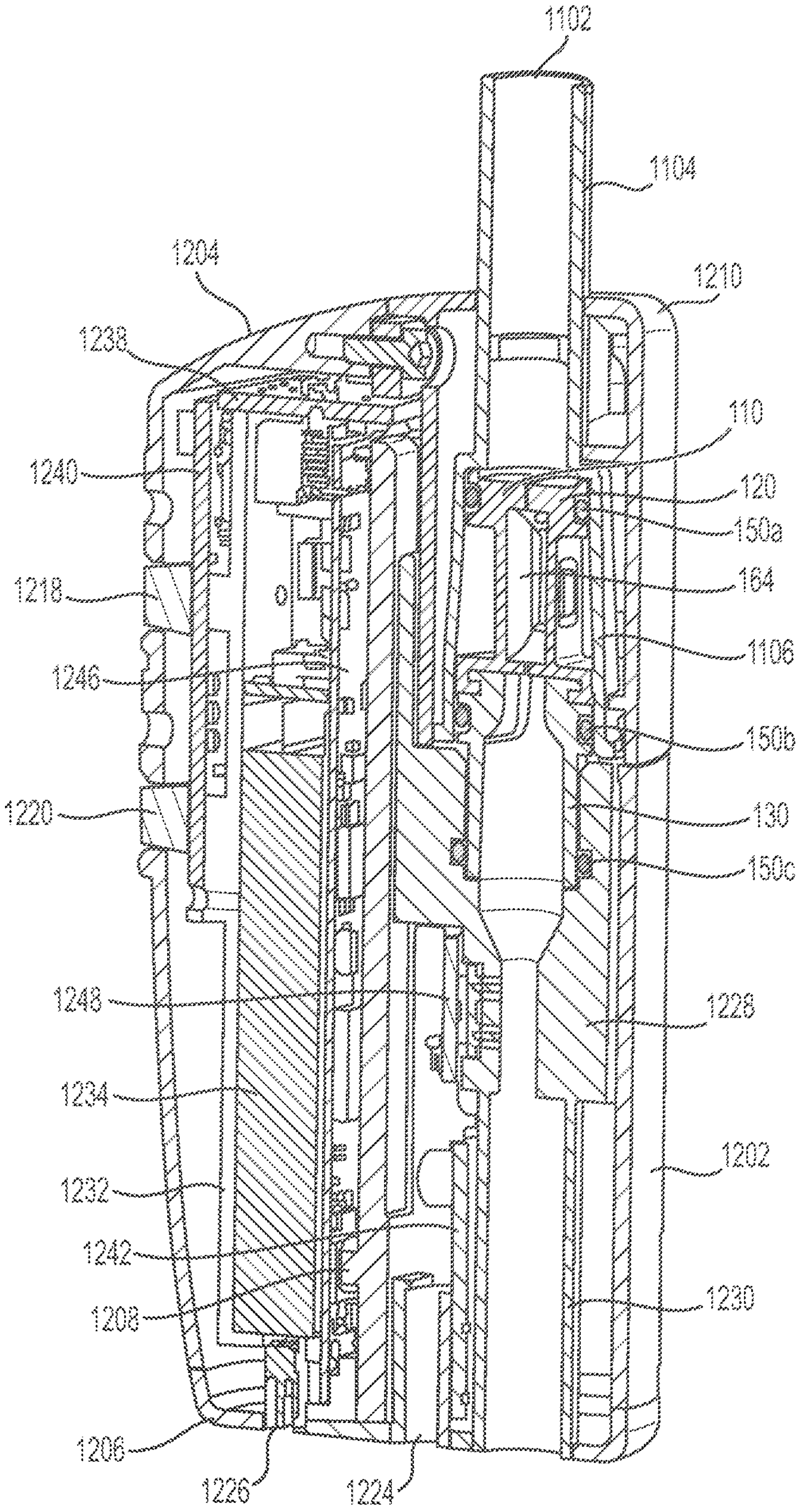
FIGS. 2E-2F illustrate cross-sectional views of the aerosol-generating device of FIGS. 1A-1C according to at least one example embodiment.
Figure 2F:
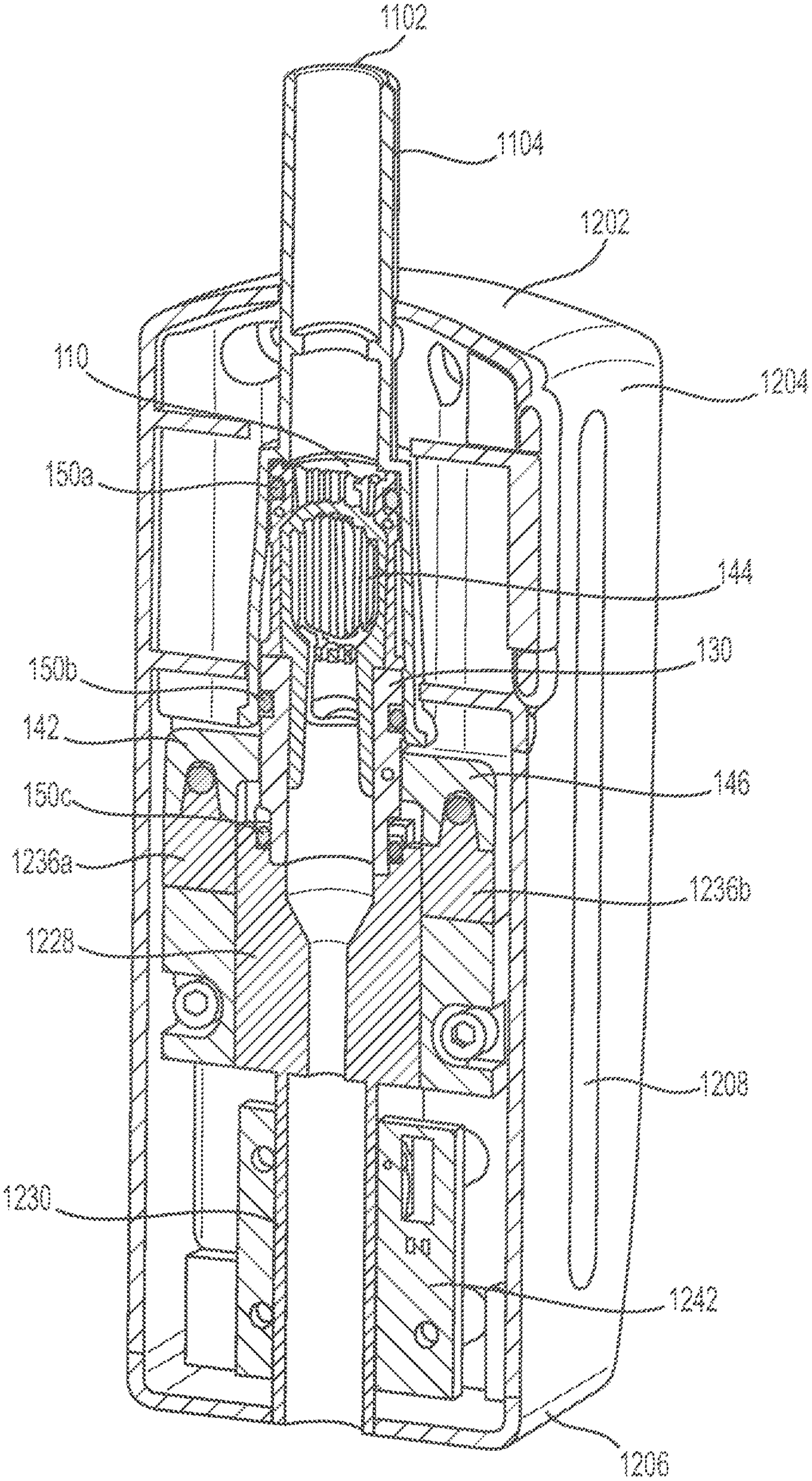

FIG. 2E is a cross-sectional view of the aerosol-generating device of FIGS. 1A-1C. FIG. 2F is another cross-sectional view of the aerosol-generating device of FIGS. 1A-1C. With regard to structures/components shown in the figures and already discussed above, it should be understood that such relevant teachings are also applicable to this section and may not have been repeated in the interest of brevity. Referring to FIGS. 2E-2F, the mouth-end segment 1104 of the mouthpiece 1100 is illustrated as defining an aerosol outlet 1102 in the form of a single outlet. However, it should be understood that example embodiments are not limited thereto. For instance, the aerosol outlet 102 may alternatively be in the form of a plurality of smaller outlets (e.g., two to six outlets). In one instance, the plurality of outlets may be in the form of four outlets. The outlets may be radially-arranged and/or outwardly-angled so as to release diverging streams of aerosol.

In an example embodiment, at least one of a filter or a flavor medium may be optionally disposed within the mouth-end segment 1104 of the mouthpiece 1100. In such an instance, a filter and/or a flavor medium will be downstream from the chamber 164 such that the aerosol generated therein passes through at least one of the filter or the flavor medium before exiting through the at least one aerosol outlet 1102. The filter may reduce or prevent particles from the aerosol-forming substrate (e.g., aerosol-forming substrate 160*a* and/or aerosol-forming substrate 160*b*) from being inadvertently drawn from the capsule 100. The filter may also help reduce the temperature of the aerosol in order to provide the desired mouth feel. The flavor medium (e.g., flavor beads) may release a flavorant when the aerosol passes therethrough so as to impart the aerosol with a desired flavor. The flavorant may be the same as described above in connection with the aerosol-forming substrate. Furthermore, the filter and/or the flavor medium may have a consolidated form or a loose form as described supra in connection with the aerosol-forming substrate.

The aerosol-generating device 10 may also include a third annular member 150*c* seated within the receptacle 1228. The third annular member 150*c* (e.g., resilient O-ring) is configured to establish an air seal when the base portion 130 of the capsule 100 is fully inserted into the receptacle 1228. As a result, most if not all of the air drawn into the receptacle 1228 will pass through the capsule 100, and any bypass flow around the capsule 100 will be minuscule if any. In an example embodiment, the first annular member 150*a*, the second annular member 150*b*, and/or the third annular member 150*c* may be formed of clear silicone.

In addition to the printed circuit boards already discussed above, the aerosol-generating device 10 may also include a fifth printed circuit board 1246 (e.g., main PCB) disposed between the frame 1208 and the power supply 1234. The power supply 1234 may be a 900 mAh battery, although example embodiments are not limited thereto. Furthermore, a sensor 1248 may be disposed upstream from the capsule 100 to enhance an operation of the aerosol-generating device 10. For instance, the sensor 1248 may be an air flow sensor. In view of the sensor 1248 as well as the first button 1218 and the second button 1220, the operation of the aerosol-generating device 10 may be an automatic operation (e.g., puff-activated) or a manual operation (e.g., button-activated). In at least one example embodiment, the sensor may be a microelectromechanical system (MEMS) flow or pressure sensor or another type of sensor configured to measure air flow such as a hot-wire anemometer.

Upon activating the aerosol-generating device 10, the capsule 100 within the device body 1200 may be heated to generate an aerosol. In an example embodiment, the activation of the aerosol-generating device 10 may be triggered by the detection of an air flow by the sensor 1248 and/or the generation of a signal associated with the pressing of the first button 1218 and/or the second button 1220. With regard to the detection of an air flow, a draw or application of negative pressure on the aerosol outlet 1102 of the mouthpiece 1100 will pull ambient air into the device body 1200 via the inlet channel 1230, wherein the air may initially pass through an inlet insert 1222 (e.g., FIG. 1C). Once inside the device body 1200, the air travels through the inlet channel 1230 to the receptacle 1228 where it is detected by the sensor 1248. After the sensor 1248, the air continues through the receptacle 1228 and enters the capsule 100 via the base portion 130. Specifically, the air will flow through the base inlet 132 of the capsule 100 before passing through the upstream passageway 162 and into the chamber 164. Moreover, the control circuitry (e.g., a controller 2105) may instruct a power supply to supply an electric current to the heater 336 to maintain a temperature of the capsule 100 between draws.

The detection of the air flow by the sensor 1248 may cause the control circuitry to the power supply 1234 to supply an electric current to the capsule 100 via the first end section 142 and the second end section 146 of the heater 336. As a result, the temperature of the intermediate section 144 of the heater 336 will increase which, in turn, will cause the temperature of the aerosol-forming substrate (e.g., aerosol-forming substrate 160*a* and/or aerosol-forming substrate 160*b*) inside the chamber 164 to increase such that volatiles are released by the aerosol-forming substrate to produce an aerosol. The aerosol produced will be entrained by the air flowing through the chamber 164. In particular, the aerosol produced in the chamber 164 will pass through the downstream passageway 166 of the capsule 100 before exiting the aerosol-generating device 10 from the aerosol outlet 1102 of the mouthpiece 1100.

Additional details and/or alternatives for the aerosol-generating devices, capsules, and/or the aerosol-forming substrate may be found in discussed herein may also be found in U.S. application Ser. No. 17/151,327, titled "HEAT-NOT-BURN (HNB) AEROSOL-GENERATING DEVICES AND CAPSULES," filed concurrently herewith; U.S. application Ser. No. 29/766,689, titled "HEAT-NOT-BURN AEROSOL GENERATING DEVICE WITH A FLIP-TOP LID," filed concurrently herewith; U.S. application Ser. No. 17/151,277, titled "CAPSULES INCLUDING EMBEDDED HEATERS AND HEAT-NOT-BURN (HNB) AEROSOL-GENERATING DEVICES," filed concurrently herewith; U.S. application Ser. No. 17/151,317, titled "CLOSED SYSTEM CAPSULE WITH AIRFLOW, HEAT-NOT-BURN (HNB) AEROSOL-GENERATING DEVICES, AND METHODS OF GENERATING AN AEROSOL," filed concurrently herewith; U.S. application Ser. No. 29/766,691, titled "AEROSOL-GENERATING CAPSULES," filed filed concurrently herewith; and U.S. application Ser. No. 17/151,340, titled "HEAT-NOT-BURN (HNB) AEROSOL-GENERATING DEVICES AND CAPSULES," filed concurrently herewith, the disclosures of each of which are incorporated herein in their entirety by reference.

Figure 3:
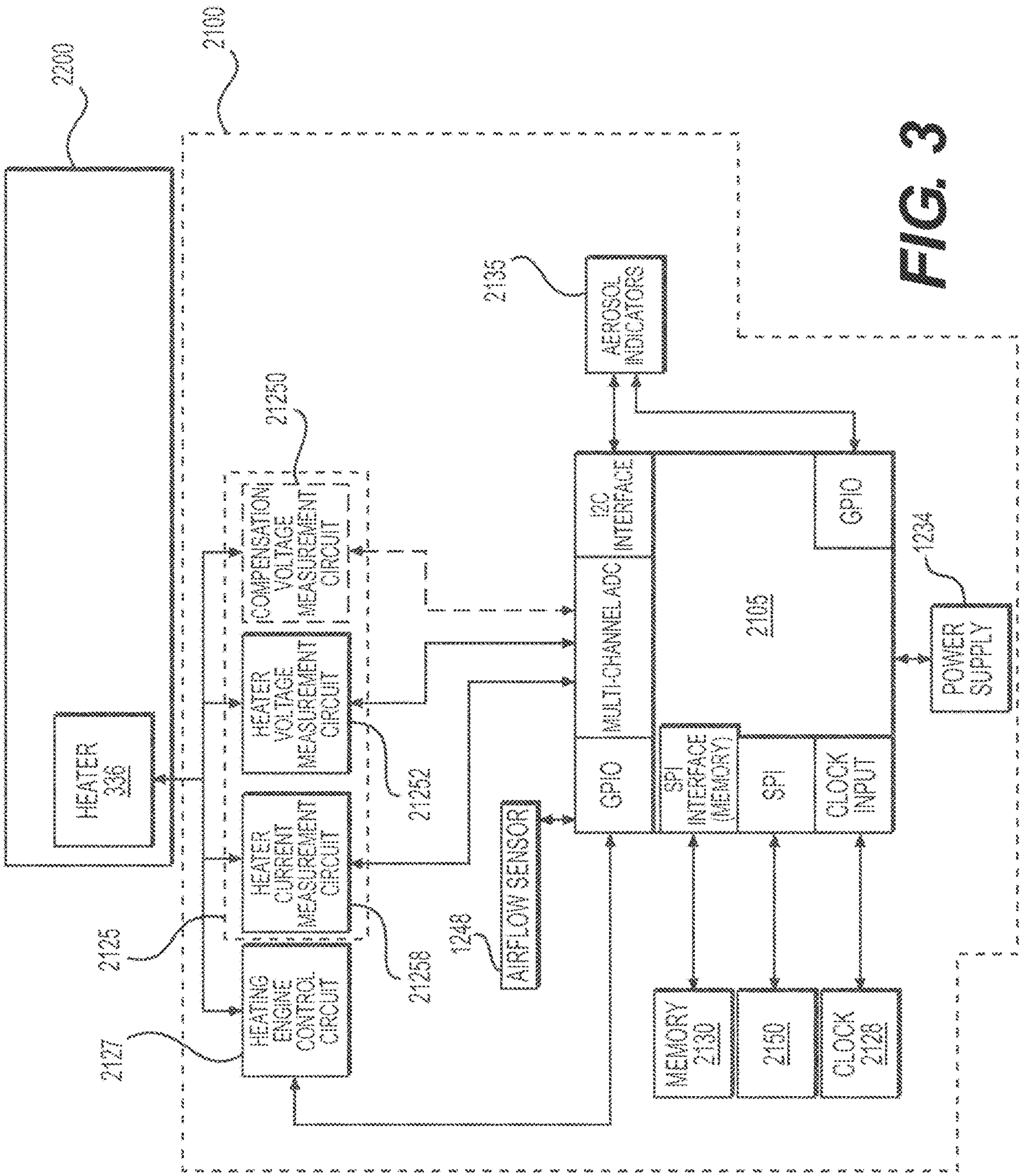
FIG. 3 illustrates electrical systems of an aerosol-generating device and a capsule according to one or more example embodiments.

FIG. 3 illustrates electrical systems of an aerosol-generating device and a capsule according to one or more example embodiments.

Referring to FIG. 3, the electrical systems include an aerosol-generating device electrical system 2100 and a capsule electrical system 2200. The aerosol-generating device electrical system 2100 may be included in the aerosol-generating device 10, and the capsule electrical system 2200 may be included in the capsule 100.

In the example embodiment shown in FIG. 3, the capsule electrical system 2200 includes the heater 336.

The capsule electrical system 2200 may further include a body electrical/data interface (not shown) for transferring power and/or data between the aerosol-generating device 10 and the capsule 100. According to at least one example embodiment, the electrical contacts shown in FIG. 2B, for example, may serve as the body electrical interface, but example embodiments are not limited thereto.

The aerosol-generating device electrical system 2100 includes a controller 2105, a power supply 1234, device sensors or measurement circuits 2125, a heating engine control circuit 2127, aerosol indicators 2135, on-product controls 2150 (e.g., buttons 1218 and 1220 shown in FIG. 1B), a memory 2130, and a clock circuit 2128. In some example embodiments, the controller 2105, the power supply 1234, device sensors or measurement circuits 2125, the heating engine control circuit 2127, the memory 2130, and the clock circuit 2128 are on the same PCB (e.g., the main PCB 1246). The aerosol-generating device electrical system 2100 may further include a capsule electrical/data interface (not shown) for transferring power and/or data between the aerosol-generating device 10 and the capsule 100.

The power supply 1234 may be an internal power supply to supply power to the aerosol-generating device 10 and the capsule 100. The supply of power from the power supply 1234 may be controlled by the controller 2105 through power control circuitry (not shown). The power control circuitry may include one or more switches or transistors to regulate power output from the power supply 1234. The power supply 1234 may be a Lithium-ion battery or a variant thereof (e.g., a Lithium-ion polymer battery).

The controller 2105 may be configured to control overall operation of the aerosol-generating device 10. According to at least some example embodiments, the controller 2105 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In the example embodiment shown in FIG. 3, the controller 2105 is illustrated as a microcontroller including: input/output (I/O) interfaces, such as general purpose input/outputs (GPIOs), inter-integrated circuit ($I^2C$) interfaces, serial peripheral interface bus (SPI) interfaces, or the like; a multichannel analog-to-digital converter (ADC); and a clock input terminal. However, example embodiments should not be limited to this example. In at least one example implementation, the controller 2105 may be a microprocessor.

The memory 2130 is illustrated as being external to the controller 2105, in some example embodiments the memory 2130 may be on board the controller 2105.

The controller 2105 is communicatively coupled to the device sensors 2125, the heating engine control circuit 2127, aerosol indicators 2135, the memory 2130, the on-product controls 2150, the clock circuit 2128 and the power supply 1234.

The heating engine control circuit 2127 is connected to the controller 2105 via a GPIO (General Purpose Input/Output) pin. The memory 2130 is connected to the controller 2105 via a SPI (Serial Peripheral Interface) pin. The clock circuit 2128 is connected to a clock input pin of the controller 2105. The aerosol indicators 2135 are connected to the controller 2105 via an $I^2C$ (Inter-Integrated Circuit) interface pin and a SPI/GPIO pin. The device sensors 2125 are connected to the controller 2105 through respective pins of the multi-channel ADC.

The clock circuit 2128 may be a timing mechanism, such as an oscillator circuit, to enable the controller 2105 to track idle time, preheat length, aerosol-generating (draw) length, a combination of idle time and aerosol-generating (draw) length, a power-use time to determine a hot capsule alert (e.g., 30 s after instance has ended) or the like, of the aerosol-generating device 10. The clock circuit 2128 may also include a dedicated external clock crystal configured to generate the system clock for the aerosol-generating device 10.

The memory 2130 may be a non-volatile memory storing operational parameters and computer readable instructions for the controller 2105 to perform the algorithms described herein. In one example, the memory 2130 may be an electrically erasable programmable read-only memory (EEPROM), such as a flash memory or the like.

Still referring to FIG. 3, the device sensors 2125 may include a plurality of sensor or measurement circuits configured to provide signals indicative of sensor or measurement information to the controller 2105. In the example shown in FIG. 3, the device sensors 2125 include a heater current measurement circuit 21258, a heater voltage measurement circuit 21252, and a compensation voltage measurement circuit 21250. The electrical systems of FIG. 3 may further includes the sensors discussed with reference to FIGS. 1A-2F.

The heater current measurement circuit 21258 may be configured to output (e.g., voltage) signals indicative of the current through the heater 336. An example embodiment of the heater current measurement circuit 21258 will be discussed in more detail later with regard to FIG. 5.

The heater voltage measurement circuit 21252 may be configured to output (e.g., voltage) signals indicative of the voltage across the heater 336. An example embodiment of the heater voltage measurement circuit 21252 will be discussed in more detail later with regard to FIG. 4.

The compensation voltage measurement circuit 21250 may be configured to output (e.g., voltage) signals indicative of the resistance of electrical power interface (e.g., electrical connector) between the capsule 100 and the aerosol-generating device 10. In some example embodiments, the compensation voltage measurement circuit 21250 may provide compensation voltage measurement signals to the controller 2105. Example embodiments of the compensation voltage measurement circuit 21250 will be discussed in more detail later with regard to FIGS. 6A-6B.

As discussed above, the compensation voltage measurement circuit 21250, the heater current measurement circuit 21258 and the heater voltage measurement circuit 21252 are connected to the controller 2105 via pins of the multichannel ADC. To measure characteristics and/or parameters of the aerosol-generating device 10 and the capsule 100 (e.g., voltage, current, resistance, temperature, or the like, of the heater 336), the multi-channel ADC at the controller 2105 may sample the output signals from the device sensors 2125 at a sampling rate appropriate for the given characteristic and/or parameter being measured by the respective device sensor.

The aerosol-generating device electrical system 2100 may include the sensor 1248 to measure airflow through the aerosol-generating device 10. In at least one example embodiment, the sensor may be a microelectromechanical system (MEMS) flow or pressure sensor or another type of sensor configured to measure air flow such as a hot-wire anemometer. In an example embodiment, the output of the sensor to measure airflow to the controller 2105 is instantaneous measurement of flow (in ml/s or $cm^3$/s) via a digital interface or SPI. In other example embodiments, the sensor may be a hot-wire anemometer, a digital MEMS sensor or other known sensors. The flow sensor may be operated as a puff sensor by detecting a draw when the flow value is greater than or equal to 1 mL/s, and terminating a draw when the flow value subsequently drops to 0 mL/s. In an example embodiment, the sensor 1248 may be a MEMS flow sensor based differential pressure sensor with the differential pressure (in Pascals) converted to an instantaneous flow reading (in mL/s) using a curve fitting calibration function or a Look Up Table (of flow values for each differential pressure reading). In another example embodiment, the flow sensor may be a capacitive pressure drop sensor.

The heating engine control circuit 2127 is connected to the controller 2105 via a GPIO pin. The heating engine control circuit 2127 is configured to control (enable and/or disable) the heater 336 of the aerosol-generating device 10 by controlling power to the heater 336.

The controller 2105 may control the aerosol indicators 2135 to indicate statuses and/or operations of the aerosol-generating device 10 to an adult operator. The aerosol indicators 2135 may be at least partially implemented via a light guide and may include a power indicator (e.g., LED) that may be activated when the controller 2105 senses a button pressed by the adult operator. The aerosol indicators 2135 may also include a vibrator, speaker, or other feedback mechanisms, and may indicate a current state of an adult operator-controlled aerosol generating parameter (e.g., aerosol volume).

Still referring to FIG. 3, the controller 2105 may control power to the heater 336 to heat the aerosol-forming substrate in accordance with a heating profile (e.g., heating based on volume, temperature, flavor, or the like). The heating profile may be determined based on empirical data and may be stored in the memory 2130 of the aerosol-generating device 10.

Figure 4:
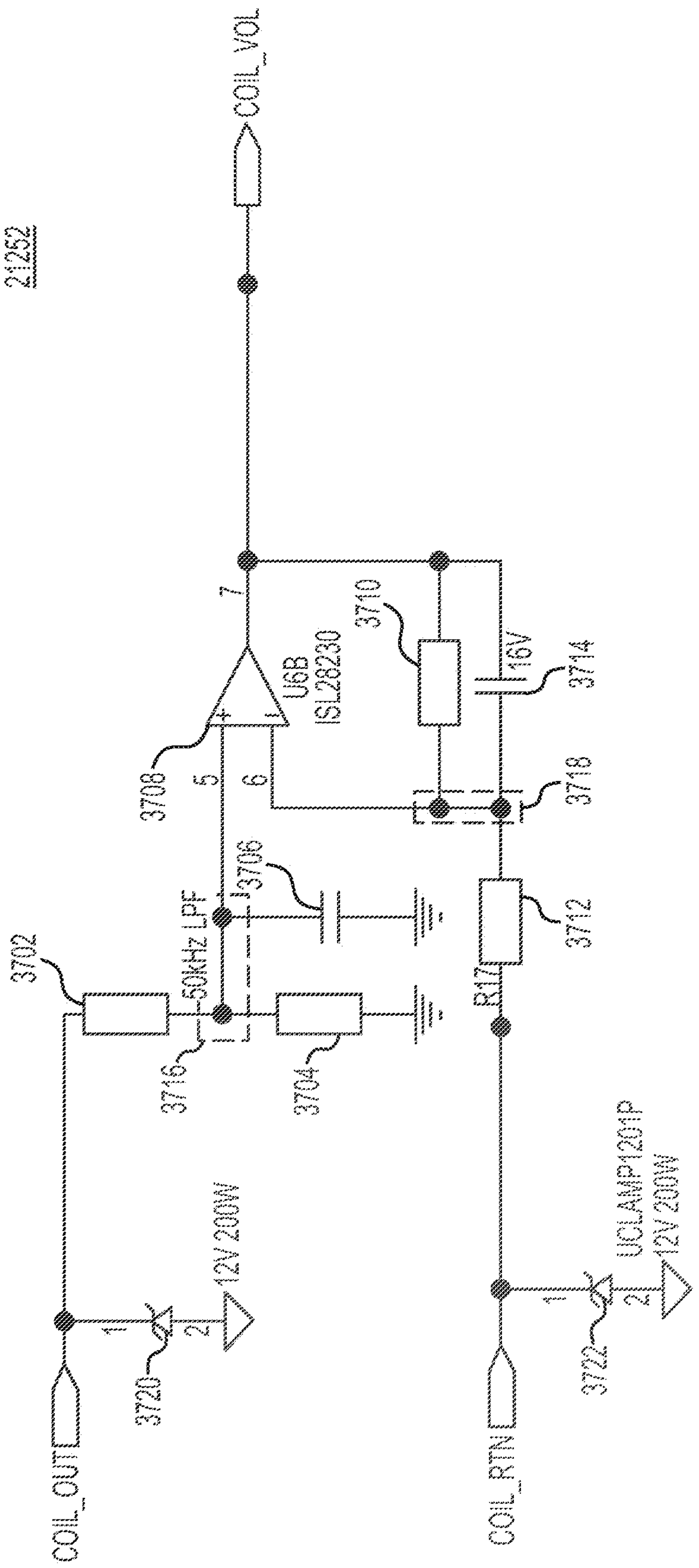
FIG. 4 illustrates a heater voltage measurement circuit according to one or more example embodiments.

FIG. 4 illustrates an example embodiment of the heater voltage measurement circuit 21252.

Referring to FIG. 4, the heater voltage measurement circuit 21252 includes a resistor 3702 and a resistor 3704 connected in a voltage divider configuration between a terminal configured to receive an input voltage signal COIL_OUT and ground. The resistances of the resistor 3702 and the resistor 3704 may be 8.2 kiloohms and 3.3 kiloohms, respectively. The input voltage signal COIL_OUT is the voltage input to (voltage at an input terminal of) the heater 336. A node N3716 between the resistor 3702 and the resistor 3704 is coupled to a positive input of an operational amplifier (Op-Amp) 3708. A capacitor 3706 is connected between the node N3716 and ground to form a low-pass filter circuit (an R/C filter) to stabilize the voltage input to the positive input of the Op-Amp 3708. The capacitance of the capacitor 3706 may be 18 nanofarads, for example. The filter circuit may also reduce inaccuracy due to switching noise induced by PWM signals used to energize the heater 336, and have the same phase response/group delay for both current and voltage.

The heater voltage measurement circuit 21252 further includes resistors 3710 and 3712 and a capacitor 3714. The resistor 3712 is connected between node N3718 and a terminal configured to receive an output voltage signal COIL_RTN and may have a resistance of 8.2 kiloohms, for example. The output voltage signal COIL_RTN is the voltage output from (voltage at an output terminal of) the heater 336.

Resistor 3710 and capacitor 3714 are connected in parallel between a node N3718 and an output of the Op-Amp 3708. The resistor 3710 may have a resistance of 3.3 kiloohms and the capacitor 3714 may have a capacitance of 18 nanofarads, for example. A negative input of the Op-Amp 3708 is also connected to node N3718. The resistors 3710 and 3712 and the capacitor 3714 are connected in a low-pass filter circuit configuration.

The heater voltage measurement circuit 21252 utilizes the Op-Amp 3708 to measure the voltage differential between the input voltage signal COIL_OUT and the output voltage signal COIL_RTN, and output a scaled heater voltage measurement signal COIL_VOL that represents the voltage across the heater 336. The heater voltage measurement circuit 21252 outputs the scaled heater voltage measurement signal COIL_VOL to an ADC pin of the controller 2105 for digital sampling and measurement by the controller 2105.

The gain of the Op-Amp 3708 may be set based on the surrounding passive electrical elements (e.g., resistors and capacitors) to improve the dynamic range of the voltage measurement. In one example, the dynamic range of the Op-Amp 3708 may be achieved by scaling the voltage so that the maximum voltage output matches the maximum input range of the ADC (e.g., about 2.5V). In at least one example embodiment, the scaling may be about 402 mV per V, and thus, the heater voltage measurement circuit 21252 may measure up to about 2.5V/0.402V=6.22V.

The voltage signals COIL_OUT and COIL_RTN are clamped by diodes 3720 and 3722, respectively, to reduce risk of damage due to electrostatic discharge (ESD) events.

In some example embodiments, four wire/Kelvin measurement may be used and the voltage signals COIL_OUT and COIL_RTN may be measured at measurement contact points (also referred to as voltage sensing connections (as opposed to main power contacts)) to take into account the contact and bulk resistances of an electrical power interface (e.g., electrical connector) between the heater 336 and the aerosol-generating device 10.

Figure 5:
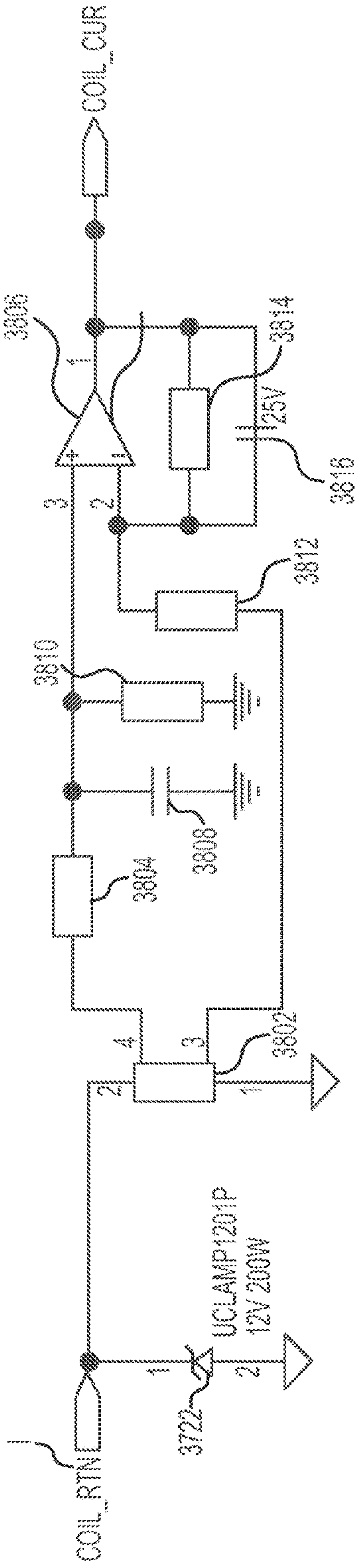
FIG. 5 illustrates a heater current measurement circuit according to one or more example embodiments.

FIG. 5 illustrates an example embodiment of the heater current measurement circuit 21258 shown in FIG. 3.

Referring to FIG. 5, an output current signal COIL_RTN_I is input to a four terminal (4T) measurement resistor 3802 connected to ground. The differential voltage across the four terminal measurement resistor 3802 is scaled by an Op-Amp 3806, which outputs a heater current measurement signal COIL_CUR indicative of the current through the heater 336. The heater current measurement signal COIL_CUR is output to an ADC pin of the controller 2105 for digital sampling and measurement of the current through the heater 336 at the controller 2105.

In the example embodiment shown in FIG. 5, the four terminal measurement resistor 3802 may be used to reduce error in the current measurement using a four wire/Kelvin current measurement technique. In this example, separation of the current measurement path from the voltage measurement path may reduce noise on the voltage measurement path.

The gain of the Op-Amp 3806 may be set to improve the dynamic range of the measurement. In this example, the scaling of the Op-Amp 3806 may be about 0.820 V/A, and thus, the heater current measurement circuit 21258 may measure up to about 2.5 V/(0.820 V/A)=3.05 A.

Referring to FIG. 5 in more detail, a first terminal of the four terminal measurement resistor 3802 is connected to a terminal of the heater 336 to receive the output current signal COIL_RTN_I. A second terminal of the four terminal measurement resistor 3802 is connected to ground. A third terminal of the four terminal measurement resistor 3802 is connected to a low-pass filter circuit (R/C filter) including resistor 3804, capacitor 3808 and resistor 3810. The resistance of the resistor 3804 may be 100 ohms, the resistance of the resistor 3810 may be 8.2 kiloohms and the capacitance of the capacitor 3808 may be 3.3. nanofarads, for example.

The output of the low-pass filter circuit is connected to a positive input of the Op-Amp 3806. The low-pass filter circuit may reduce inaccuracy due to switching noise induced by the PWM signals applied to energize the heater 336, and may also have the same phase response/group delay for both current and voltage.

The heater current measurement circuit 21258 further includes resistors 3812 and 3814 and a capacitor 3816. The resistors 3812 and 3814 and the capacitor 3816 are connected to the fourth terminal of the four terminal measurement resistor 3802, a negative input of the Op-Amp 3806 and an output of the Op-Amp 3806 in a low-pass filter circuit configuration, wherein the output of the low-pass filter circuit is connected to the negative input of the Op-Amp 3806. The resistors 3812 and 3814 may have resistances of 100 ohms and 8.2 kiloohms, respectively, and the capacitor 3816 may have a capacitance of 3.3. nanofarads, for example.

The Op-Amp 3806 outputs a differential voltage as the heater current measurement signal COIL_CUR to an ADC pin of the controller 2105 for sampling and measurement of the current through the heater 336 by the controller 2105.

According to at least this example embodiment, the configuration of the heater current measurement circuit 21258 is similar to the configuration of the heater voltage measurement circuit 21252, except that the low-pass filter circuit including resistors 3804 and 3810 and the capacitor 3808 is connected to a terminal of the four terminal measurement resistor 3802 and the low-pass filter circuit including the resistors 3812 and 3814 and the capacitor 3816 is connected to another terminal of the four terminal measurement resistor 3802.

The controller 2105 may average multiple samples (e.g., of voltage) over a time window (e.g., about 1 ms) corresponding to the 'tick' time (iteration time of a control loop) used in the aerosol-generating device 10, and convert the average to a mathematical representation of the voltage and current across the heater 336 through application of a scaling value. The scaling value may be determined based on the gain settings implemented at the respective Op-Amps, which may be specific to the hardware of the aerosol-generating device 10.

The controller 2105 may filter the converted voltage and current measurements using, for example, a three tap moving average filter to attenuate measurement noise. The controller 2105 may then use the filtered measurements to calculate: resistance $R_{HEATER}$ of the heater 336 ($R_{HEATER}$=COIL_VOL/COIL_CUR), power $P_{HEATER}$ applied to the heater 336 ($P_{HEATER}$=COIL_VOL*COIL_CUR) or the like.

According to one or more example embodiments, the gain settings of the passive elements of the circuits shown in FIGS. 4 and/or 5 may be adjusted to match the output signal range to the input range of the controller 2105.

Figure 6A:
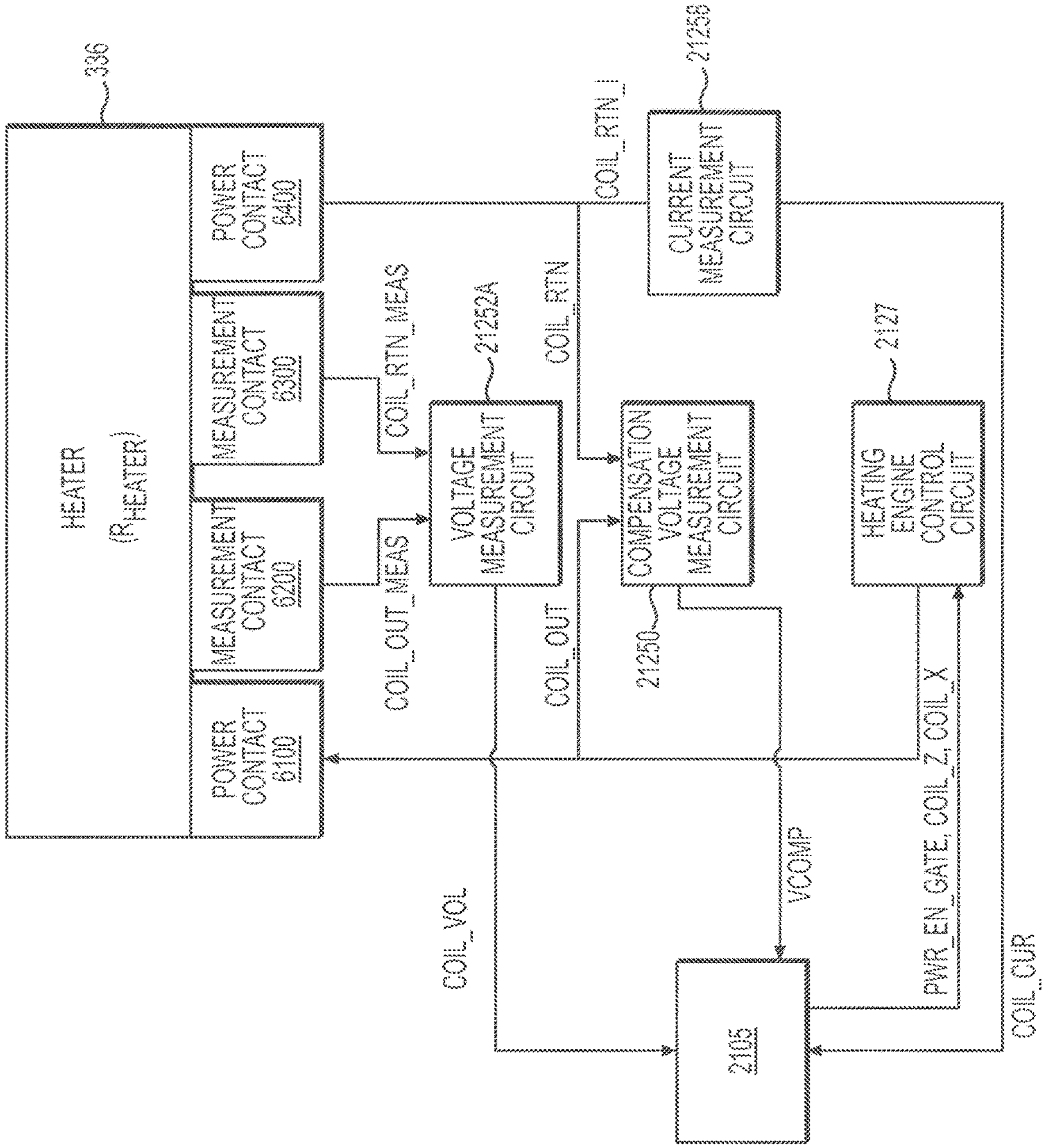
FIGS. 6A-6B illustrates a compensation voltage measurement circuit and algorithm according to one or more example embodiments.

FIG. 6A illustrates electrical systems of an aerosol-generating device including a separate compensation voltage measurement circuit according to one or more example embodiments.

As shown in FIG. 6A, a contact interface between the heater 336 and the aerosol-generating device electrical system 2100 includes a four wire/Kelvin arrangement having an input power contact 6100, an input measurement contact 6200, an output measurement contact 6300 and an output power contact 6400.

A voltage measurement circuit 21252A receives a measurement voltage COIL_OUT_MEAS at the input measurement contact 6200 and an output measurement voltage COIL_RTN_MEAS at the output measurement contact 6300. The voltage measurement circuit 21252A is the same circuit as the voltage measurement circuit 21252 illustrated in FIG. 4 and outputs the scaled heater voltage measurement signal COIL_VOL. While in FIG. 4 COIL_OUT and COIL_RTN are illustrated, it should be understood that in example embodiments without a separate compensation voltage measurement circuit, the voltage measurement circuit 21252 may receive voltages at the input and output measurement contacts 6200, 6300 instead of the input and output power contacts 6100, 6400.

The systems shown in FIG. 6A further include the compensation voltage measurement circuit 21250. The compensation voltage measurement circuit 21250 is the same as the voltage measurement circuit 21252A except the compensation voltage measurement circuit 21250 receives the voltage COIL_OUT at the input power contact 6100 and receives the voltage COIL_RTN at the output power contact 6400 and outputs a compensation voltage measurement signal VCOMP.

The current measurement circuit 21258 receives the output current signal COIL_RTN_I at the output power contact 6400 and outputs the heater current measurement signal COIL_CUR.

Figure 6B:
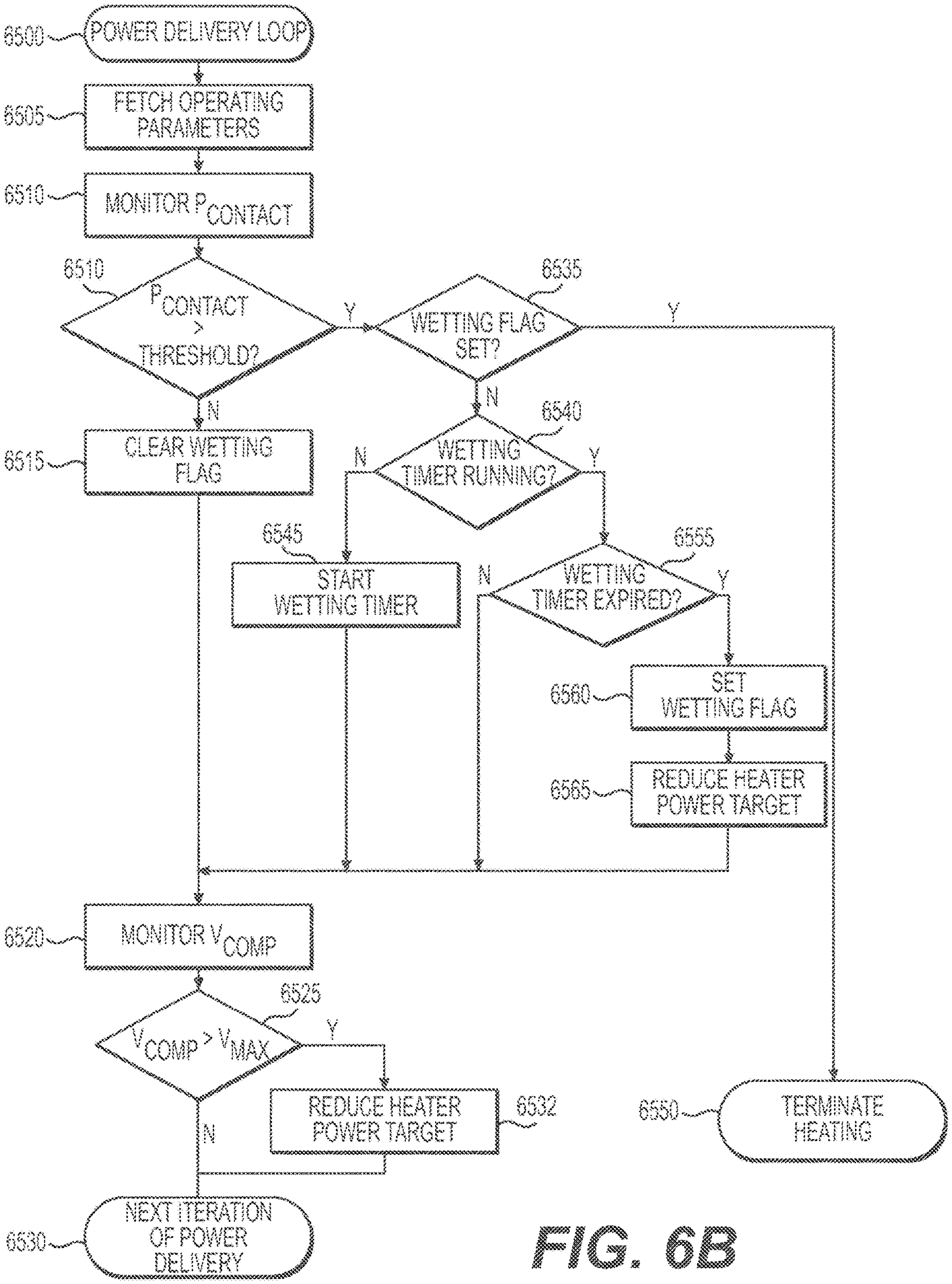

FIG. 6B illustrates a method of the using a compensation voltage measurement signal to adjust a target power for a heater according to example embodiments.

The controller 2105 may perform the method shown in FIG. 6B.

At S6500, the controller starts a power delivery loop for the heater. At 6505, the controller pulls the operating parameters (e.g., heating engine control circuit threshold voltage, power loss threshold and wetting timer limit) from the memory.

At 6510, the controller determines whether power lost at the contacts PCONTACT exceeds a loss threshold. The controller may determine the power lost at the contacts PCONTACT as follows:

$$PCONTACT=abs((VCOMP*COIL\_CUR)-(COIL\_VOL*COIL\_CUR))$$

The loss threshold may be an absolute value (e.g., 3 W) or a percentage of the power applied to the heater (e.g., 25%).

If the controller determines the power lost PCONTACT is equal to or less than the loss threshold, the controller clears a wetting flag at S6515. The controller monitors the compensation voltage measurement signal VCOMP at S6520 and determines whether the compensation voltage measurement signal VCOMP exceeds a threshold voltage VMAX at S6525. The threshold voltage VMAX may be the rated voltage of the heating engine control circuit 2127.

If the controller determines the compensation voltage measurement signal VCOMP does not exceed the threshold voltage VMAX, the controller proceeds to the next iteration (i.e., next tick time) at S6530. If the controller determines the compensation voltage measurement signal VCOMP exceeds the threshold voltage VMAX, the controller reduces the heater power target for the next iteration at S6532 and proceeds to the next iteration at 6530.

Thus, if the power loss PCONTACT is less than the loss threshold, the controller may reduce the applied power to reduce a contact heating effect.

Returning back to S6510, if the controller determines the power lost PCONTACT is greater than the loss threshold, the controller determines if a wetting flag is set at 6535. If the controller determines the wetting flag is set at S6535, the controller terminates heating (e.g., does not supply power to the heater) at S6550.

If the controller determines the wetting flag is not set at S6535, the controller determines whether a wetting timer is running at S6540. The wetting time is used to permit an increased power loss for a desired/selected time period (e.g., 200 ms).

If the controller determines the wetting timer is not running, the controller starts the wetting timer at S6545 and then proceeds to monitor the compensation voltage measurement signal VCOMP at 6520.

If the controller determines the wetting timer is running at S6540, the controller determines whether the wetting timer has expired at S6555. If the controller determines the wetting timer is not expired, the controller proceeds to monitor the compensation voltage measurement signal VCOMP at S6520. Thus, the power loss in the contacts PCONTACT being above the power loss threshold is permitted if the wetting timer is still running.

If the controller determines the wetting timer is expired, the controller sets the wetting flag at 6560. The controller then reduces a heater power target at S6565 such that the power loss in the contacts PCONTACT falls below the loss threshold and the controller proceeds to monitor the compensation voltage measurement signal VCOMP at 6520. More specifically, the controller sets an upper power limit that can be used by the PID controller (i.e., instead of the PID loop being able to use a full power range it is restricted to a lower range such as 6 W instead of 12 W). The controller continues to use the same temperature error input, but responds more slowly since an upper power limit is lowered.

In other example embodiments, a controller may change the temperature target.

Contact resistances change with temperature (and may alternatively go down due to "wetting current" removing an oxidation layer of the contact) and, as a result, a proportion of power lost in the power contacts may change during use. By compensating for power loss at the contacts, the electrical systems improve the delivery of power to the heater (e.g., a latency to achieve a heater temperature can be reduced by increasing power once a wetting effect has taken place).

On each subsequent iteration of the power delivery loop shown in FIG. 6B, the controller 2105 may re-enter a 'wetting' process (e.g., to respond to a change in contact forces), however, the wetting flag is used to ensure that the controller does not continually restart the process.

Figure 7A:
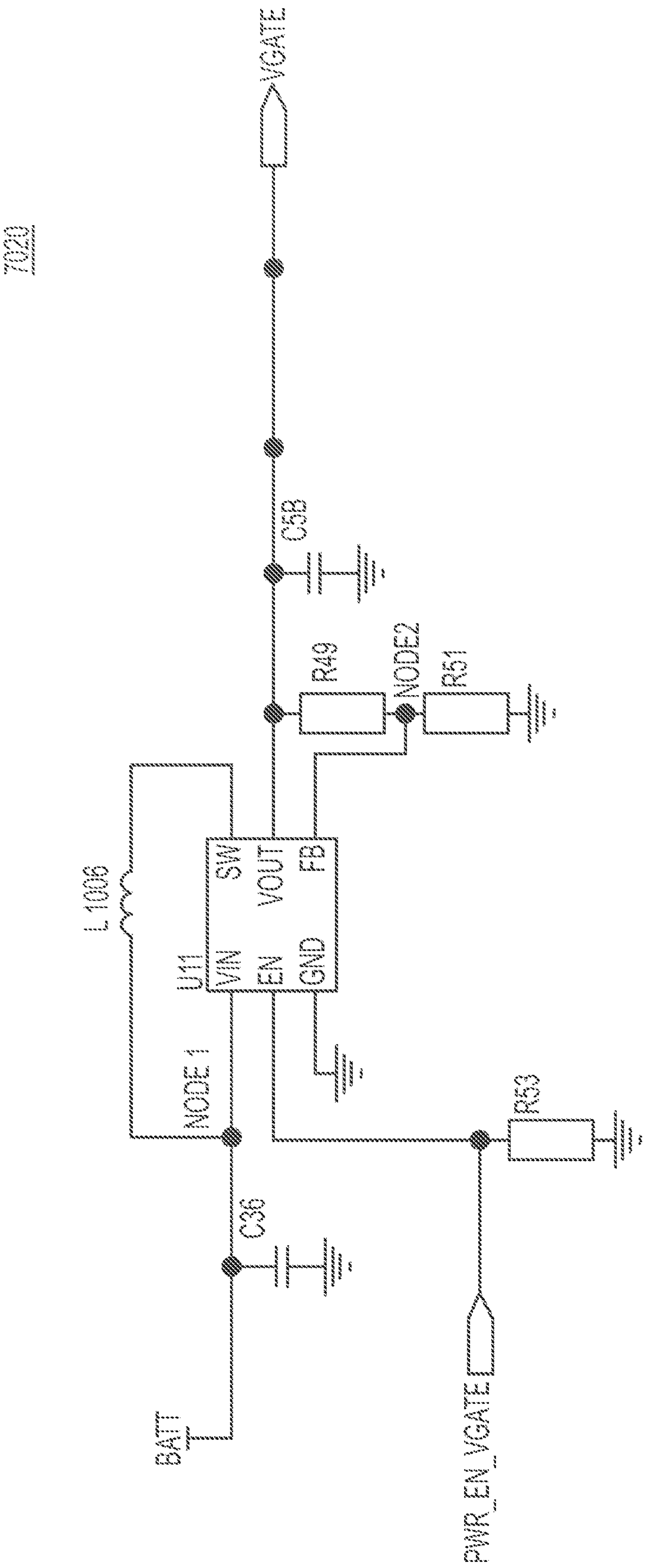
FIGS. 7A-7C illustrates a circuit diagrams illustrating a heating engine control circuit according to one or more example embodiments.
Figure 7B:
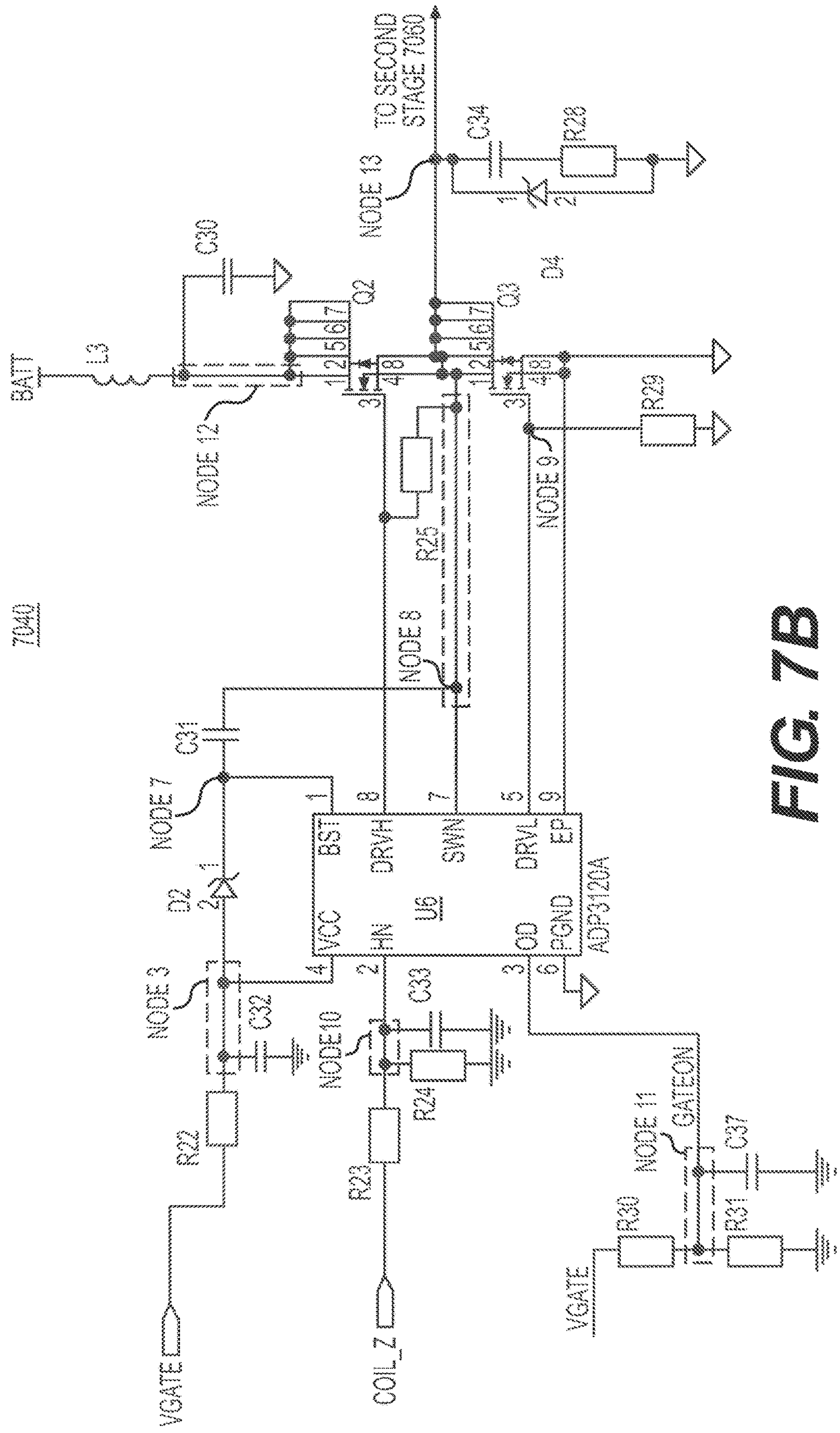
Figure 7C:
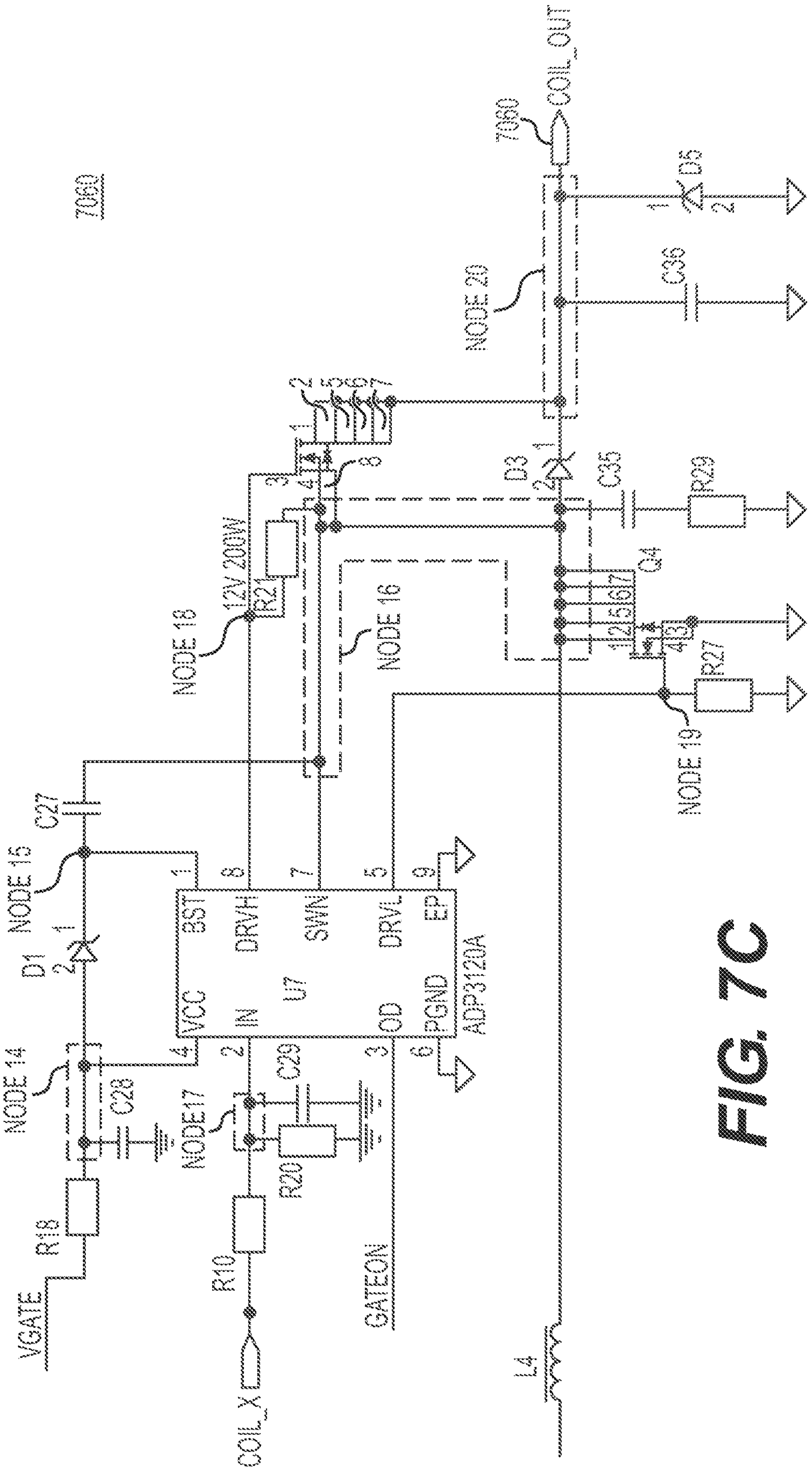

FIGS. 7A-7C is a circuit diagram illustrating a heating engine control circuit according to example embodiments. The heating engine control circuit shown in FIGS. 7A-7C is an example of the heating engine control circuit 2127 shown in FIG. 3.

The heating engine control circuit includes a boost converter circuit 7020 (FIG. 7A), a first stage 7040 (FIG. 7B) and a second stage 7060 (FIG. 7C).

The boost converter circuit 7020 is configured to create a voltage signal VGATE (e.g., 9V supply) (also referred to as a power signal or input voltage signal) from a voltage source BATT to power the first stage 7040 based on a first power enable signal PWR_EN_VGATE (also referred to as a shutdown signal). The controller may generate the first power enable signal PWR_EN_VGATE to have a logic high level when the aerosol-generating device is ready to be used. In other words, the first power enable signal PWR_EN_VGATE has a logic high level when at least the controller detects that a capsule is properly connected to the aerosol-generating device. In other example embodiments, the first power enable signal PWR_EN_VGATE has a logic high level when the controller detects that a capsule is properly connected to the aerosol-generating device and the controller detects an action such as a button being pressed.

The first stage 7040 utilizes the input voltage signal VGATE from the boost converter circuit 7020 to drive the heating engine control circuit 2127. The first stage 7040 and the second stage 7060 form a buck-boost converter circuit.

In the example embodiment shown in FIG. 7A, the boost converter circuit 7020 generates the input voltage signal VGATE only if the first enable signal PWR_EN_VGATE is asserted (present). The controller 2105 may VGATE to cut power to the first stage 7040 by de-asserting (stopping or terminating) the first enable signal PWR_EN_VGATE. The first enable signal PWR_EN_VGATE may serve as a device state power signal for performing an aerosol-generating-off operation at the device 10. In this example, the controller 2105 may perform an aerosol-generating-off operation by de-asserting the first enable signal PWR_EN_VGATE, thereby disabling power to the first stage 7040, the second stage 7060 and the heater 336. The controller 2105 may then enable aerosol-generating at the device 10 by again asserting the first enable signal PWR_EN_VGATE to the boost converter circuit 7020.

The controller 2105 may generate the first enable signal PWR_EN_VGATE at a logic level such that boost converter circuit 7020 outputs the input voltage signal VGATE having a high level (at or approximately 9V) to enable power to the first stage 7040 and the heater 336 in response to aerosol-generating conditions at the device 10. The controller 2105 may generate the first enable signal PWR_EN_VGATE at another logic level such that boost converter circuit 7020 outputs the input voltage signal VGATE having a low level (at or approximately 0V) to disable power to the first stage 7040 and the heater 336, thereby performing a heater-off operation.

Referring in more detail to the boost converter circuit 7020 in FIG. 7A, a capacitor C36 is connected between the voltage source BATT and ground. The capacitor C36 may have a capacitance of 10 microfarads.

A first terminal of inductor L1006 is connected to node Node1 between the voltage source BATT and the capacitor C36. The inductor L1006 serves as the main storage element of the boost converter circuit 7020. The inductor L1006 may have an inductance of 10 microhenrys.

Node 1 is connected to a voltage input pin A1 a boost converter chip U11. In some example embodiments, the boost converter chip may be a TPS61046.

A second terminal of the inductor L1006 is connected to a switch pin SW of the boost converter chip U11. An enable pin EN of the booster converter chip U11 is configured to receive the first enable signal PWR_EN_VGATE from the controller 2105.

In the example shown in FIG. 7A, the boost converter chip U11 serves as the main switching element of the boost converter circuit 7020.

A resistor R53 is connected between the enable pin EN of the booster converter chip U11 and ground to act as a pull-down resistor to ensure that operation of the heater 336 is prevented when the first enable signal PWR_EN_GATE is in an indeterminate state. The resistor R53 may have a resistance of 100 kiloohms in some example embodiments.

A voltage output pin VOUT of the boost converter chip U11 is connected to a first terminal of a resistor R49 and first terminal of a capacitor C58. A second terminal of the capacitor C58 is connected to ground. A voltage output by the voltage output pin VOUT is the input voltage signal VGATE.

A second terminal of the resistor R49 and a first terminal of a resistor R51 are connected at a second node Node2. The second node Node2 is connected to a feedback pin FB of the booster converter chip U11. The booster converter chip U11 is configured to produce the input voltage signal VGATE at about 9V using the ratio of the resistance of the resistor R49 to the resistance of the resistor R51. In some example embodiments, the resistor R49 may have a resistance of 680 kiloohms and the resistor R51 may have a resistance of 66.5 kiloohms.

The capacitors C36 and C58 operate as smoothing capacitors and may have capacitances of 10 microfarads and 4.7 microfarads, respectively. The inductor L1006 may have an inductance selected based on a desired output voltage (e.g., 9V).

Referring now to FIG. 7B, the first stage 7040 receives the input voltage signal VGATE and a second enable signal COIL_Z. The second enable signal is a pulse-width-modulation (PWM) signal and is an input to the first stage 7040.

The first stage 7040 includes, among other things, an integrated gate driver U6 configured to convert low-current signal(s) from the controller 2105 to high-current signals for controlling switching of transistors of the first stage 7040. The integrated gate driver U6 is also configured to translate voltage levels from the controller 2105 to voltage levels required by the transistors of the first stage 7040. In the example embodiment shown in FIG. 7B, the integrated gate driver U6 is a half-bridge driver. However, example embodiments should not be limited to this example.

In more detail, the input voltage signal VGATE from the boost converter circuit 7020 is input to the first stage 7040 through a filter circuit including a resistor R22 and a capacitor C32. The resistor R22 may have a resistance of 10 ohms and the capacitor C32 may have a capacitance of 1 microfarad.

The filter circuit including the resistor R22 and the capacitor C32 is connected to the VCC pin (pin 4) of the integrated gate driver U6 and the anode of Zener diode D2 at node Node3. The second terminal of the capacitor C32 is connected to ground. The anode of the Zener diode D2 is connected to a first terminal of capacitor C32 and a boost pin BST (pin 1) of the integrated gate driver U6 at node Node7. A second terminal of the capacitor C31 is connected to the switching node pin SWN (pin 7) of the integrated gate driver U6 and between transistors Q2 and Q3 at node Node8. In the example embodiment shown in FIG. 7B, the Zener diode D2 and the capacitor C31 form part of a boot-strap charge-pump circuit connected between the input voltage pin VCC and the boost pin BST of the integrated gate driver U6. Because the capacitor C31 is connected to the input voltage signal VGATE from the boost converter circuit 7020, the capacitor C31 charges to a voltage almost equal to the input voltage signal VGATE through the diode D2. The capacitor C31 may have a capacitance of 220 nanofarads.

Still referring to FIG. 7B, a resistor R25 is connected between the high side gate driver pin DRVH (pin 8) and the switching node pin SWN (pin 7). A first terminal of a resistor R29 is connected to the low side gate driver pin DRVL at a node Node9. A second terminal of the resistor R29 is connected to ground.

A resistor R23 and a capacitor C33 form a filter circuit connected to the input pin IN (pin 2) of the integrated gate driver U6. The filter circuit is configured to remove high frequency noise from the second heater enable signal COIL_Z input to the input pin IN. The second heater enable signal COIL_Z is a PWM signal from the controller 2105. Thus, the filter circuit is designed to filter out high frequency components of a PWM square wave pulse train, slightly reduces the rise and fall times on the square wave edges so that transistors are turned on and off gradually.

A resistor R24 is connected to the filter circuit and the input pin IN at node Node10. The resistor R24 is used as a pull-down resistor, such that if the second heater enable signal COIL_Z is floating (or indeterminate), then the input pin IN of the integrated gate driver U6 is held at a logic low level to prevent activation of the heater 336.

A resistor R30 and a capacitor C37 form a filter circuit connected to a pin OD (pin 3) of the integrated gate driver U6. The filter circuit is configured to remove high frequency noise from the input voltage signal VGATE input to the pin OD.

A resistor R31 is connected to the filter circuit and the pin OD at node Node11. The resistor R31 is used as a pull-down resistor, such that if the input voltage signal VGATE is floating (or indeterminate), then the pin OD of the integrated gate driver U6 is held at a logic low level to prevent activation of the heater 336. The signal output by the filter circuit formed by the resistor R30 and the capacitor C37 is referred to as filtered signal GATEON. R30 and R31 are also a divider circuit such that the signal VGATE is divided down to ~2.5V for a transistor driver chip input.

The transistors Q2 and Q3 field-effect transistors (FETs) connected in series between the voltage source BATT and ground. In addition, a first terminal of an inductor L3 is connected to the voltage source BATT. A second terminal of the inductor L3 is connected to a first terminal of a capacitor C30 and to a drain of the transistor Q2 at a node Node12. A second terminal of the capacitor C30 is connected to ground. The inductor L3 and the capacitor C30 form a filter to reduce and/or prevent transient spikes from the voltage source BATT.

The gate of the transistor Q3 is connected to the low side gate driver pin DRVL (pin 5) of the integrated gate driver U6, the drain of the transistor Q3 is connected to the switching node pin SWN (pin 7) of the integrated gate driver U6 at node Node8, and the source of the transistor Q3 is connected to ground GND. When the low side gate drive signal output from the low side gate driver pin DRVL is high, the transistor Q3 is in a low impedance state (ON), thereby connecting the node Node8 to ground.

As mentioned above, because the capacitor C31 is connected to the input voltage signal VGATE from the boost converter circuit 7020, the capacitor C31 charges to a voltage equal or substantially equal to the input voltage signal VGATE through the diode D2.

When the low side gate drive signal output from the low side gate driver pin DRVL is low, the transistor Q3 switches to the high impedance state (OFF), and the high side gate driver pin DRVH (pin 8) is connected internally to the boost pin BST within the integrated gate driver U6. As a result, transistor Q2 is in a low impedance state (ON), thereby connecting the switching node SWN to the voltage source BATT to pull the switching node SWN (Node 8) to the voltage of the voltage source BATT.

In this case, the node Node7 is raised to a bootstrap voltage V(BST)≈V(VGATE)+V(BATT), which allows the gate-source voltage of the transistor Q2 to be the same or substantially the same as the voltage of the input voltage signal VGATE (e.g., V(VGATE)) regardless (or independent) of the voltage from the voltage source BATT. The circuit arrangement ensures that the BST voltage is not changed as the voltage of the voltage source drops, i.e., the transistors are efficiently switched even as the voltage of the voltage source BATT changes.

As a result, the switching node SWN (Node 8) provides a high current switched signal that may be used to generate a voltage output to the second stage 7060 (and a voltage output to the heater 336) that has a maximum value equal to the battery voltage source BATT, but is otherwise substantially independent of the voltage output from the battery voltage source BATT.

A first terminal of a capacitor C34 and an anode of a Zener diode D4 are connected to an output terminal to the second stage 7060 at a node Node13. The capacitor C34 and a resistor R28 are connected in series. A second terminal of the capacitor C34 and a first terminal of the resistor R28 are connected. A cathode of the Zener diode D4 and a second terminal of the resistor R28 are connected to ground.

The capacitor C34, the Zener diode D4 and the resistor R28 form a back EMF (electric and magnetic fields) prevention circuit that prevents energy from an inductor L4 (shown in FIG. 7C) from flowing back into the first stage 7040.

The resistor R25 is connected between the gate of the transistor Q2 and the drain of the transistor Q3. The resistor R25 serves as a pull-down resistor to ensure that the transistor Q2 switches to a high impedance more reliably.

The output of the first stage 7040 is substantially independent of the voltage of the voltage source and is less than or equal to the voltage of the voltage source. When the second heater enable signal COIL_Z is at 100% PWM, the transistor Q2 is always activated, and the output of the first stage 7040 is the voltage of the voltage source or substantially the voltage of the voltage source.

FIG. 7C illustrates the second stage 7060. The second stage 7060 boosts the voltage of the output signal from the first stage 7040. More specifically, when the second heater enable signal COIL_Z is at a constant logic high level, a third enable signal COIL_X may be activated to boost the output of the first stage 7040. The third enable signal COIL_X is a PWM signal from the controller 2105. The controller 2105 controls the widths of the pulses of the third enable signal COIL_X to boost the output of the first stage 7040 and generate the input voltage signal COIL_OUT. When the third enable signal COIL_X is at a constant low logic level, the output of the second stage 7060 is the output of the first stage 7040.

The second stage 7060 receives the input voltage signal VGATE, the third enable signal COIL_X and the filtered signal GATEON.

The second stage 7060 includes, among other things, an integrated gate driver U7 configured to convert low-current signal(s) from the controller 2105 to high-current signals for controlling switching of transistors of the second stage 7060. The integrated gate driver U7 is also configured to translate voltage levels from the controller 2105 to voltage levels required by the transistors of the second stage 7060. In the example embodiment shown in FIG. 7B, the integrated gate driver U7 is a half-bridge driver. However, example embodiments should not be limited to this example.

In more detail, the input voltage signal VGATE from the boost converter circuit 7020 is input to the second stage 7060 through a filter circuit including a resistor R18 and a capacitor C28. The resistor R18 may have a resistance of 10 ohms and the capacitor C28 may have a capacitance of 1 microfarad.

The filter circuit including the resistor R18 and the capacitor C28 is connected to the VCC pin (pin 4) of the integrated gate driver U7 and the anode of Zener diode D1 at node Node14. The second terminal of the capacitor C28 is connected to ground. The anode of the Zener diode D2 is connected to a first terminal of capacitor C27 and a boost pin BST (pin 1) of the integrated gate driver U7 at node Node15. A second terminal of the capacitor C27 is connected to the switching node pin SWN (pin 7) of the integrated gate driver U7 and between transistors Q1 and Q4 at node Node16.

In the example embodiment shown in FIG. 7C, the Zener diode D1 and the capacitor C27 form part of a boot-strap charge-pump circuit connected between the input voltage pin VCC and the boost pin BST of the integrated gate driver U7. Because the capacitor C27 is connected to the input voltage signal VGATE from the boost converter circuit 7020, the capacitor C27 charges to a voltage almost equal to the input voltage signal VGATE through the diode D1. The capacitor C31 may have a capacitance of 220 nanofarads.

Still referring to FIG. 7C, a resistor R21 is connected between the high side gate driver pin DRVH (pin 8) and the switching node pin SWN (pin 7). A gate of the transistor Q4 is connected to the low side gate driver pin DRVL (pin 5) of the integrated date driver U7.

A first terminal of the inductor L4 is connected to the output of the first stage 7040 and a second terminal of the inductor L4 is connected to the node Node16. The inductor L4 serves as the main storage element of the output of the first stage 7040. In example operation, when the integrated gate driver U7 outputs a low level signal from low side gate driver pin DRVL (pin 5), the transistor Q4 switches to a low impedance state (ON), thereby allowing current to flow through inductor L4 and transistor Q4. This stores energy in inductor L4, with the current increasing linearly over time. The current in the inductor is proportional to the switching frequency of the transistors (which is controlled by the third heater enable signal COIL_X).

A resistor R10 and a capacitor C29 form a filter circuit connected to the input pin IN (pin 2) of the integrated gate driver U7. The filter circuit is configured to remove high frequency noise from the third heater enable signal COIL_X input to the input pin IN.

A resistor R20 is connected to the filter circuit and the input pin IN at node Node17. The resistor R20 is used as a pull-down resistor, such that if the third heater enable signal COIL_X is floating (or indeterminate), then the input pin IN of the integrated gate driver U7 is held at a logic low level to prevent activation of the heater 336.

A resistor R30 and a capacitor C37 form a filter circuit connected to a pin OD (pin 3) of the integrated gate driver U6. The filter circuit is configured to remove high frequency noise from the input voltage signal VGATE input to the pin OD.

The pin OD of the integrated gate driver U7 receives the filtered signal GATEON.

The transistors Q1 and Q4 field-effect transistors (FETs). A gate of the transistor Q1 and a first terminal of the resistor R21 are connected to the high side gate driver pin DRVH (pin 8) of the integrated gate driver U7 at a node Node18.

A source of the transistor Q1 is connected to a second terminal of the resistor R21, an anode of a Zener diode D3, a drain of the transistor Q4, a first terminal of a capacitor C35, a second terminal of the capacitor C27 and the switching node pin SWN (pin 7) of the integrated gate driver U7 at node Node16.

A gate of the transistor Q4 is connected to the low side gate driver pin DRVL (pin 5) of the integrated gate driver U7 and a first terminal of a resistor R27 at a node Node19. A source of the transistor Q4 and a second terminal of the resistor R27 are connected to ground.

A second terminal of the capacitor C35 is connected to a first terminal of a resistor R29. A second terminal of the resistor R29 is connected to ground.

A drain of the transistor Q1 is connected to a first terminal of a capacitor C36, a cathode of the Zener diode D3 and a cathode of a Zener diode D5 at a node Node20. A second terminal of the capacitor C36 and an anode of the Zener diode D5 are connected to ground. An output terminal 7065 of the second stage 7060 is connected to the node Node20 and outputs the input voltage signal COIL_OUT. The output terminal 7065 serves as the output of the heating engine control circuit 2127.

The capacitor C35 may be a smoothing capacitor and the resistor limits in-rush current. The Zener diode D3 is a blocking diode to stop a voltage in the node Node20 discharging into the capacitor C35. The capacitor C36 is an output capacitor charged by the second stage 7060 (and reduces ripple in COIL_OUT) and the Zener diode D5 is an ESD (electrostatic discharge) protection diode.

When the low side gate drive signal output from the low side gate driver pin DRVL is high, the transistor Q4 is in a low impedance state (ON), thereby connecting the node Node16 to ground and increasing the energy stored in the magnetic field of the inductor L4.

As mentioned above, because the capacitor C27 is connected to the input voltage signal VGATE from the boost converter circuit 7020, the capacitor C27 charges to a voltage equal or substantially equal to the input voltage signal VGATE through the diode D1.

When the low side gate drive signal output from the low side gate driver pin DRVL is low, the transistor Q4 switches to the high impedance state (OFF), and the high side gate driver pin DRVH (pin 8) is connected internally to the bootstrap pin BST within the integrated gate driver U7. As a result, transistor Q1 is in a low impedance state (ON), thereby connecting the switching node SWN to the inductor L4.

In this case, the node Node15 is raised to a bootstrap voltage V(BST)≈V(VGATE)+V(INDUCTOR), which allows the gate-source voltage of the transistor Q1 to be the same or substantially the same as the voltage of the input voltage signal VGATE (e.g., V(VGATE)) regardless (or independent) of the voltage from the inductor L4. As the second stage 7060 is a boost circuit, the bootstrap voltage may also be referred to as a boost voltage.

The switching node SWN (Node 8) is connected to the inductor voltage and the output capacitor C36 is charged, generating the voltage output signal COIL_OUT (the voltage output to the heater 336) that is substantially independent of the voltage output from the first stage 7040.

Figure 8A:
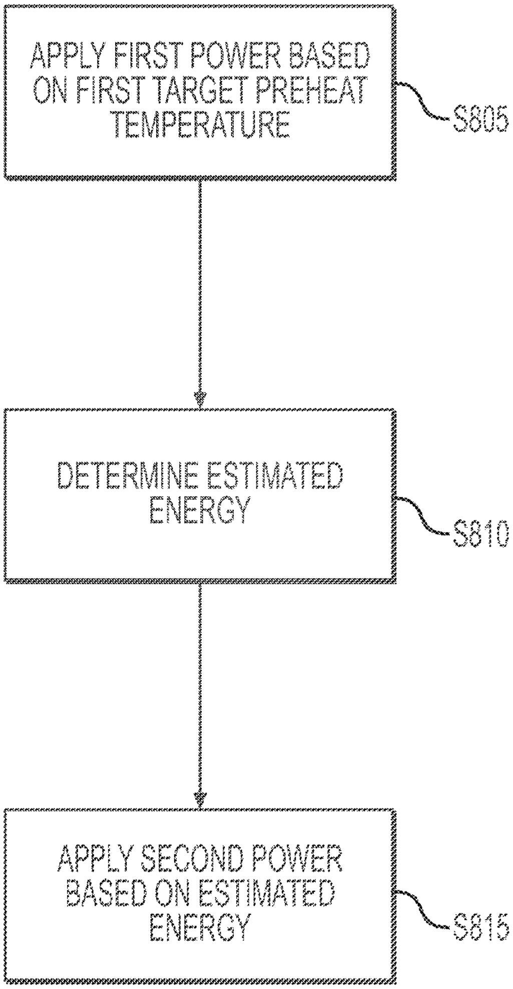
FIGS. 8A-8B illustrate methods of controlling a heater in a non-combustible aerosol-generating device according to one or more example embodiments.
Figure 8B:
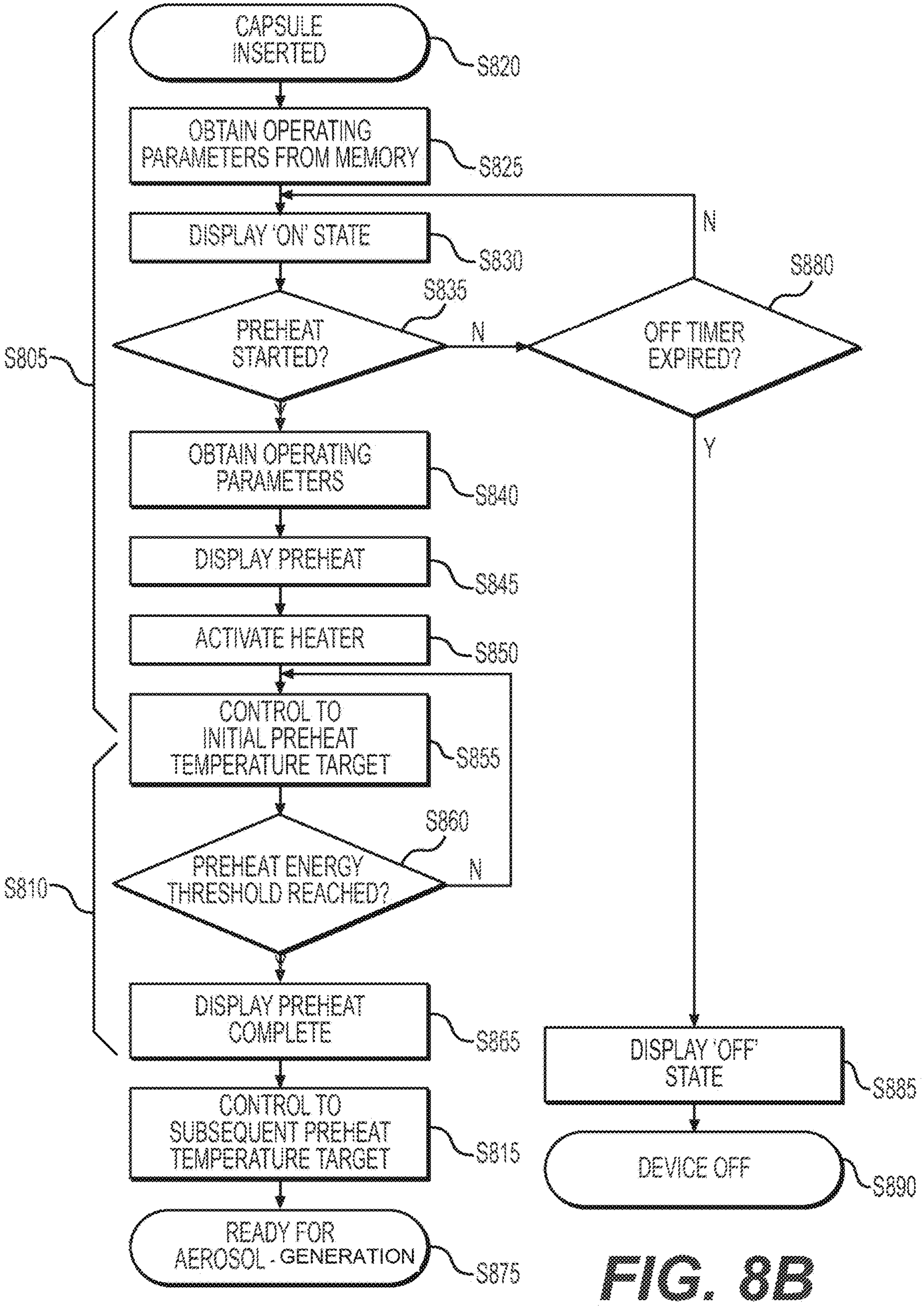

FIGS. 8A-8B illustrate methods of controlling a heater in a non-combustible aerosol-generating device according to example embodiments.

Many non-combustible devices use a preheat of organic material (e.g., tobacco) prior to use. The preheat is used to elevate the temperature of the material to a point at which the compounds of interest begin to volatize such that the first negative pressure applied by an adult operator contains a suitable volume and composition of aerosol.

In at least some example embodiments, applied energy is used as a basis for controlling the heater during preheat. Using applied energy to control the heater improves the quality and consistency of the first negative pressure applied by the adult operator. By contrast, time and temperature are generally used as a basis for controlling the preheat.

The methods of FIGS. 8A-8B may be implemented at the controller 2105. In one example, the methods of FIGS. 8A-8B may be implemented as part of a device manager Finite State Machine (FSM) software implementation executed at the controller 2105.

As shown in FIG. 8A, the method includes applying a first power based on a first target preheat temperature at S805. An example embodiment of S805 is further illustrated in FIG. 8B.

As shown in FIG. 8B, the controller detects that a capsule is inserted into the aerosol-generating device. In some example embodiments, the controller obtains a signal from an opening closing switch coupled to the door, which is illustrated in FIGS. 1A-1C. In other example embodiments, the aerosol-generating device further includes (or alternatively includes) a capsule detection switch. The capsule detection switch detects whether the capsule is properly inserted (e.g., capsule detection switch gets pushed down/closes when the capsule is properly inserted). Upon the capsule being properly inserted, the controller may generate the signal PWR_EN_VGATE (shown in FIG. 7A) as a logic high level. In addition, the controller may perform a heater continuity check to determine the capsule is inserted and the heater resistance is within the specified range (e.g. ±20%).

After a capsule has been inserted (as detected by the switch) and/or when the aerosol-generating device 10 is turned on (e.g. by operation of the button), the heater 336 may be powered with a low power signal from the heating engine control circuit (~1 W) for a short duration (~50 ms) and the resistance may be calculated from the measured voltage and current during this impulse of energy. If the measured resistance falls within the range specified (e.g. a nominal 2100 mΩ±20%) the capsule is considered acceptable and the system may proceed to aerosol-generation.

The low power and short duration is intended to provide a minimum amount of heating to the capsule (to prevent any generation of aerosol).

At S825, the controller obtains operating parameters from the memory. The operating parameters may include values identifying a maximum power level ($P_{max}$), initial preheat temperature, subsequent preheat temperature and a preheat energy threshold. For example, the operating parameters may be predetermined based on empirical data or adjusted based on obtained measurements from the capsule (e.g., voltage and current). However, example embodiments are not limited thereto. In addition to or alternatively, the operating parameters may include different initial preheat temperatures for subsequent instances for a multi-instances device. For example, the controller may obtain operating parameters for an initial instance and operating parameters for a second subsequent instance.

At S830, the controller may cause the aerosol-generating device to display an “on” state. The controller may cause the aerosol-generating device to generate a visual indicator and/or a haptic feedback to display an “on” state.

At S835, the controller determines whether a preheat has started. In some example embodiments, the controller may start the preheat upon receiving an input from the on-product controls indicating a consumer has pressed a button to initiate the preheat. In some example embodiments, the button may be separate from a button that powers on the aerosol-generating device and in other example embodiments, the button may be the same button that powers on the aerosol-generating device. In other example embodiments, the preheat may be started based on another input such as sensing an airflow above a threshold level. In other example embodiments, the on-product controls may permit an adult operator to select one or more temperature profiles (each temperature profile associated operating parameters stored in the memory).

If the controller determines that no preheat has started, the method proceeds to S880 where the controller determines whether an off timer has elapsed. If the off timer has not elapsed, the method returns to S830 and if the controller determines the off timer has elapsed, the controller causes the aerosol-generating device to display an “off” state at S885 and power off at S890. The off timer starts when the detected air flow falls below a threshold level. The off timer is used to display the “off” state based on inaction for a period of time such as 15 minutes. However, example embodiments are not limited to 15 minutes. For example, the duration of the off timer may be 2 minutes or 10 minutes.

If the controller determines the preheat has started (e.g., detects input from the on-product controls) at S835, the controller obtains the operating parameters associated with the input from the on-product controls from the memory. In an example, where the aerosol-generating instance is not the initial instance for the capsule, the controller may obtain operating parameters associated with the instance number. For example, the memory may store different temperature targets based on the instance number (e.g., different temperature targets for instance numbers, respectively) and different target energy levels to use for preheating based on the instance number.

The initial instance occurs when the controller initiates the preheat algorithm for a first time after detecting a capsule has been removed and one has since been inserted. Additionally, the instance number increments if the instance times out (e.g. after 8 minutes) or if the consumer switches off the device during an instance.

Upon obtaining the operating parameters at S840, the controller may cause the aerosol-generating device to display an indication that preheat has started via the aerosol indicators.

At S850, the controller ramps up to a maximum available power to the heater (through the VGATE, COIL_Z and COIL_X signals provided to the heating engine control circuit 2127) (e.g., the controller provides a maximum available power of 10 W within 200 ms). In more detail, the controller requests maximum power, but ramps up to the maximum power to reduce an instantaneous load on the power supply. In an example embodiment, the maximum available power is a set value based on the capability of a battery and to minimize overshoot such that the aerosol-forming substrate is not burnt by the heater (i.e., how much energy can be put into the aerosol-forming substrate without burning). The maximum available power may be set based on empirical evidence and may be between 10-15 W. The controller provides the maximum available power until the controller determines that a target initial preheat temperature of the heater (e.g., 320° C.) is approaching, at S855. While 320° C. is used as an example target initial preheat temperature for an aerosol-forming substrate containing tobacco, it should be understood example embodiments are not limited thereto. For example, the target initial preheat temperature for an aerosol-forming substrate containing tobacco may be less than 400° C., such as 350° C. Moreover, the target initial preheat temperature is based on the materials in the aerosol-forming substrate. The controller may determine the temperature of the heater using the measured voltages from the heater voltage measurement circuit (e.g., COIL_VOL) and the compensation voltage measurement circuit, and may determine the measured current from the heater current measurement circuit (e.g., COIL_RTN_I). The controller may determine the temperature of the heater 336 in any known manner (e.g., based on the relatively linear relationship between resistance and temperature of the heater 336).

Further, the controller may use the measured current COIL_RTN_I and the measured voltage COIL_RTN to determine the resistance of the heater 336, heater resistance $R_{Heater}$ (e.g., using Ohm's law or other known methods). For example, according to at least some example embodiments, the controller may divide the measured voltage COIL_RTN (or compensated voltage VCOMP) by the measured current COIL_RTN_I to be the heater resistance $R_{Heater}$.

In some example embodiments, the measured voltage COIL_RTN measured at the measurement contacts for the resistance calculation may be used in temperature control.

For example, the controller 2105 may use the following equation to determine (i.e., estimate) the temperature:

$$R_{Heater}=R_0[1+\square(T-T_0)]$$

where □ is the temperature coefficient of resistance (TCR) value of the material of the heater, $R_0$ is a starting resistance and $T_0$ is a starting temperature, $R_{Heater}$ is the current resistance determination and T is the estimated temperature.

The starting resistance $R_0$ is stored in the memory 2130 by the controller 2105 during the initial preheat. More specifically, the controller 2105 may measure the starting resistance $R_0$ when the power applied to the heater 336 has reached a value where a measurement error has a reduced effect on the temperature calculation. For example, the controller 2105 may measure the starting resistance $R_0$ when the power supplied to the heater 336 is 1 W (where resistance measurement error is approximately less than 1%).

The starting temperature $T_0$ is the ambient temperature at the time when the controller 2105 measures the starting resistance $R_0$. The controller 2105 may determine the starting temperature $T_0$ using an onboard thermistor to measure the starting temperature $T_0$ or any temperature measurement device.

According to at least one example embodiment, a 10 ms (millisecond) measurement interval may be used for measurements taken from the heater current measurement circuit 21258 and the heater voltage measurement circuit 21252 (since this may be the maximum sample rate). In at least one other example embodiment, however, for a resistance-based heater measurement, a 1 ms measurement interval (the tick rate of the system) may be used.

In other example embodiments, the determining of the heater temperature value may include obtaining, from a look-up table (LUT), based on the determined resistance, a heater temperature value. In some example embodiments, a LUT indexed by the change in resistance relative to a starting resistance may be used.

The LUT may store a plurality of temperature values that correspond, respectively, to a plurality of heater resistances, the obtained heater temperature value may be the temperature value, from among the plurality of temperature values stored in the LUT, that corresponds to the determined resistance.

Additionally, the aerosol-generating device 10 may store (e.g., in the memory 2130) a look-up table (LUT) that stores a plurality of heater resistance values as indexes for a plurality of respectively corresponding heater temperature values also stored in the LUT. Consequently, the controller may estimate a current temperature of the heater 336 by using the previously determined heater resistance $R_{Heater}$ as an index for the LUT to identify (e.g., look-up) a corresponding heater temperature T from among the heater temperatures stored in the LUT.

Once the controller determines the target initial preheat temperature is approaching, the controller begins to reduce the applied power to the heater to an intermediate power level to avoid a temperature overshoot at S855.

A proportional-integral-derivative (PID) controller (shown in FIG. 9) applies a proportionate control based on an error signal (i.e., the target temperature minus the current determined temperature) so, as the error signal reduces towards zero, the controller 2105 starts to back off the power being applied (this is largely controlled by a proportional term (P) of the PID controller, but an integral term (I), and a derivative term also contribute).

The P, I and D values balance overshoot, latency and steady state error against one another and control how the PID controller adjusts its output. The P, I and D values may be derived empirically or by simulation.

Figure 9:
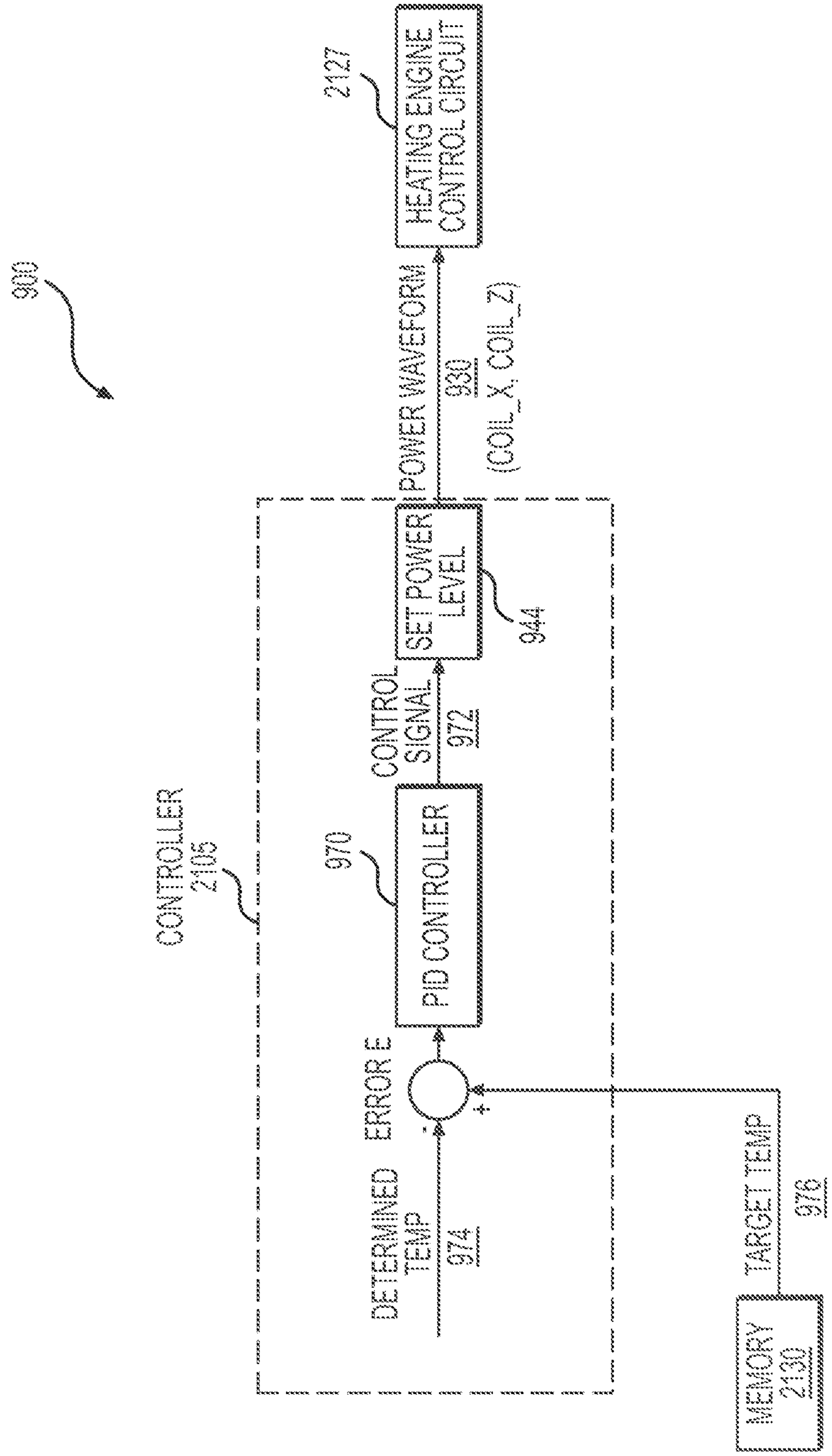
FIG. 9 illustrates a block diagram illustrating a temperature heating engine control algorithm according to at least one or more example embodiments.

FIG. 9 illustrates a block diagram illustrating a temperature heating engine control algorithm according to at least some example embodiments.

Referring to FIG. 9, the temperature heating engine control algorithm 900 uses a PID controller 970 to control an amount of power applied to the heating engine control circuit 2127 so as to achieve a desired temperature. For example, as is discussed in greater detail below, according to at least some example embodiments, the temperature heating engine control algorithm 900 includes obtaining a determined temperature value 974 (e.g., determined as described above); obtaining a target temperature value (e.g., target temperature 976) from the memory 2130; and controlling, by a PID controller (e.g., PID controller 970), a level of power provided to the heater, based on the determined heater temperature value and the target temperature value.

Further, according to at least some example embodiments, the target temperature 976 serves as a setpoint (i.e., a temperature setpoint) in a PID control loop controlled by the PID controller 970.

Consequently, the PID controller 970 continuously corrects a level of a power control signal 972 so as to control a power waveform 930 (i.e., COIL_X and COIL_Z) output by the power level setting operation 944 to the heating engine control circuit 2127 in such a manner that a difference (e.g., a magnitude of the difference) between the target temperature 976 and the determined temperature 974 is reduced or, alternatively, minimized. The difference between the target temperature 976 and the determined temperature 974 may also be viewed as an error value which the PID controller 970 works to reduce or minimize.

For example, according to at least some example embodiments, the power level setting operation 944 outputs the power waveform 930 such that levels of the power waveform 930 are controlled by the power control signal 972. The heating engine control circuit 2127 causes an amount of power provided to the heater 336 by the power supply 1234 to increase or decrease in manner that is proportional to an increase or decrease in a magnitude of the power levels of a power level waveform output to the heating engine control circuit 2127. Consequently, by controlling the power control signal 972, the PID controller 970 controls a level of power provided to the heater 336 (e.g., by the power supply 1234) such that a magnitude of the difference between a target temperature value (e.g., target temperature 976) and a determined temperature value (e.g., determined temperature 974) is reduced, or alternatively, minimized.

According to at least some example embodiments, the PID controller 970 may operate in accordance with known PID control methods. According to at least some example embodiments, the PID controller 970 may generate 2 or more terms from among the proportional term (P), the integral term (I), and the derivative term (D), and the PID controller 970 may use the two or more terms to adjust or correct the power control signal 972 in accordance with known methods. In some example embodiments, the same PID settings for the initial and subsequent preheat phases may be used.

In other example embodiments, different PID settings may be used for each phase (e.g., if the temperature targets used for the initial and subsequent preheats are substantially different).

Figure 10:
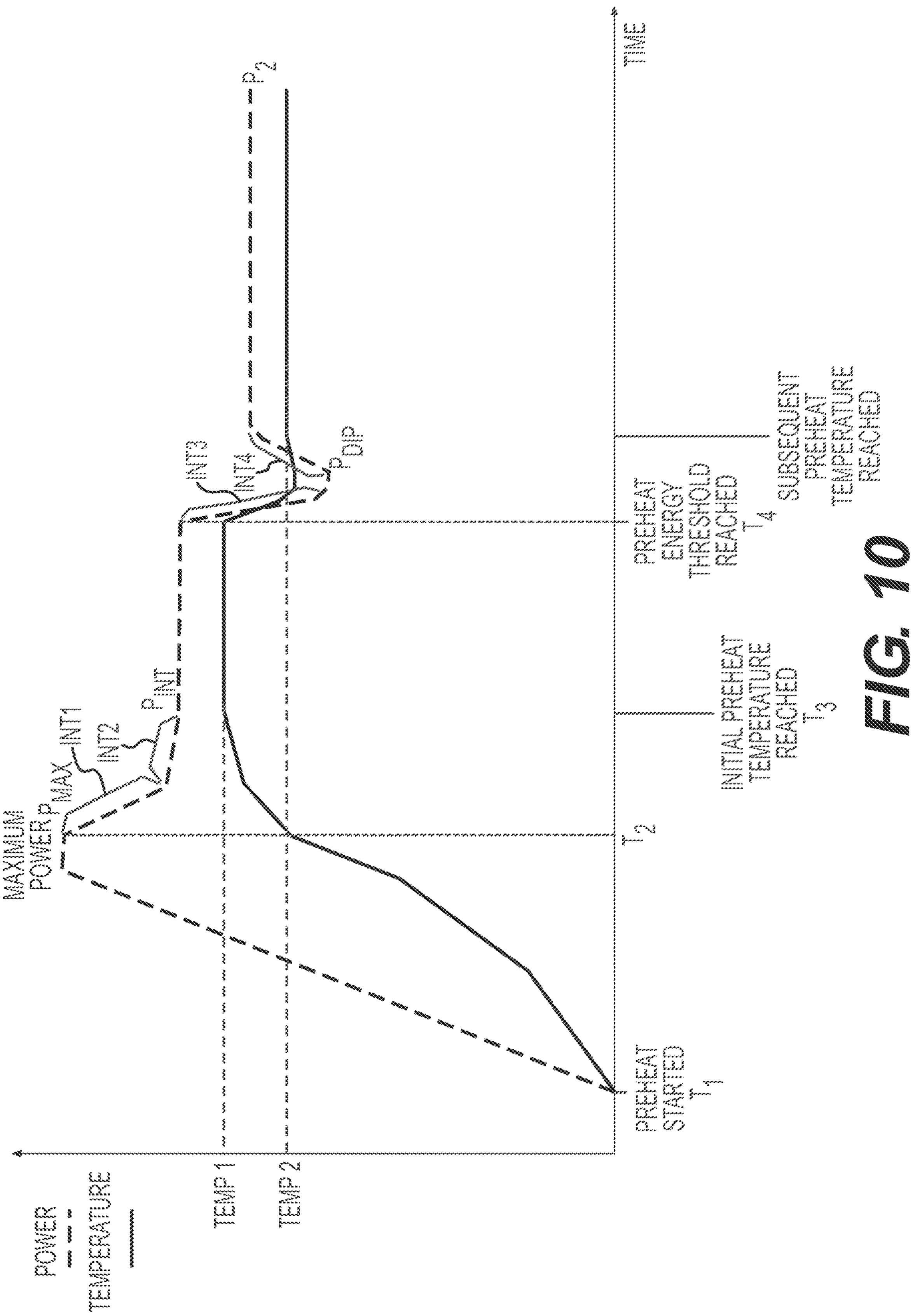
FIG. 10 illustrates a timing diagram of the methods illustrated in FIGS. 8A-8B one or more example embodiments.

FIG. 10 shows an example manner in which levels of the power waveform 930 may vary over time as the PID controller 970 continuously corrects the power control signal 972 provided to the power level setting operation 944. FIG. 10 shows an example manner in which levels of the power waveform 930 may vary as temperature thresholds and energy thresholds are reached. The power in FIG. 10 is COIL_VOL*COIL_CUR. In FIG. 10, the PID loop will start to lower the applied power from a maximum power $P_{max}$ as the temperature approaches the setpoint, which reduces overshoot of the target temperature.

FIG. 10 is discussed in further detail below.

Referring back to FIG. 8A, the controller determines an estimated energy that has been delivered to the heater as part of applying the first power, at S810.

As shown in FIG. 8B and previously discussed, the controller controls power supplied to the heater at S855. At S860, the controller determines whether an estimated energy applied to the heater has reached a preheat energy threshold. More specifically, the controller integrates (or sums the samples) the power delivered to the heater since starting the preheat to estimate the energy delivered to the heater. In an example embodiment, the controller determines the power (Power=COIL_VOL*COIL_CUR) applied to the heater every millisecond and uses that determined power as part of the integration (or the sum).

If the controller determines the preheat energy threshold has not been met, the method proceeds to S855 where power is supplied to the heater as part of the preheating process of the heater.

When the controller determines the applied energy reaches the preheat energy threshold (e.g., 75 J), the controller causes the aerosol-generating device to output a preheat complete indication at S865 via the aerosol indicators.

Referring to both FIGS. 8A and 8B, the controller applies a second power to the heater at S815 upon the preheat energy threshold being met. The second power may be less than the first power.

The controller changes the target initial preheat temperature of the heater to a subsequent preheat temperature (e.g., 300° C.) and the controller reduces input power accordingly to the second power using the temperature control algorithm described in FIG. 9. The subsequent preheat temperature may be based on empirical data and less than the target initial preheat temperature. In some example embodiments, the subsequent preheat temperature may be based on a number of times a negative pressure is applied to the device with the capsule in the device.

While FIG. 8B and FIG. 10 illustrate preheating to a subsequent preheat temperature target, an adult operator may start aerosol-generation after the initial preheat temperature target is reached. More specifically, the controller 2105 may initiate aerosol-generation (i.e., supplying power to the heater such that the heater reaches a temperature sufficient to produce an aerosol) upon detecting a negative pressure being applied by the adult operator and upon the initial preheat temperature target being reached.

The preheat energy threshold may be determined based on empirical data and determined to be sufficient energy to produce a desired/selected amount of aerosol upon a negative pressure above a pressure threshold being applied.

At S875, the adult operator may apply a negative pressure to the aerosol-generating device. In response, the aerosol-generating device heats the pre-aerosol formulation in the capsule to generate an aerosol.

By using applied energy as a factor for controlling the temperature of the heater and/or during heating, sensory experience and energy efficiency are improved, resulting in conservation of battery power.

FIG. 10 illustrates a timing diagram of the methods illustrated in FIGS. 8A-8B. At $T_1$, the preheat commences and the controller ramps up power to apply a first power to the heater, which in this example is a maximum power $P_{max}$. At $T_2$, the controller determines the heater is approaching an initial preheat target temperature Temp1 (due to reduction in error signal in the PID control loop) and begins to reduce the applied power from $P_{max}$ to an intermediate power $P_{int}$ to avoid a temperature overshoot. The reduction to the intermediate power $P_{int}$ includes at least two intervals Int1 and Int2. The controller reduces the power at a faster rate (i.e., larger slope) than during the interval Int2. The interval Int2 has a smaller rate of change to allow the intermediate power Pint to be reached at substantially the same time the controller determines the initial preheat temperature Temp1 has been reached. The PID settings used for the preheat may be the same for both intervals Int1 and Int2 (e.g., P=100, I=0.25 and D=0). The change in power application during intervals Int1 and Int2 is a result of the reduction in temperature error signal.

At $T_3$, the controller determines the initial preheat temperature Temp1 has been reached. At $T_4$, the controller determines the applied energy reaches the preheat energy threshold and reduces the power to a second power $P_2$ to maintain the temperature of the heater at a subsequent preheat temperature Temp2.

The transition from the intermediate power $P_{int}$ to the second power $P_2$ includes two intervals Int3 and Int4. In the interval Int3, the controller decreases the power at a first slope. In the interval Int4, the controller increases the power at a slope whose magnitude is less than the magnitude of the first slope. The controller starts the interval Int4, when the power is at $P_{dip}$, which is less than the second power $P_2$.

FIGS. 11A-11F illustrate methods of controlling a heater in a non-combustible aerosol-generating device according to example embodiments.

As described below, the aerosol-generating device is able to regulate electrical power/energy delivered to the heater within single draws (e.g., draws of 2-4 s) improving a sensory experience. These methods may be referred to as intra-draw controls.

In both a heating basket and tobacco rod form of an aerosol-generating device, a thermal response may be slow relative to a duration of a negative pressure being applied on the device by an adult operator. Consequently, such aerosol-generating devices do not include a puff sensor or airflow rate sensor.

However, aerosol-generating devices of example embodiments include an airflow sensor (e.g., airflow sensor 1248) for detecting when a negative pressure exceeds a threshold and has decreased below a threshold.

The methods of FIGS. 11A-11F may be implemented at the controller 2105. In one example, the methods of FIGS. 11A-11F may be implemented as part of a device manager Finite State Machine (FSM) software implementation executed at the controller 2105.

Figure 11A:
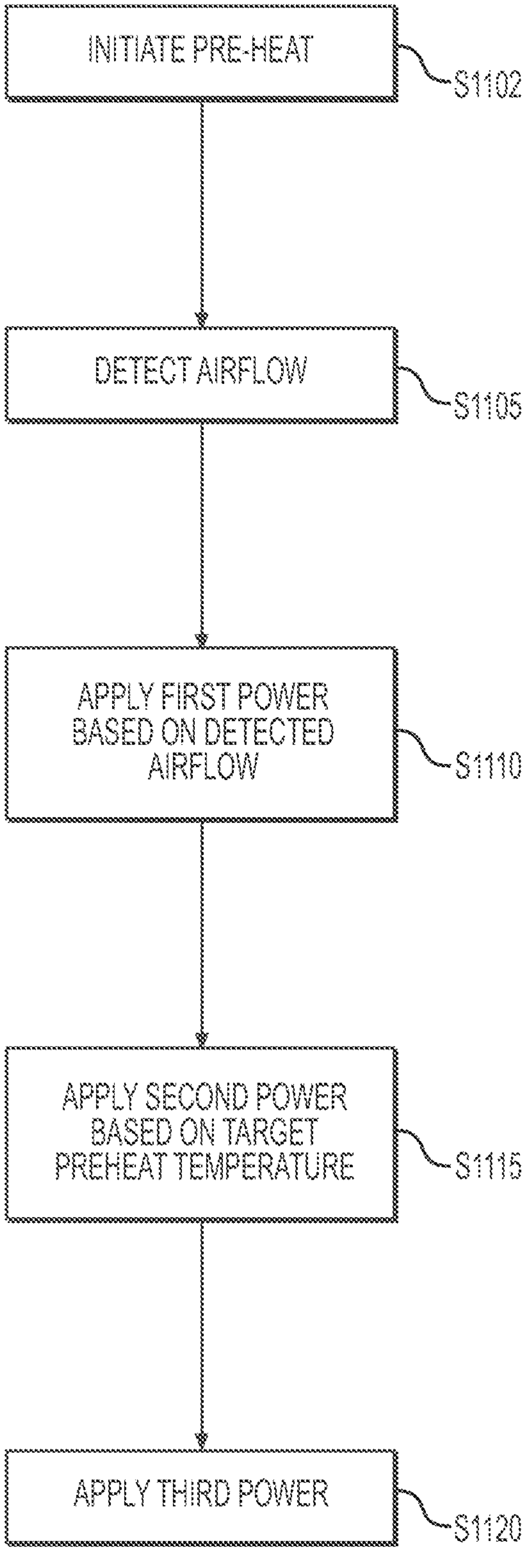
FIGS. 11A-11B illustrate methods of controlling a heater in a non-combustible aerosol-generating device according to example embodiments.

Referring to FIG. 11A, the controller initiates a preheat algorithm at S1102 upon the aerosol-generating device receiving an input to turn the device on or initiate a preheat. The preheat may be performed in accordance with example embodiments described in FIGS. 8A-10.

Figure 11B:
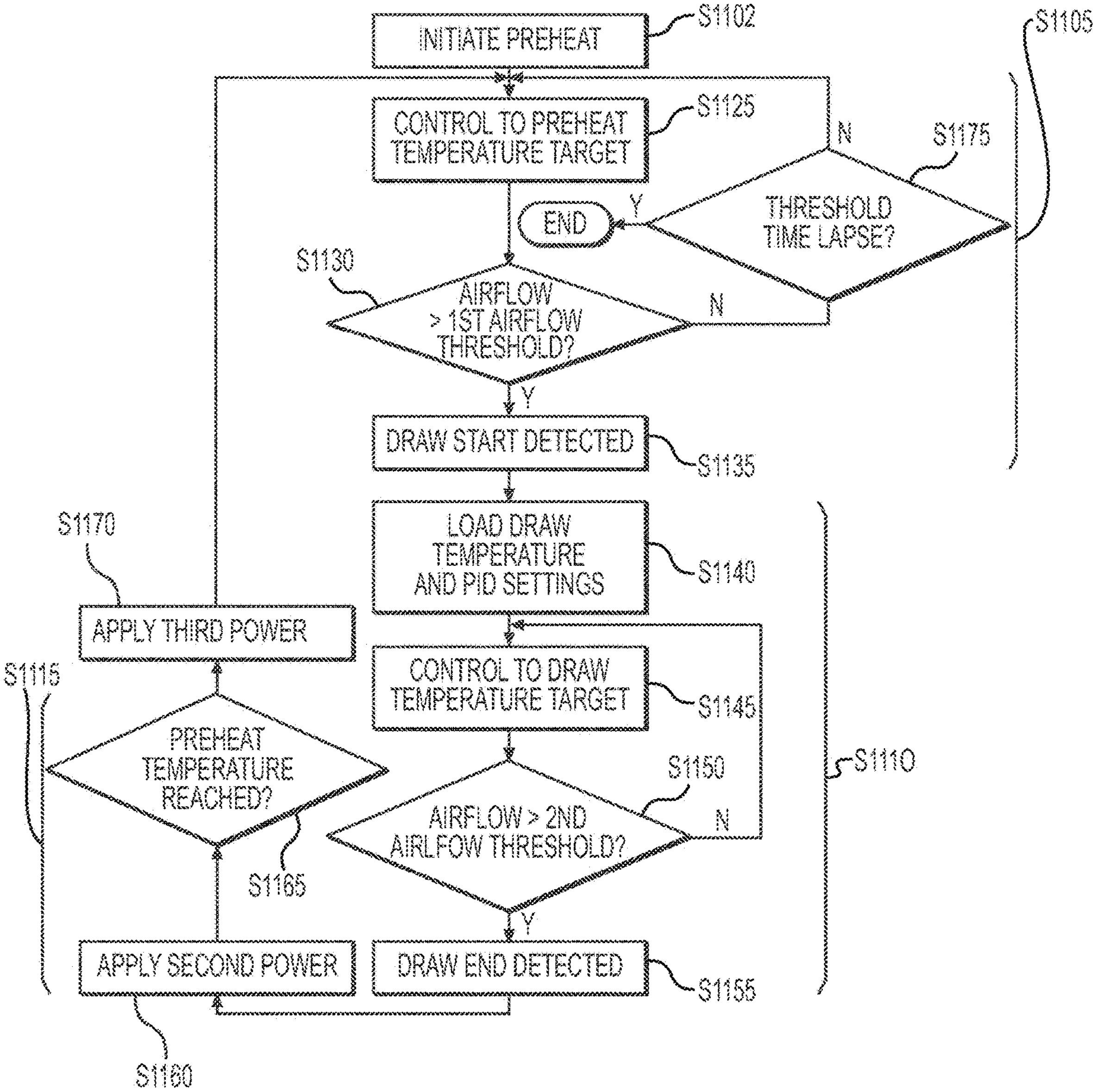

At S905, an airflow is detected by the airflow sensor. FIG. 11B illustrates additional details of detecting an airflow. As shown in FIG. 11B, the controller controls the temperature of the heater to a preheat temperature target (e.g., initial preheat temperature target) at S1125. While the controller controls the temperature of the heater in accordance with the preheat temperature target, the controller monitors input from the airflow sensor to determine whether the detected airflow exceeds a first airflow threshold at S1130. If the controller determines the detected airflow does not exceed the first airflow threshold, the controller determines whether a threshold time has elapsed such that the device would shutdown or go into a sleep mode at S1175. If the threshold time has not lapsed, the method returns to S1125 and the controller continues to control the temperature of the heater in accordance with the preheat temperature target. While a time is used in the example of FIG. 11B to determine whether to turn off the aerosol-generating device, it should be understood that other criteria may be also be used to determine whether to turn off the aerosol-generating device. For example, the controller may determine to prohibit aerosol-generating after a threshold number of draws, a threshold time exceeding a threshold negative pressure or instance energy consumption.

If the controller determines the detected airflow exceeds the first threshold at S1130, the controller determines that a sufficient negative pressure is being applied to the aerosol-generating device to initiate an aerosol-generating event at S1135. While FIGS. 11A-11F are being described with reference to an airflow sensor, it should be understood that a pressure sensor or other type of sensor used for detecting a negative pressure draw may be used alternatively or in addition to the airflow sensor.

The airflow sensor provides a measurement in magnitude every 20 ms to the controller 2105. The controller uses a threshold detection that is averaged over a number of samples (e.g., 7 samples) to reduce noise. For example, the controller averages a number of sample magnitudes from the airflow sensor and determines whether the average exceeds the first airflow threshold (e.g., 1 ml/s).

In some example embodiments, the controller determines that a sufficient negative pressure is being applied to the aerosol-generating device to initiate an aerosol-generating event when the detected airflow is equal to the first threshold and in other example embodiments, the controller determines that a sufficient negative pressure is not being applied to the aerosol-generating device to initiate an aerosol-generating event when the detected airflow is equal to the first threshold.

Referring back to FIG. 11A, the controller applies a first power based on the detected airflow at S1110. As shown in FIG. 11B, the controller loads draw temperature and proportional-integral-derivative (PID) settings from the memory at S1140 when the controller determines that a sufficient negative pressure is being applied to the aerosol-generating device to initiate an aerosol-generating event.

The memory (e.g., 2130) may store defined thresholds used to set PID settings and temperature setpoints (target temperatures). For example, during the preheating, the PID settings may be set for high accuracy and slow responsiveness (e.g., P=100, I=0.25, D=0), when airflow is detected to exceed the first airflow threshold (which starts a draw phase) the PID settings may be set by the controller to use responsive PID settings to compensate for airflow (e.g., P=300, I=1, D=0). The PID settings may remain constant for a phase of operation (i.e., preheat or draw (e.g., when a negative pressure exceeds a threshold)). For example, when the controller determines that a sufficient negative pressure is being applied (e.g., exceeding first airflow threshold), the controller may increase the proportional and integral settings to increase the power delivered to the heater to avoid/reduce a temperature drop from the heater or to reach a higher or lower temperature with lower latency.

At S1145, the controller generates commands to supply a first power to the heater in accordance with a target temperature associated with the detected airflow and the PID settings. By performing a low latency detection of the start of a draw detection, the system may switch to a higher temperature setpoint (target temperature) including a higher P value for the draw duration, increasing the quantity of aerosol produced, before switching back to a maintaining temperature level (e.g., preheat temperature) between draws in order to reduce battery drain and depletion of volatiles from the capsule.

In an example embodiment, the controller applies a proportion associated with a set maximum power (e.g., 10 W) to supply a maximum available power to the heater. Once the controller determines the heater is approaching a target event temperature (e.g., 320° C.) using the voltage and current measurement circuits, the controller reduces the power delivered to the heater to maintain the target event temperature. New PID settings may be retrieved by the controller when a draw is detected.

At S1150, while the controller controls the temperature of the heater in accordance with the target temperature associated with the detected airflow, the controller monitors input from the airflow sensor to determine whether the detected airflow is below a second threshold.

If the controller determines the detected airflow exceeds the second airflow threshold, the method returns to S1145 and the controller continues to control the temperature of the heater in accordance with the target temperature associated with the detected airflow. If the controller determines the detected airflow does not exceeds the second threshold at S1150, the controller determines that a sufficient negative pressure is not being applied to the aerosol-generating device to continue the aerosol-generating event at S1155.

In some example embodiments, the controller determines that a sufficient negative pressure is being applied to the aerosol-generating device to continue the aerosol-generating event when the detected airflow is equal to the second airflow threshold and in other example embodiments, the controller determines that a sufficient negative pressure is not being applied to the aerosol-generating device to continue the aerosol-generating event when the detected airflow is equal to the second airflow threshold.

In some example embodiments, the first and second airflow thresholds may be different and in other example embodiments, the first and second airflow thresholds may be the same. In some example embodiments, the first airflow threshold is higher than the second airflow threshold. The time period between the pressure exceeding the first airflow threshold and falling below the second airflow threshold may be referred to as a draw phase.

Referring to both FIGS. 11A-11B, the controller causes a second power to be applied to the heater when the detected airflow falls below the second threshold at S1115 (more specifically, S1160 in FIG. 11B). The second power is based on the target preheat temperature.

In some example embodiments, the controller retrieves PID settings associated with a set minimum power (e.g., 1 W) and causes the set minimum power to be delivered to the heater at S1160.

At S1165, the controller determines whether the heater has reached the target preheat temperature using the measurements from the current and voltage measurement circuits. If the controller determines that the heater is not at or below the target preheat temperature, the controller continues to apply the second power (e.g., a minimum power) at S1160. If the controller determines the heater is at or below the target preheat temperature, the controller causes a third power to be applied to the heater at S1120 to regulate/maintain the preheat temperature as determined by the controller using the current and voltage measurements.

Figure 11C:
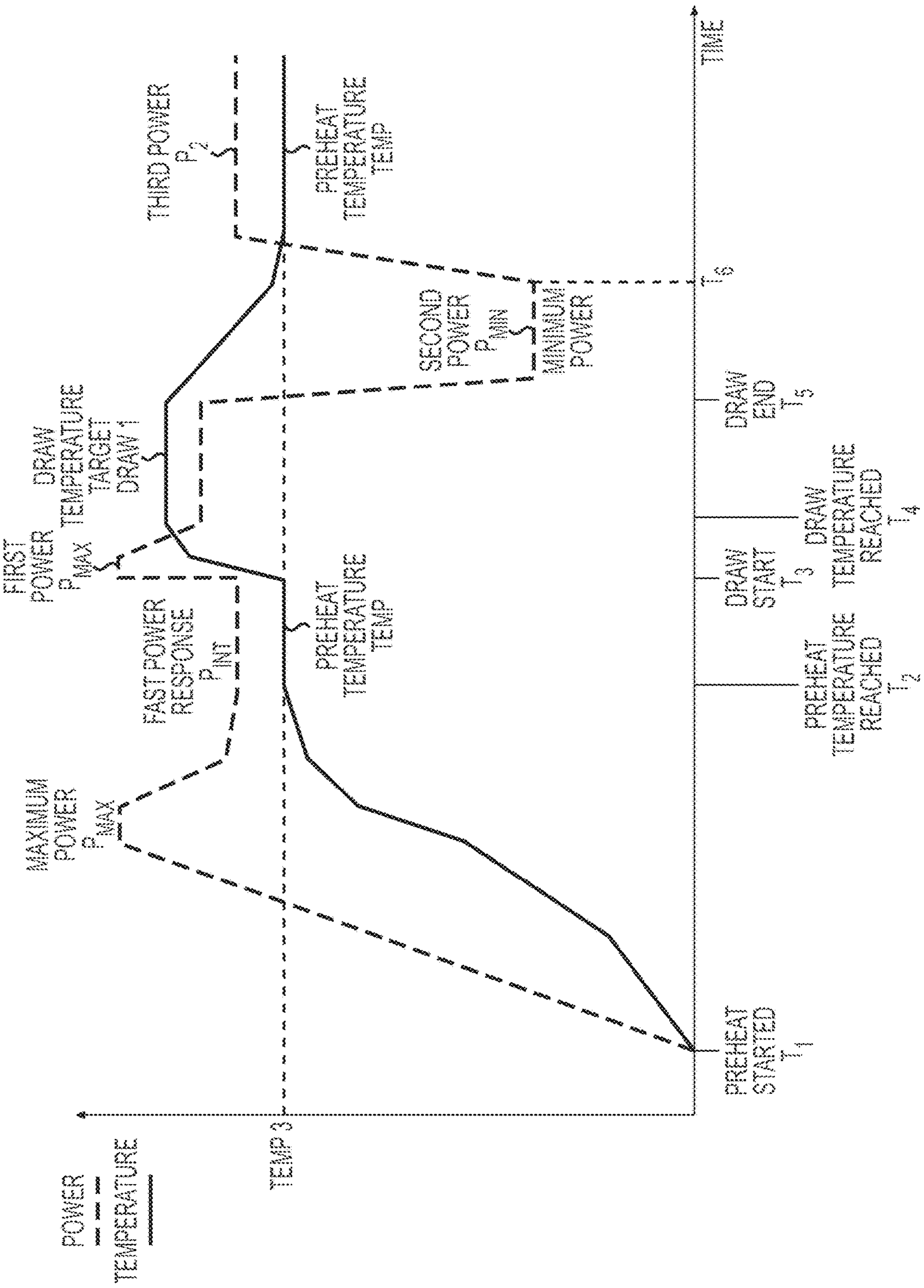
FIG. 11C illustrates a timing diagram of the methods shown in FIGS. 11A-11B using a one stage temperature preheat according to at least one example embodiment.

FIG. 11C illustrates a timing diagram of the methods shown in FIGS. 11A-11B using a one stage temperature preheat according to at least one example embodiment. In the example shown in FIG. 11C, a draw temperature target Draw1 is higher than a preheat temperature Temp3.

At $T_1$, the controller receives an input regarding initiation of a preheat algorithm which causes the controller to ramp up power to apply a maximum power $P_{max}$ to the heater. At $T_2$, the controller determines that the target preheat temperature Temp3 of the heater is reached. As described above, when approaching a target temperature, the controller reduces the power applied to the heater to reduce the likelihood of temperature overshoot and then maintains the target preheat temperature Temp3. At $T_3$, the controller detects a negative pressure sufficient to initiate an aerosol-generating event (i.e., a draw) and configures the system for a fast power response and applies the first power, which may be the maximum power $P_{max}$ in some example embodiments in the presence of air flow from the negative pressure. The controller configures the fast power response by changing in the PID settings. Once the controller determines the temperature of the heater is approaching a target draw temperature Draw1 at $T_4$, the controller reduces the first power delivered to the heater to a power sufficient to maintain the target draw temperature Draw1. At $T_5$, the controller detects the negative pressure is not sufficient to continue the aerosol-generating event and applies the second power, which may be the minimum power $P_{min}$ in some example embodiments. At $T_6$, the controller determines the heater is at or below the target preheat temperature Temp1 and causes the power $P_2$ (a third power) to be applied to the heater to regulate/maintain the preheat temperature Temp3 as determined by the controller using the current and voltage measurements.

Figure 11D:
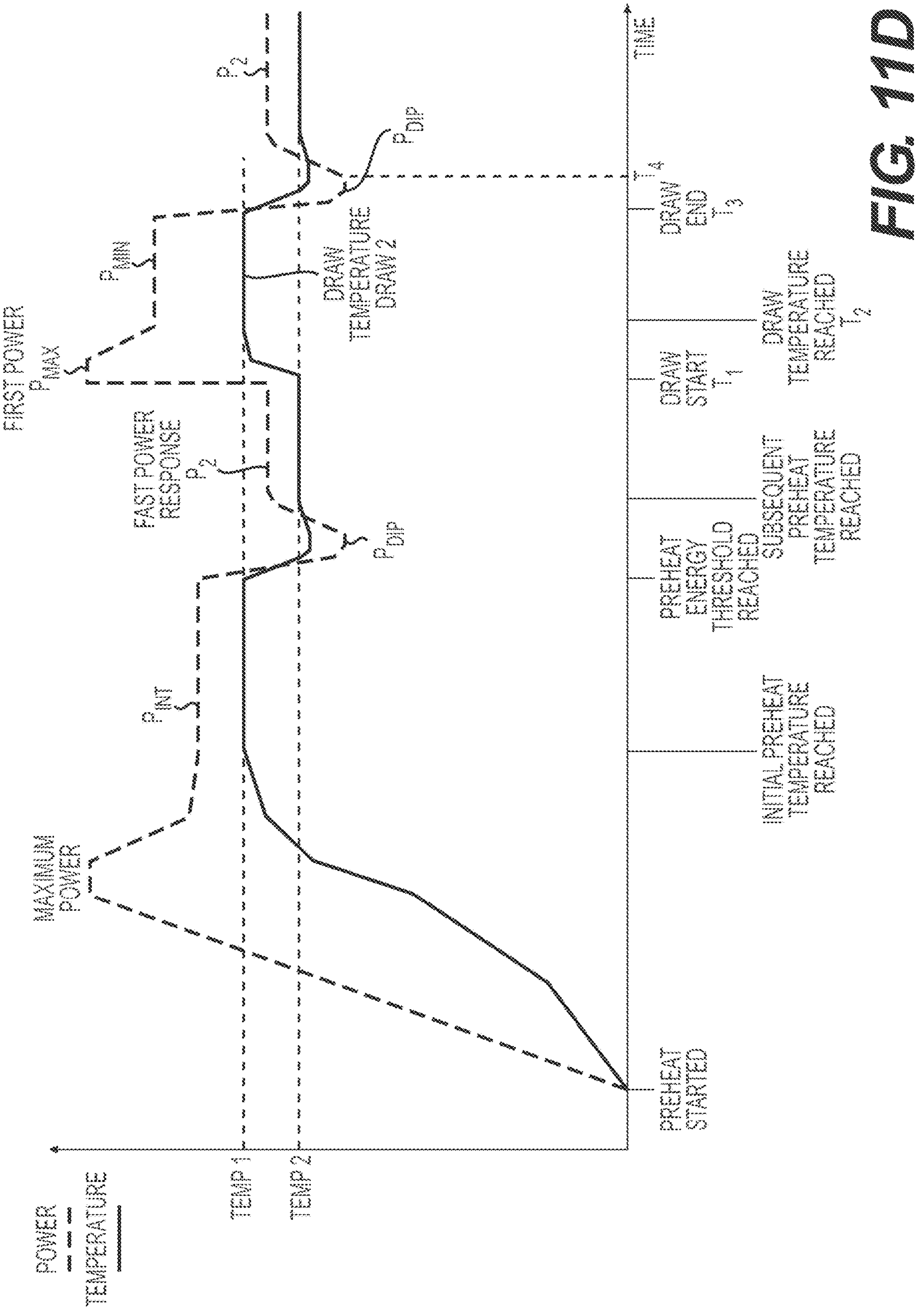
FIG. 11D illustrates a timing diagram of the methods shown in FIGS. 11A-11B using a two stage temperature preheat according to at least one example embodiment.

FIG. 11D illustrates a timing diagram of the methods shown in FIGS. 11A-11B using a two stage temperature preheat according to at least one example embodiment. In the example shown in FIG. 11D, the two stage preheat is the preheat described with reference to 8A-10. In the example shown in FIG. 11D, a draw target temperature Draw2 is the same as the initial target preheat temperature (shown as Temp1 in FIG. 11D).

In FIG. 11D, the temperature and power waveforms up to time $T_1$ are described with reference to FIG. 10.

At $T_1$, the controller detects a negative pressure sufficient to initiate an aerosol-generating event (i.e., a draw) and applies the first power, which may be the maximum power $P_{max}$ in some example embodiments. Once the controller determines the temperature of the heater is approaching a target draw temperature Draw2 at $T_2$, the controller reduces the first power delivered to the heater to a power $P_{main}$ sufficient to maintain the target draw temperature Draw2. The power $P_{main}$ may be higher than the power $P_{int}$ to maintain the initial preheat temperature Temp1. The power $P_{main}$ may be higher than the power $P_{int}$ because of an additional cooling effect due to airflow from the draw and to achieve the same (or substantially the same) temperature as the preheat temperature. At $T_3$, the controller detects the negative pressure is not sufficient to continue the aerosol-generating event and applies the power $P_{dip}$, which is lower than the power $P_2$ to maintain the subsequent preheat temperature Temp2. At $T_4$, the controller determines the heater is approaching the subsequent preheat temperature Temp2 and causes the power $P_2$ to be applied to the heater to regulate/maintain the subsequent preheat temperature Temp2 as determined by the controller using the current and voltage measurements.

Figure 11E:
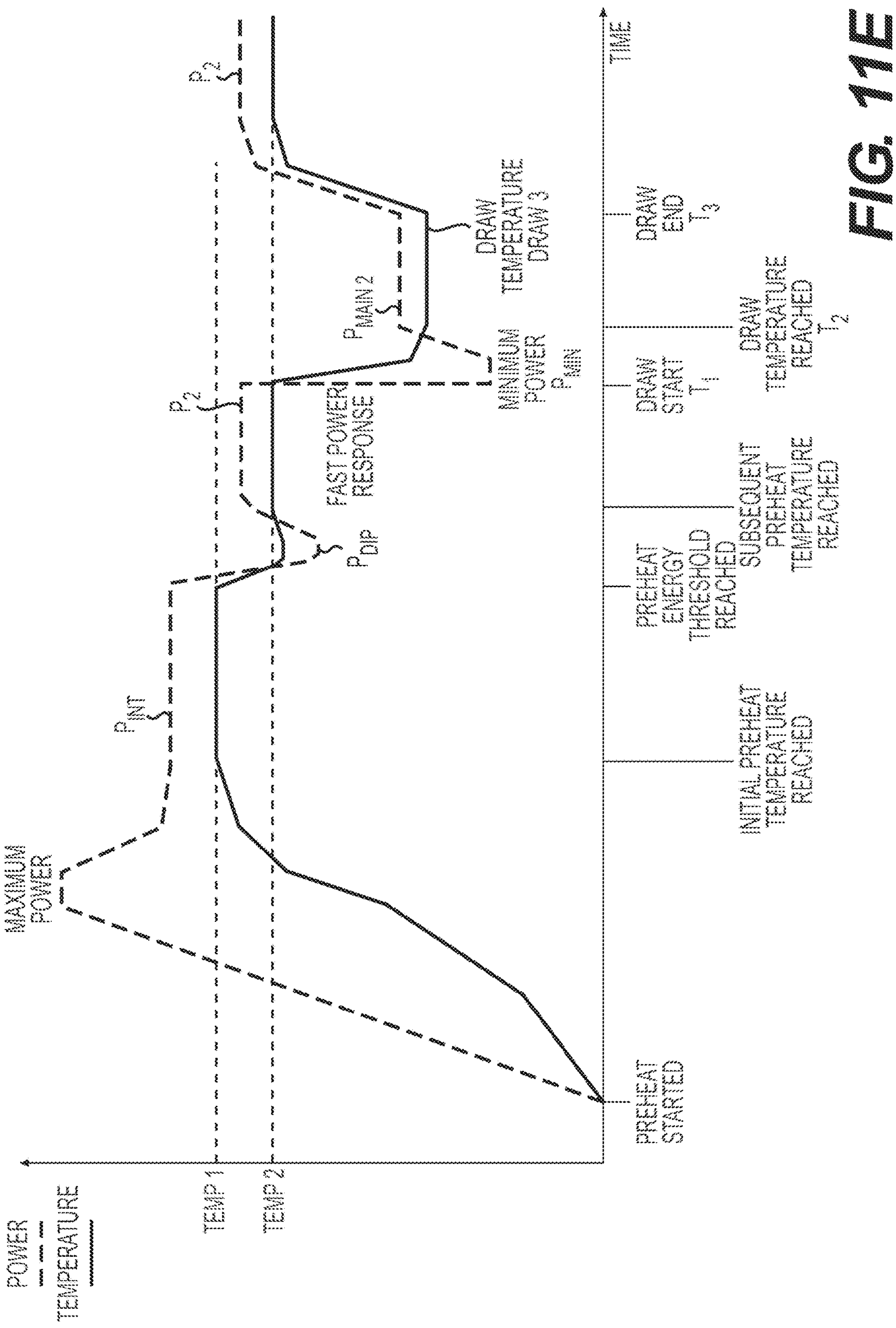
FIG. 11E illustrates a timing diagram of the methods shown in FIGS. 11A-11B using a two stage temperature preheat according to at least one example embodiment.

FIG. 11E illustrates a timing diagram of the methods shown in FIGS. 11A-11B using a two stage temperature preheat according to at least one example embodiment. In the example shown in FIG. 11D, the two stage preheat is the preheat described with reference to 8A-10. In the example shown in FIG. 11E, a draw target temperature Draw3 is lower than the initial target preheat temperature (shown as Temp1 in FIG. 11E) and lower than the subsequent target preheat temperature (shown as Temp2). By using a draw target temperature that is lower than the initial target preheat temperature and the subsequent target preheat temperature, a perception of aerosol warmth for aerosol produced during the draw is reduced/minimized.

In FIG. 11E, the temperature and power waveforms up to time $T_1$ are described with reference to FIG. 10.

At $T_1$, the controller detects a negative pressure sufficient to initiate an aerosol-generating event (i.e., a draw) and applies a first power, which may be a minimum power $P_{min}$ in some example embodiments. The slope transitioning down to the first power is greater than the slope up to the maximum power upon initiation of the preheat. Once the controller determines the temperature of the heater is approaching a target draw temperature Draw3 at $T_3$, the controller increases the first power delivered to the heater to a power $P_{main2}$ sufficient to maintain the target draw temperature Draw3. The power $P_{main2}$ may be higher than the power $P_2$ to maintain the subsequent preheat temperature Temp2. At $T_3$, the controller detects the negative pressure is not sufficient to continue the aerosol-generating event and ramps up power to apply the power $P_2$ to increase the temperature to the subsequent preheat temperature Temp2 and maintain the subsequent preheat temperature Temp2.

Figure 11F:
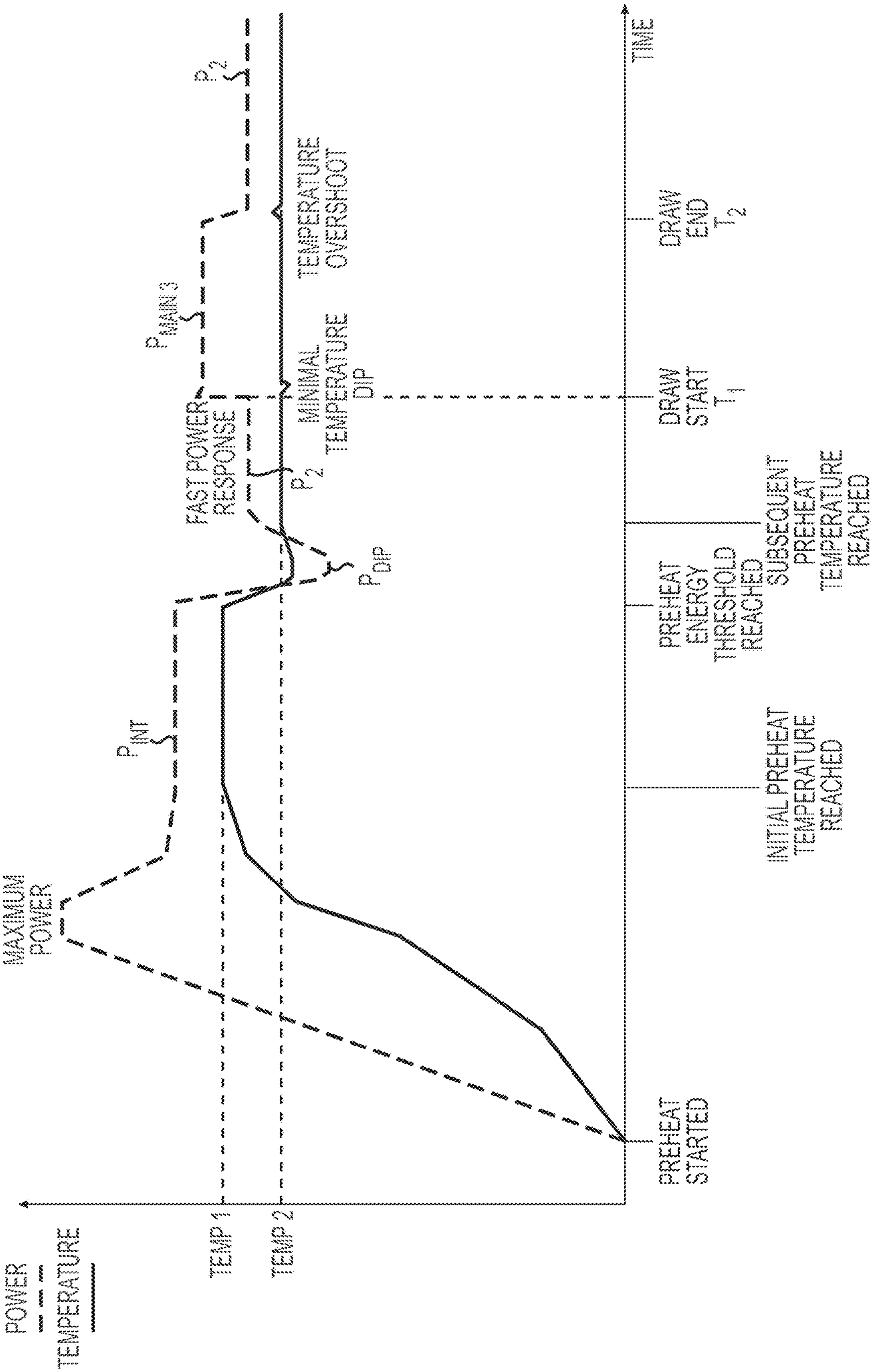
FIG. 11F illustrates a timing diagram of the methods shown in FIGS. 11A-11B using a two stage temperature preheat according to at least one example embodiment.

FIG. 11F illustrates a timing diagram of the methods shown in FIGS. 11A-11B using a two stage temperature preheat according to at least one example embodiment. In the example shown in FIG. 11F, the two stage preheat is the preheat described with reference to 8A-10. In the example shown in FIG. 11F, a draw target temperature is the subsequent target preheat temperature (shown as Temp2). By using the subsequent target preheat temperature as the draw target temperature, a consistent quantity of aerosol is produced during the draw.

In FIG. 11F, the temperature and power waveforms up to time $T_1$ are described with reference to FIG. 10.

At $T_1$, the controller detects a negative pressure sufficient to initiate an aerosol-generating event (i.e., a draw) and configures the system for a fast power response and applies a first power, which may be a power $P_{main3}$ in some example embodiments, in the presence of air flow from the negative pressure. The fast power response (i.e., change in PID settings) and power $P_{main3}$ permits the aerosol-generating device to have the draw temperature as the subsequent target preheat temperature. At $T_2$, the controller detects the negative pressure is not sufficient to continue the aerosol-generating event and ramps down power to apply the power $P_2$ to maintain the subsequent preheat temperature Temp2. While the temperature remains substantially constant before and after the time $T_2$, the controller ramps down the power at $T_2$ due to the reduced air flow from the reduced negative pressure.

The fast power responses shown in FIGS. 11C-11F are due to the controller dynamically changing the PID settings when a draw and/or negative pressure exceeding the first threshold value is detected.

Figure 11G:
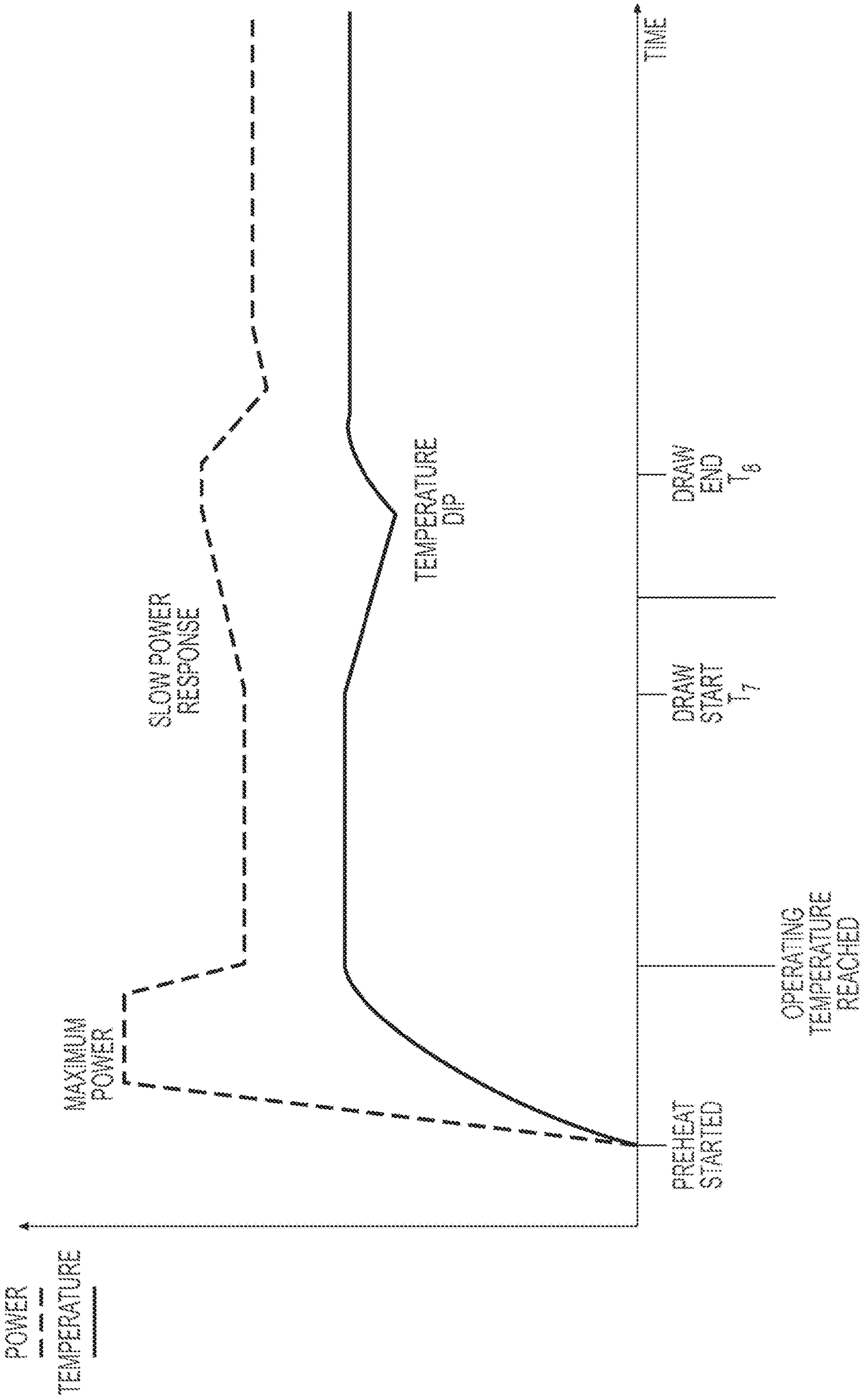
FIG. 11G illustrates a timing diagram of a non-combustible aerosol-generating device without intra-puff heating control.

FIG. 11G illustrates a timing diagram of a non-combustible aerosol-generating device without intra-puff heating control. At $T_7$, an adult operator applies a negative pressure, but a temperature drop occurs because the aerosol-generating device fails to increase the power quick enough to maintain the temperature. As a result, the temperature of the heater (and aerosol-generating material) does not recover until the adult operator stops the negative pressure draw at $T_8$.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A system for controlling a heater in a non-combustible aerosol-generating device, the system comprising:
- a memory storing computer-readable instructions; and
- a controller configured to execute the computer-readable instructions to cause the non-combustible aerosol-generating device to,
  - apply a preheat power to reach a preheat temperature by
    - applying a first preheat power to reach the preheat temperature,
    - reducing the first preheat power towards a second preheat power as the heater approaches the preheat temperature, and
    - applying the second preheat power when the heater reaches the preheat temperature, the second preheat power being less than the first preheat power,
  - detect an airflow in the non-combustible aerosol-generating device after application of the preheat power,
  - apply a first power to the heater based on the detected airflow exceeding a first airflow threshold value, and
  - apply a second power to the heater based on a subsequent preheat temperature and the detected airflow being below a second airflow threshold value, the application of the second power being after the application of the first power and the second airflow threshold value being less than the first airflow threshold value.

2. The system of claim 1, wherein the second power is less than the first power.

3. The system of claim 1, wherein the controller includes,
- a proportional-integral-derivative (PID) controller, wherein the controller is configured to cause the non-combustible aerosol-generating device to change at least one of a proportional term, an integral term and a derivative term of the PID controller based on the detected airflow.

4. The system of claim 3, wherein the controller is configured to cause the non-combustible aerosol-generating device to increase the proportional term when the detected airflow is greater than the first airflow threshold value and decrease the proportional term when the detected airflow is less than the second airflow threshold value.

5. The system of claim 1, further comprising:
- a sensor configured to detect the airflow and output a signal to the controller, the signal being representative of a magnitude of the airflow.

6. The system of claim 1, wherein the preheat temperature is less than 400° C.

7. The system of claim 1, wherein the preheat temperature is 320° C.

8. The system of claim 1, wherein the preheat temperature is 300° C.

9. The system of claim 1, wherein the preheat power is a set maximum power.

10. A non-combustible aerosol-generating system comprising:
- a heater; and
- circuitry configured to cause the non-combustible aerosol-generating system to,
  - apply a preheat power to reach a preheat temperature after application of the preheat power by
    - applying a first preheat power to reach the preheat temperature, reducing the first preheat power towards a second preheat power as the heater approaches the preheat temperature, and applying the second preheat power when the heater reaches the preheat temperature, the second preheat power being less than the first preheat power, detect an airflow in the non-combustible aerosol-generating system, apply a first power to the heater based on the detected airflow exceeding a first airflow threshold value, and apply a second power to the heater based on a subsequent preheat temperature and the detected airflow being below a second airflow threshold value, the application of the second power being after the application of the first power and the second airflow threshold value being less than the first airflow threshold value.

11. The non-combustible aerosol-generating system of claim 10, the system further comprising:

a removable capsule including the heater, wherein the removable capsule is configured to direct the airflow along a longitudinal axis of the removable capsule.

12. The non-combustible aerosol-generating system of claim 10, wherein the circuitry includes, a proportional-integral-derivative (PID) controller, wherein the circuitry is configured to cause the non-combustible aerosol-generating system to change at least one of a proportional term, an integral term and a derivative term of the PID controller based on the detected airflow, wherein the circuitry is configured to cause the non-combustible aerosol-generating system to increase the proportional term when the detected airflow is greater than the first airflow threshold value and decrease the proportional term when the detected airflow is less than the second airflow threshold value.

13. The non-combustible aerosol-generating system of claim 10, wherein the second power is less than the first power.

14. The non-combustible aerosol-generating system of claim 10, further comprising:

a sensor configured to detect the airflow and output a signal to the circuitry, the signal being representative of a magnitude of the airflow.

15. The non-combustible aerosol-generating system of claim 10, wherein the preheat temperature is less than 400° C.

16. The non-combustible aerosol-generating system of claim 10, wherein the preheat temperature is 320° C.

17. The non-combustible aerosol-generating system of claim 10, wherein the preheat temperature is 300° C.

18. The non-combustible aerosol-generating system of claim 10, wherein the preheat power is a set maximum power.

* * * * *